US012099483B2

United States Patent
Earnesty, Jr. et al.

(10) Patent No.: US 12,099,483 B2
(45) Date of Patent: Sep. 24, 2024

(54) RULES BASED SCHEDULING AND MIGRATION OF DATABASES USING COMPLEXITY AND WEIGHT

(71) Applicant: ORACLE INTERNATIONAL CORPORATION, Redwood Shores, CA (US)

(72) Inventors: James C. Earnesty, Jr., Concord, NC (US); Inderpal S. Tahim, Flower Mound, TX (US); Mary Allgood Melgaard, Sarasota, FL (US); Constantine James Berdusis, Orland Park, IL (US)

(73) Assignee: Oracle International Corporation, Redwood Shores, CA (US)

( * ) Notice: Subject to any disclaimer, the term of this patent is extended or adjusted under 35 U.S.C. 154(b) by 102 days.

(21) Appl. No.: 16/146,092

(22) Filed: Sep. 28, 2018

(65) Prior Publication Data

US 2020/0104377 A1    Apr. 2, 2020

(51) Int. Cl.
*G06F 16/21* (2019.01)
*G06F 9/48* (2006.01)
*G06F 16/25* (2019.01)
*G06F 16/28* (2019.01)

(52) U.S. Cl.
CPC .......... *G06F 16/214* (2019.01); *G06F 9/4881* (2013.01); *G06F 16/25* (2019.01); *G06F 16/285* (2019.01)

(58) Field of Classification Search
None
See application file for complete search history.

(56) References Cited

U.S. PATENT DOCUMENTS

| | | |
|---|---|---|
| 7,171,379 B2 | 1/2007 | Menninger et al. |
| 8,818,949 B2 | 8/2014 | Cline et al. |
| 8,914,789 B2 | 12/2014 | Barros et al. |
| 9,158,827 B1 | 10/2015 | Vu et al. |
| 9,442,983 B2 | 9/2016 | Higginson et al. |
| 9,596,189 B1* | 3/2017 | Lea ..................... G06F 9/45558 |
| 9,619,271 B1* | 4/2017 | Cropper ................ G06F 9/5088 |
| 9,762,461 B2 | 9/2017 | Raghunathan et al. |

(Continued)

*Primary Examiner* — Kris E Mackes
*Assistant Examiner* — Cao D Vuong
(74) *Attorney, Agent, or Firm* — Potomac Law Group, PLLC

(57) ABSTRACT

Embodiments include systems and methods for performing rules based scheduling and migration of databases based on complexity and weight. Information about source databases from a source system can be stored, the stored information including storage capacity information and downtime information for the source databases. Each of the source databases can be classified to one of a plurality of predetermined migration complexities based on the storage capacity information and downtime information. Scheduling weights can be assigned to each class of complexity. A migration schedule can be generated that defines periods of time for migrating data from the source databases, where a rules based scheduling engine generates the migration schedule based on the classified source databases and the assigned scheduling weights, the rules defining a weight criteria for the periods of time. Data can be migrated from the source databases to target databases according to the migration schedule.

19 Claims, 43 Drawing Sheets

(56) References Cited

U.S. PATENT DOCUMENTS

| | | | |
|---|---|---|---|
| 10,185,727 B1* | 1/2019 | Wilton | G06F 16/214 |
| 2003/0177146 A1 | 9/2003 | Zimowski | |
| 2005/0055446 A1 | 3/2005 | Chidambaran et al. | |
| 2006/0015416 A1 | 1/2006 | Hoffman et al. | |
| 2007/0271379 A1 | 11/2007 | Carlton et al. | |
| 2010/0262632 A1* | 10/2010 | Jain | G06F 16/258 705/1.1 |
| 2011/0231362 A1 | 9/2011 | Attarde et al. | |
| 2012/0330911 A1* | 12/2012 | Gruenheid | G06F 16/214 707/694 |
| 2014/0157370 A1 | 6/2014 | Plattner et al. | |
| 2015/0019195 A1 | 1/2015 | Davis | |
| 2015/0019197 A1 | 1/2015 | Higginson et al. | |
| 2015/0019478 A1 | 1/2015 | Buehne et al. | |
| 2015/0019479 A1* | 1/2015 | Buehne | G06F 16/214 707/609 |
| 2015/0019487 A1 | 1/2015 | Buehne et al. | |
| 2015/0019488 A1* | 1/2015 | Higginson | G06F 16/214 707/634 |
| 2015/0019700 A1 | 1/2015 | Masterson et al. | |
| 2015/0019706 A1 | 1/2015 | Raghunathan et al. | |
| 2015/0019707 A1 | 1/2015 | Raghunathan et al. | |
| 2015/0081868 A1 | 3/2015 | Hillier et al. | |
| 2015/0188945 A1 | 7/2015 | Kjeldaas | |
| 2017/0031715 A1* | 2/2017 | Willis | G06F 9/46 |
| 2017/0046143 A1* | 2/2017 | Kochhar | G06F 8/71 |
| 2017/0171231 A1 | 6/2017 | Reybok et al. | |
| 2017/0193041 A1 | 7/2017 | Fuchs | |
| 2018/0247073 A1 | 8/2018 | Kreutzer et al. | |
| 2019/0026048 A1* | 1/2019 | Muehge | G06N 3/08 |
| 2019/0042305 A1 | 2/2019 | McDonnell | |
| 2019/0235918 A1* | 8/2019 | Liu | G06F 3/0617 |
| 2019/0236150 A1* | 8/2019 | Zaslavsky | G06F 16/2308 |
| 2019/0243547 A1* | 8/2019 | Duggal | G06F 3/0619 |
| 2019/0243688 A1* | 8/2019 | Karmarkar | G06F 9/5083 |
| 2019/0311041 A1* | 10/2019 | Shah | G06F 16/289 |
| 2019/0327271 A1 | 10/2019 | Saxena et al. | |
| 2019/0340251 A1* | 11/2019 | Peddada | H04L 9/16 |
| 2019/0356730 A1 | 11/2019 | Bivens et al. | |
| 2019/0384634 A1* | 12/2019 | Nanduru | G06F 9/5038 |

* cited by examiner

Fig. 4

| ENVIRONMENT | COMPLEXITY | DISCOVERY | DEFINEMIGRATION | CUTOVER | PREPARESOURCE | PREPARETARGET | MIGRATEUNITTEST | GOLIVEPLANNING | GOLIVETRANSITION |
|---|---|---|---|---|---|---|---|---|---|
| Prod | VERY SIMPLE | 0.1 | | 0.1 | 0.05 | 0.15 | 1 | 0.13 | 0.25 |
| Prod | SIMPLE | 0.15 | | 0.15 | 0.05 | 0.25 | 1.5 | 0.13 | 0.5 |
| Prod | AVERAGE | 0.15 | | 0.15 | 0.05 | 0.25 | 2 | 0.13 | 0.75 |
| Prod | COMPLEX | 0.25 | | 0.25 | 0.05 | 0.5 | 3 | 0.25 | 1.5 |
| Prod | VERY COMPLEX | 0.35 | | 0.5 | 0.05 | 0.5 | 8 | 0.5 | 2.5 |
| Non-Prod | VERY SIMPLE | 0.1 | | 0.1 | 0.05 | 0.15 | 1 | 0 | 0 |
| Non-Prod | SIMPLE | 0.15 | | 0.15 | 0.05 | 0.25 | 1.5 | 0 | 0 |
| Non-Prod | AVERAGE | 0.15 | | 0.15 | 0.05 | 0.25 | 2 | 0 | 0 |
| Non-Prod | COMPLEX | 0.25 | | 0.25 | 0.05 | 0.5 | 3 | 0 | 0 |
| Non-Prod | VERY COMPLEX | 0.35 | | 0.5 | 0.05 | 0.5 | 8 | 0 | 0 |
| DR | VERY SIMPLE | 0.15 | | 0.1 | 0 | 0.25 | 0 | 0 | 0.25 |
| DR | SIMPLE | 0.15 | | 0.1 | 0 | 0.25 | 0 | 0 | 0.5 |
| DR | AVERAGE | 0.15 | | 0.1 | 0 | 0.25 | 0 | 0 | 0.75 |
| DR | COMPLEX | 0.25 | | 0.1 | 0 | 0.5 | 0 | 0 | 1.5 |
| DR | VERY COMPLEX | 0.25 | | 0.1 | 0 | 0.5 | 0 | 0 | 2.5 |

Fig. 7

Staffing Plan Result

Opportunity

Database Classification Summary

| Environment | Complexity | Source DB Count | OGG Migration DB Count |
|---|---|---|---|
| Prod | Average | 6 | 6 |
| Prod | Very Complex | 4 | 5 |
| Non-Prod | Very Simple | 500 | 0 |
| Non-Prod | Simple | 490 | 0 |
| Total | | 1000 | 10 |

Staff Summary

| Resource Pool | Resource Team | Resource Role | Max Count |
|---|---|---|---|
| Onshore | CDE | PM | 1 |
| Onshore | CDE | Migration Architect | 1 |
| Onshore | CDE | OGG Architect | 1 |
| Offshore/HUB | CDE | Cloud Architect | 1 |
| Offshore/HUB | Migration Team | Studio Admin | 1 |
| Offshore/HUB | Migration Team | Migration Lead | 1 |
| Offshore/HUB | Migration Team | PM | 1 |
| Offshore/HUB | Migration Team | Breakfix Specialist | 4 |
| Offshore/HUB | Migration Team | Migration Specialist | 1 |
| Offshore/HUB | Migration Team | OGG Specialist | 1 |
| Total | | | 13 |

800

802

804

806

808

Fig. 8 staff plan interval rules

Rows 1 - 24 of 24

| | Resource Pool | Resource Team | Resource Role | Max Source DB Count | Resource Person Days | Resource Count |
|---|---|---|---|---|---|---|
| ✎ | Offshore/HUB | Migration Team | Studio Admin | 5000 | 30 | |
| ✎ | Offshore/HUB | Migration Team | Studio Admin | 4000 | 25 | |
| ✎ | Offshore/HUB | Migration Team | Studio Admin | 3000 | 20 | |
| ✎ | Offshore/HUB | Migration Team | Studio Admin | 2000 | 15 | |
| ✎ | Offshore/HUB | Migration Team | Studio Admin | 1000 | 10 | |
| ✎ | Offshore/HUB | Migration Team | Studio Admin | 100 | 5 | |
| ✎ | Onshore | COE | PM | 400 | | 1 |
| ✎ | Onshore | COE | PM | 300 | | .75 |
| ✎ | Onshore | COE | PM | 200 | | .5 |
| ✎ | Onshore | COE | PM | 100 | | .25 |
| ✎ | Onshore | COE | Migration Architect | 5000 | | 1 |
| ✎ | Offshore/HUB | Migration Team | Migration Lead | 5000 | | |
| ✎ | Offshore/HUB | Migration Team | Migration Lead | 400 | | 0 |
| ✎ | Onshore | COE | OGG Architect | 500 | 50 | |
| ✎ | Onshore | COE | OGG Architect | 400 | 40 | |
| ✎ | Onshore | COE | OGG Architect | 300 | 30 | |
| ✎ | Onshore | COE | OGG Architect | 200 | 20 | |
| ✎ | Onshore | COE | OGG Architect | 100 | 10 | |
| ✎ | Onshore | COE | OGG Architect | 50 | 5 | |
| ✎ | Onshore | COE | Cloud Architect | 5000 | 10 | |
| ✎ | Onshore | COE | Cloud Architect | 50 | 5 | |
| ✎ | Offshore/HUB | Migration Team | PM Admin | 5000 | | 2 |
| ✎ | Offshore/HUB | Migration Team | PM Admin | 4000 | | 1 |
| ✎ | Offshore/HUB | Migration Team | PM Admin | 3000 | | 0 |

Fig. 9

| | | | | | | | |
|---|---|---|---|---|---|---|---|
| BOSTON | ORACLE | Credit Cards | 789.S | | | studio10src | stdem11 | PRODUCTION |
| BOSTON | ORACLE | Credit Cards | 789.S | | | studio10src | stdem12 | PRODUCTION |
| BOSTON | ORACLE | Credit Cards | 789.S | | | studio10src | stdem13 | PRODUCTION |
| BOSTON | ORACLE | Credit Cards | 789.S | | | studio10src | stdem14 | PRODUCTION |
| BOSTON | ORACLE | Credit Cards | 789.S | | | studio10src | stdem15 | PRODUCTION |
| BOSTON | ORACLE | Credit Cards | 789.S | | | studio10src | stdem16 | PRODUCTION |
| BOSTON | ORACLE | Credit Cards | 789.S | | | studio10src | stdem17 | PRODUCTION |
| BOSTON | ORACLE | Credit Cards | 789.S | | | studio10src | stdem18 | PRODUCTION |
| BOSTON | ORACLE | Credit Cards | 789.S | | | studio10src | stdem19 | PRODUCTION |
| BOSTON | ORACLE | Credit Cards | 789.S | | | studio10src | stdem20 | PRODUCTION |
| CHICAGO | ORACLE | APPLICATION_1 | 1.S | | | host30 | db_1 | DEVELOPMENT |
| CHICAGO | ORACLE | APPLICATION_1 | 1.S | | | host31 | db_2 | QA |
| CHICAGO | ORACLE | APPLICATION_1 | 1.S | | | host32 | db_3 | UAT |
| CHICAGO | ORACLE | APPLICATION_1 | 1.S | | | host199 | db_4 | PRODUCTION |
| CHICAGO | ORACLE | APPLICATION_1 | 1.S | | | host198 | db_4 | BCP |
| CHICAGO | ORACLE | APPLICATION_1 | 10.S | | | host4 | db_45 | DEVELOPMENT |

1002

| | | | | | | | |
|---|---|---|---|---|---|---|---|
| Equities | Ke Qiu | Online Banking | PCI | | Y | otp | >48 Hours | |
| Equities | Ke Qiu | Online Banking | PCI | | Y | otp | >48 Hours | |
| Equities | Ke Qiu | Online Banking | PCI | | Y | otp | >48 Hours | |
| Equities | Ke Qiu | Online Banking | PCI | | Y | otp | >48 Hours | |
| Equities | Ke Qiu | Online Banking | PCI | | Y | otp | >48 Hours | |
| Equities | Ke Qiu | Online Banking | PCI | | Y | otp | >48 Hours | |
| Equities | Ke Qiu | Online Banking | PCI | | Y | otp | >48 Hours | |
| Equities | Ke Qiu | Online Banking | PCI | | Y | otp | >48 Hours | |
| LOB_1 | User_1 | BUSGROUP_1 | NCNPCI | Y | | OLTP | >24 AND <=48 HOURS | |
| LOB_1 | User_1 | BUSGROUP_1 | NCNPCI | Y | | OLTP | >24 AND <=48 HOURS | |
| LOB_1 | User_1 | BUSGROUP_1 | NCNPCI | Y | | OLTP | >24 AND <=48 HOURS | |
| LOB_1 | User_1 | BUSGROUP_1 | NCAPCI | Y | | OLTP | >24 AND <=48 HOURS | |
| LOB_1 | User_1 | BUSGROUP_1 | NCNPCI | Y | | OLTP | >24 AND <=48 HOURS | |
| LOB_2 | User_2 | BUSGROUP_1 | NCNPCI | Y | | OLTP | >24 AND <=48 HOURS | |
| LOB_2 | User_2 | BUSGROUP_1 | NCNPCI | Y | | OLTP | >24 AND <=48 HOURS | |
| LOB_2 | User_2 | BUSGROUP_1 | NCNPCI | Y | | OLTP | >24 AND <=48 HOURS | |
| LOB_2 | User_2 | BUSGROUP_1 | NCAPCI | Y | | OLTP | >24 AND <=48 HOURS | |
| LOB_11 | User_11 | BUSGROUP_6 | NCNPCI | Y | | OLTP | >24 AND <=48 HOURS | |
| LOB_11 | User_11 | BUSGROUP_6 | NCAPCI | Y | | OLTP | >24 AND <=48 HOURS | |
| LOB_11 | User_11 | BUSGROUP_6 | PCI | Y | | OLTP | >24 AND <=48 HOURS | |

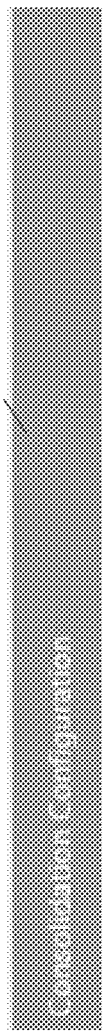
Fig. 20

Fig. 21

FDB Mapping Setup

CNDB Mapping Columns

| CNDB Column Name | Used For Map |
|---|---|
| DATA_CENTER | YES |
| ENVIRONMENT | YES |
| N_S_CHARACTERSET | YES |
| SECURITY_ZONE | YES |
| SERVICE_TIER | YES |
| BUSINESS_GROUP | NO |
| CUSTOM_ATTR1 | NO |
| CUSTOM_ATTR2 | NO |
| CUSTOM_ATTR3 | NO |
| CUSTOM_ATTR4 | NO |
| CUSTOM_ATTR5 | NO |
| CUSTOM_ATTR7 | NO |
| CUSTOM_ATTR8 | NO |
| CUSTOM_ATTR9 | NO |
| LINE_OF_BUSINESS | NO |

CNDB Mapping Values

| CNDB Column Name | CNDB Column Value | FDB col value |
|---|---|---|
| ENVIRONMENT | QA_UAT | QA |
| ENVIRONMENT | QA_UAT | UAT |

RULES BASED SCHEDULING AND MIGRATION OF DATABASES USING COMPLEXITY AND WEIGHT

FIELD

The embodiments of the present disclosure generally relate to performing rules based scheduling and migration of databases based on complexity and weight.

BACKGROUND

Due to the numerous complexities of data management, database migration presents a multifaceted challenge. For instance, source database implementations can include a variety of hardware configurations and/or database management systems. In addition, many databases store information that is vital to the functioning of applications, some of which are expected to adhere to stringent functionality requirements (i.e., minimum downtime). Further, target implementations can vary widely, and are often subject to various organizational preferences or constraints. These are merely examples, and a number of additional complexities have made efficient data migration a longstanding challenge in the field of data management.

SUMMARY

The embodiments of the present disclosure are generally directed to systems and methods for performing rules based scheduling and migration of databases based on complexity and weight that substantially improve upon the related art.

Information about source databases from a source system can be stored, the stored information including at least storage capacity information and downtime information for the source databases. Each of the plurality of source databases can be classified to one of a plurality of predetermined migration complexities based on the storage capacity information and downtime information. Scheduling weights can be assigned to each class of complexity. A migration schedule can be generated that defines periods of time for migrating data from each of the source databases, wherein a rules based scheduling engine generates the migration schedule based on the classified source databases and the assigned scheduling weights, the rules defining a weight criteria for the periods of time. Data can be migrated from the source databases to target databases according to the migration schedule.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 4 illustrates a sample questionnaire for statistical loading according to an example embodiment.

FIG. 7 illustrates sample sub-tasks estimates for various source databases classified to various migration complexities according to an example embodiment.

FIG. 8 illustrates a sample software tool and staffing plan for a data migration according to an embodiment.

FIG. 9 illustrates a software tool and staff plan rules for determining a staffing plan for a data migration according to an embodiment.

FIG. 10 illustrates a sample questionnaire for detailed loading according to an embodiment.

FIG. 17 illustrates a sample software tool for configuring migration windows for scheduling according to an embodiment.

FIG. 18 illustrates a sample software tool for generating a migration schedule according to an embodiment.

FIG. 20 illustrates a sample software tool for configuring database consolidation according to an embodiment.

FIG. 21 illustrates a sample software tool for configuring database consolidation including pool mapping according to an embodiment.

FIG. 22 illustrates a sample software tool for configuring pluggable database consolidation according to an embodiment.

FIG. 23 illustrates a sample software tool with selected target hardware according to an embodiment.

FIG. 25 illustrates a sample software tool for capacity planning results according to an embodiment.

FIG. 27 illustrates a sample software tool for target resource projection results according to an embodiment.

FIG. 32 illustrates a sample software tool for performing selected migrations according to an embodiment.

FIG. 33 illustrates a sample software tool with data migrations according to an embodiment.

DETAILED DESCRIPTION

Figure 1:
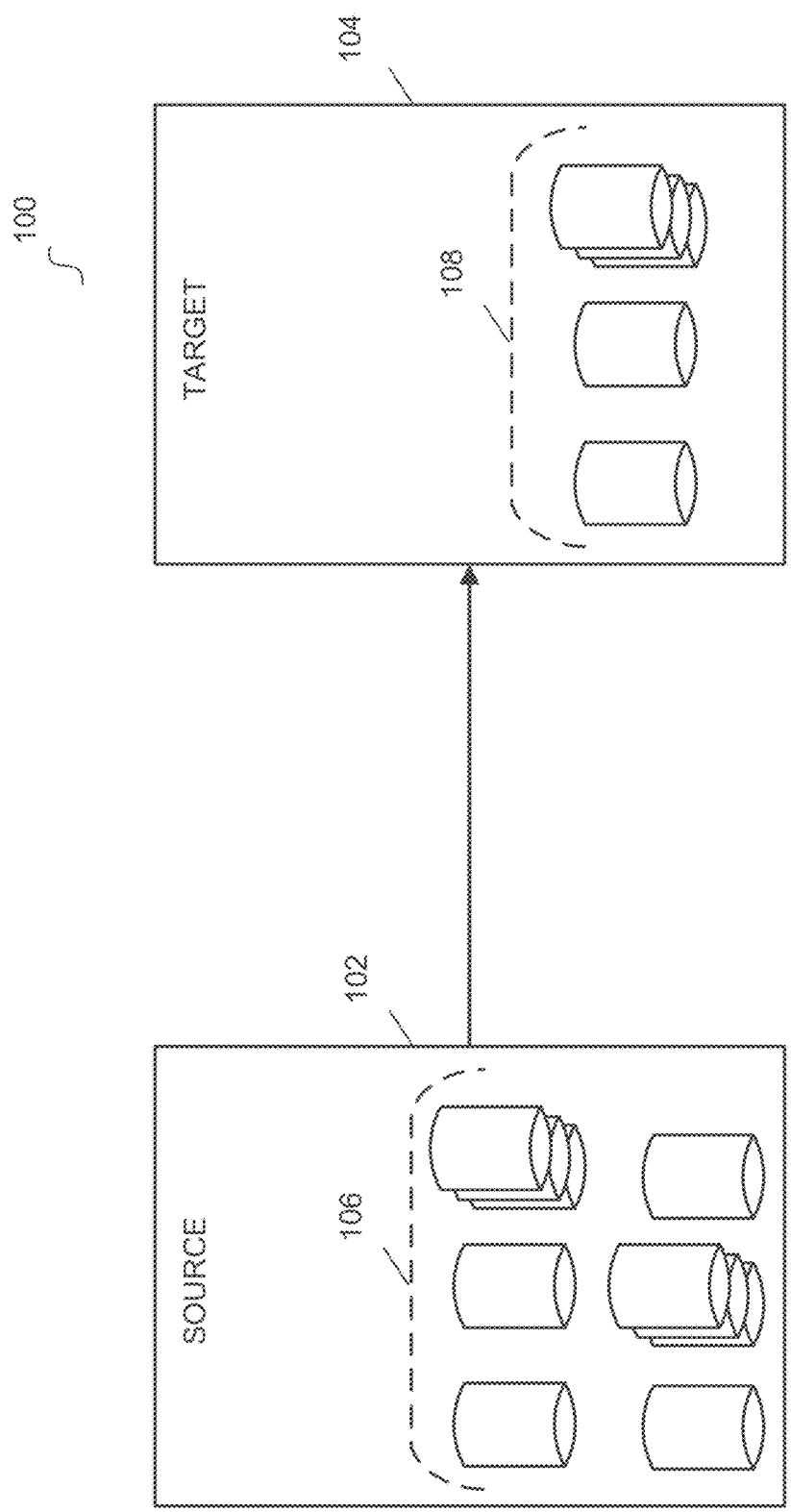
FIG. 1 illustrates a system for migrating data according to an example embodiment.

Embodiments plan, schedule, and execute data migration between a source system and a target system. For example, a source system can include a number of source databases (e.g., one or a mix of on-premise, cloud, Oracle®, IBM®, Microsoft®, and the like) that store data for migration to a new system (e.g., target system). In one example, on-premise source databases may be migrated to cloud based target databases. Other example can include any other types of source databases and target databases.

In some embodiments, the source system can also include a number of software applications that interact with the source databases. For example, the source system can be implemented by an enterprise or organization, and the applications can provide software functionality for the enterprise or organization using the source databases. Examples of such software include accounting, inventory management, information technology, back-end data services, cloud hosting for a web application, software as a service, infrastructure as a service, platform as a service, product specific functionality, service specific functionality, and any other suitable software functionality.

In some embodiments, the data migration may be subject to certain conditions. For example, a database may be required to adhere to a threshold amount of downtime (e.g., based on requirements for the software functionality achieved using the database). In some embodiments, source database can be categorized into certain environments that are descriptive of their use, such as production, non-production, development, and the like. In addition, due to availability of computing resources, a certain amount of data may be available for migration over a given period of time (e.g., a week). Thus, the migration can be subject to timing, resource, and other restrictions.

Embodiments generate a plan for the data migration, which can include target hardware, source hardware discovery, source classification, migration scheduling according to conditions, source to target mappings, target hardware assignments, and other migration details. For example, one or more scripts (e.g., reverse engineering scripts) can be executed on the source system to determine fine grain information about the source databases. This information can include data storage utilization (e.g., amount of hardware resources are consumed by the source implementation), processor utilization, and other suitable information (e.g., information about how the database in utilized within the source system environment).

In some embodiments, the source databases can be classified into database sizes, for example predetermined database sizes. Predetermined database sizes can be defined by storage capacity, number of processors utilized, a combination of these, and any other suitable database metric and/or combination of database metrics. In some embodiments, the classified sizes can then be used to map the source databases to a target system, and further to assign the databases to target hardware.

In some embodiments, the target hardware can be selected, determined based on the classified source databases, or a combination of these. For example, the classified source databases can be used to generate target hardware defined by a specification for the hardware (e.g., storage space, processors, and the like), and a number for hardware of a given specification. In another example, target hardware can be selected, and target databases can be assigned to the selected target hardware.

In another example, given the classified source databases and/or mapped target databases, embodiments can analyze the selected target hardware to determine whether sufficient computing resources have been selected for the target databases. When sufficient computing resources have been selected, the target databases can be assigned to the selected computing hardware. When sufficient computing resources have not been selected, embodiments can determine additional computing resources to add to the selected hardware such that the target databases have sufficient target hardware for assignment.

In some embodiments, a schedule can be generated for the data migration based on the conditions for the data migration (e.g., threshold amount of downtime for various source databases, source database categories, availability of computing resources to perform the migration, and the like). Based on the information gathered about the source databases, each source database can be classified to a migration complexity class, such as a predetermined complexity class. In some embodiments, the migration of a source database to a target database can be scheduled for a given period of time (e.g., week) based on the migration complexity class for the source database and remaining migration conditions. Each database in the migration can be similarly scheduled, thus generating an overall schedule for the migration. Embodiments can then provision one or a group of target databases (e.g., on the target hardware) according to the generated scheduled. Once provisioned, databases can be migrated from source to target according to the generated schedule.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is a system for migrating data in accordance with embodiments. System 100 includes source system 102, target system 104, source databases 106, and target databases 108. In some embodiments, source databases 106 can store data to be migrated to target databases 108. For example, the data migration may consolidate hardware such that the shape of the target system 104 (e.g., cloud and/or on-premise components) is smaller than the shape of source system 102 (e.g., cloud and/or on-premise components). In other examples, a similar shape may be maintained, or the shape of target system 104 may be larger (e.g., such as when adding functionality, storage capacity, reliability, or for any other suitable purpose).

Embodiments plan, schedule, and execute data migration between source system 102 and target system 104. Example database platforms for source system 102 and/or target system 104 include platforms such as Oracle® Database Cloud Service ("ODBCS"), Oracle® Exadata Cloud Service ("ExaCS"), Oracle® Exadata Cloud at Customer ("ExaCC"), other Oracle® Exadata Cloud Machine platforms, Oracle® Real Application Clusters ("RAC") or other grid computing platforms, other Oracle® cloud platforms, other Oracle® on-premise platforms, as well as any suitable cloud based, on-premise, and/or grid computing platforms (e.g., from other suitable hardware, software, or platform providers).

Figure 2:
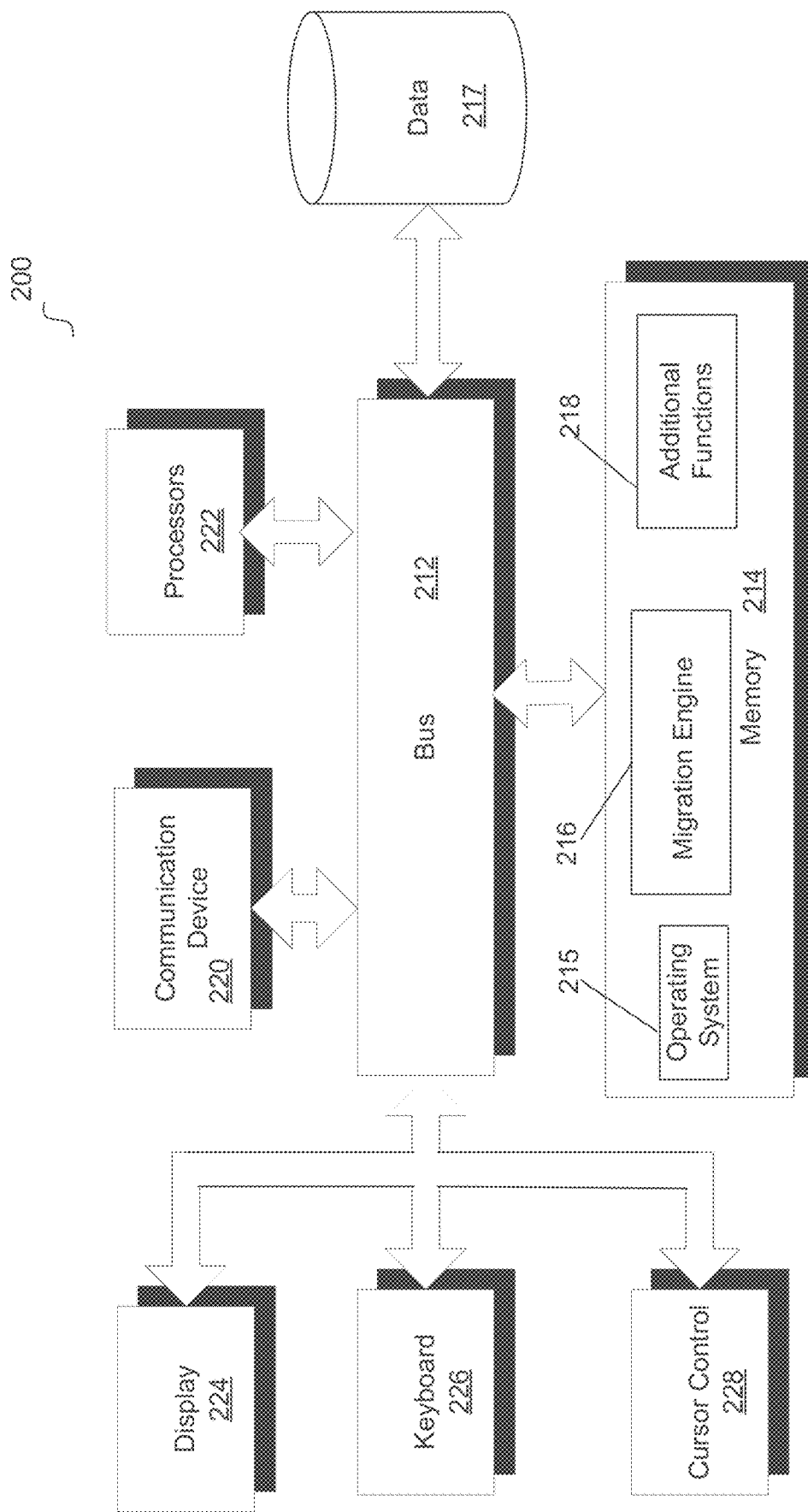
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, migration engine 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, migration engine 216 configured to perform migration planning, scheduling, and execution, as well as other applications modules 218. Operating system 215 provides operating system functionality for system 200. In some instances, migration engine 216 may be implemented as an in-memory configuration. In some implementations, when system 200 executes the functionality of migration engine 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include the various modules of Oracle® Cloud Infrastructure, Oracle® Cloud Platform, and/or Oracle® Cloud Applications, for example.

A database 217 is coupled to bus 212 to provide centralized storage for modules 216 and 218 and to store, for example, data received migration engine 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

In general, the industry relies on a set of disparate toolsets for migration that are not integrated nor optimized to work together to enable mass provisioning and migrations.

Embodiments can automate and perform mass migrations of storage, networks, virtual machines, databases, applications, and webservers to cloud and on-premise targets. For example, a host of engines and modules working in tandem integrate and automate relevant migration processes to include discovery, analysis, scheduling, consolidation, mapping, provisioning, migration, dashboarding, and reporting with a defined set of rules and target enhancements.

For example, a costing engine can determine a migration effort required based on the size and characteristics of an estate. Staffing plans can then be generated using an adaptive staffing algorithms to determine an optimal staffing plan. The costing engine can also determine the classifications and complexity of the migration, which can be used to determine the effort required and cost of the migration based on size and characteristics of the estate. A load and classification engine can analyze and use software code and scripts to reverse engineer databases from the source systems to classify migration complexity, recommend target database sizing and service tier alignments based on user performance, consolidation, and availability requirements. The load and classification engine can load, vet, and pass the estate through enrichment process by collecting and processing additional information on the estate. The estate can then be mapped to the target architecture aligning the estates with the service and technology catalogues.

A scheduling engine can use algorithms to automatically generate a migration schedule for discovered databases against a list of defined tasks for the duration of the migration project. The scheduling engine can review the applications, databases, dependencies, priorities and other information, such as blackout days, to build an enhanced schedule for the migration. This engine can develop and generate a migration plan divided into waves and groups and initiate the provisioning of the target environments. The scheduling engine can also generate and queue jobs to migrate the databases in the groups and waves. The consolidation and mapping engine can leverage information from the discovery and analysis engine to define a source to target mapping onto a list of defined target hardware using well methodologies such as lift and shift, multi-tenancy (pluggable), or schema approach. The consolidation and mapping engine can consolidate and map the estate and source databases to the target architecture based on catalogues, predetermined database sizes, and other source acquired/provided information.

The provisioning engine can create storage, networks, virtual machines, databases, applications, and webserver components based on the target mapping plan generated from the consolidation and mapping engine. The provisioning engine can achieve the automatic provisioning of environment for on cloud or on-premises targets. A migration engine can migrate databases and applications from the source to the provisioned target using an enhanced migration path calculated in the discovery and analysis engine to execute the migration.

The disclosed integrated and automated engines provide users with an enhanced migration solution enabling consistency and simplification, reduced risk, repeatable results, and accelerated time to value. The costing engine can provide optimized staffing plans that enable more migration activities with less resources. The automated and integrated engines provide improvements to product performance and functionality based on source sizing techniques, target estimation techniques, and mapping techniques that achieve improved resource usage. The automated algorithms enable consolidation of applications and databases for improved use of hardware. The automated scheduling algorithms can reduce migration durations by optimizing schedules to increase throughput. Further, the disclosed single click provisioning and migration of large numbers of components enables faster and greater consistency in execution.

Embodiments provide an end-to-end migration with improved efficiency, customization, and flexibility. For example, migration scheduling can be based on a number of customizable rules, thus allowing an enterprise or organization to perform a migration in a manner that fits unique circumstances. In addition, the mapping from a classified source database to target database and/or target hardware can similarly be based on a number of customizable rules. Further, some embodiments use of predetermined classifications for source database sizes and/or source database complexities provides efficient mechanisms for downstream processes, such as target database and/or target hardware mapping and migration scheduling (and migration execution) according to conditions/constraints.

Embodiments include a number of additional advantages. For example, adaptive staffing algorithms can be used that provide an improved staffing plan for a migration estate. Integrated and automated engines support key tasks including discovery, scheduling, consolidation, provisioning, and migration. Software codes and scripts reverse engineer a source asset (storage, networks, virtual machines, databases, applications, and webservers), and the resulting information can be used to determine an improved consolidation and migration path. Default and user defined rules and logic-based engines can support improved scheduling and consolidation.

Embodiments also achieve automation that enables single click provisioning of a large number of components including storage, networks, virtual machines, databases, applications and webservers. The achieved automation enables single click migration of a large number of components including storage, networks, virtual machines, databases, applications, and webservers.

In some embodiments, one or more of the following engines and modules can be implemented to plan, schedule, and execute data migrations:

| Engine | Module | Description |
| --- | --- | --- |
| Sizing & Costing | Estimation | Obtain migration estimate |
|  | Staffing | Build staff plan |
|  | Target Resource Project | Identify target resources (hardware) |
| Estate Analysis & Planning | Load & Classification | Load and classify databases |
|  | Target Registration | Register target hardware |
|  | Scheduling | Schedule providing and migration tasks |
|  | Consolidation | Consolidate databases to hardware (map) |
| Provisioning | Obtain Provisioning State | Obtain group of technology to be provisioned |
|  | Build Provision Payload | Build Provisioning Payload |
|  | Provision | Provision networks, storage, servers, databases, and applications |
| Migration | Obtain Migration State | Obtain Migration Details |
|  | Build Migration Payload | Build migration payload |
|  | Migration | Migrate applications and databases |

-continued

| Engine | Module | Description |
|---|---|---|
| Workflow | Workflow Processing | Flow to move work through the Studio |

Figure 3:
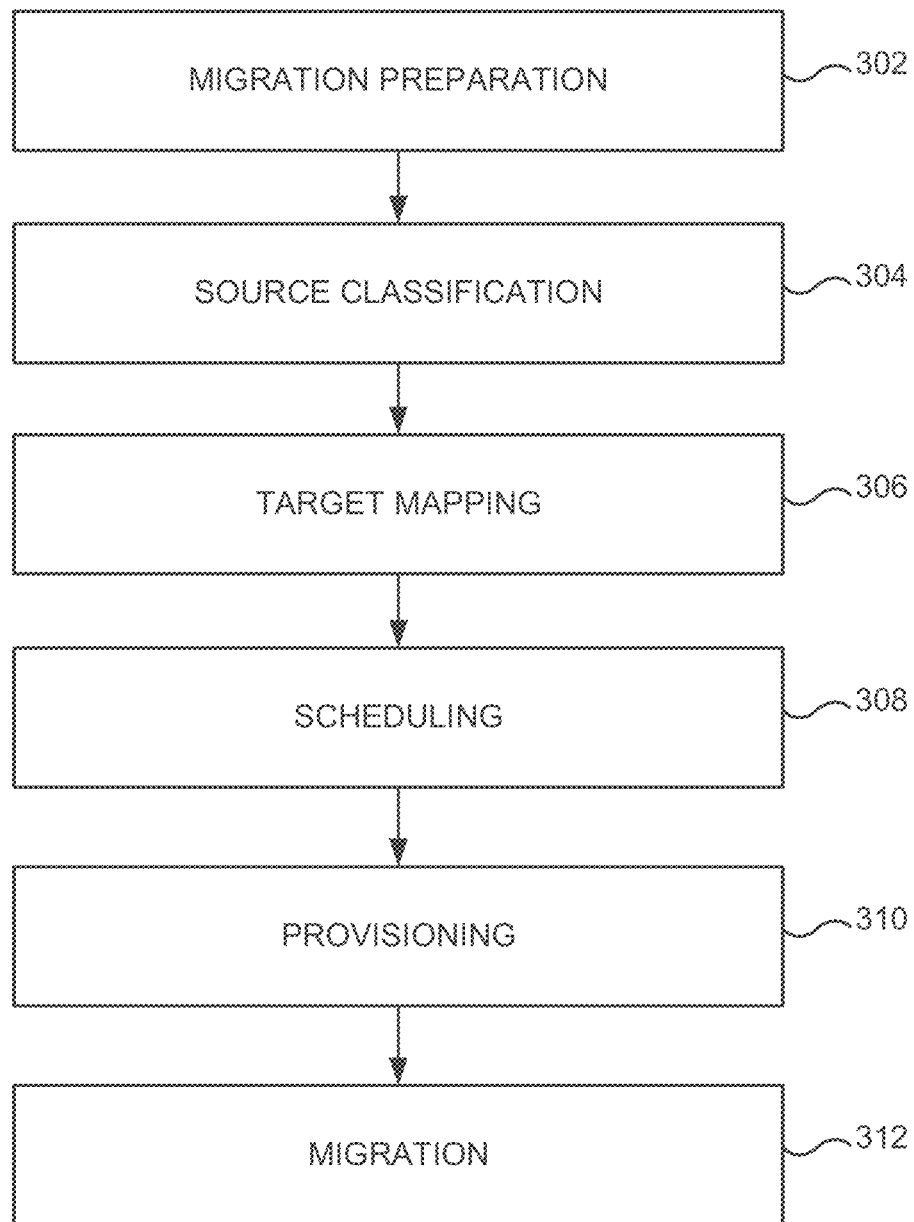
FIG. 3 illustrates a flow chart for data migration according to an example embodiment.

FIG. 3 illustrates a flow chart for data migration. For example, the engines and modules implemented in embodiments can perform migration tasks according to flow 300 in order to plan, schedule, and execute a data migration. At 302, migration preparation can be performed. Migration preparation can include one or more functions of the sizing and costing engine. At 304, source classification can be performed. Source classification can include one or more functions of the estate analysis & planning engine, such as load and classification of source databases and applications.

At 306, target mapping can be performed. Target mapping can also include one or more functions of the estate analysis & planning engine, such as source to target database mapping, registration of target hardware, and/or database/application consolidation to target hardware. At 308, scheduling can be performed. Scheduling can also include one or more functions of the estate analysis & planning engine, such as scheduling provisioning and migration tasks.

At 310, provisioning can be performed. Provisioning can include one or more functions of the provisioning engine. At 312, migration can be performed. Migration can include one or more functions of the migration engine and workflow engine. The functionality of these engines and modules is discussed in further detail below.

In some embodiments, the sizing and costing engine is used to determine the size and scope of a given migration project (e.g., for both human and hardware resources). The sizing and costing engine can perform a migration estimate (level of effort) for a migration project given a summarized database estate (statistical grouping). An optimized staffing plan associated with the summarized database estate (statistical grouping) using a combination of level of effort and adaptive staffing (rules based staffing) can be generated. A target resource projection (e.g., Oracle® hardware for Oracle® Engineered systems and custom hardware platforms, such as both cloud and on-premise) can be generated based on the summarized database estate. A financial and staffing plan payload can then be created.

In some embodiments, the sizing and costing engine can include a questionnaire (e.g., completed by an enterprise or organization associated with the source system) to summarize a database estate (statistical grouping) of the database estate to be migrated. The sizing and costing engine can include the following:
1. A questionnaire/survey used to build a summarized database estate (statistical grouping) of the database estate to be migrated can be provided.
2. The estate can be summarized by answering questions from the questionnaire using totals and list of values ("LOV") where applicable. The questionnaire can be uploaded and the migration estimation process can be urn (which executes the migration estimation, staff plan, target resource projection and financial payload algorithms). In some embodiments, each line represents a statistical group and database names are not included. The following represents summarization details from the source and target systems, though the below is just an example and other suitable information can be included or some listed information can be excluded.

| Source System | Target System |
|---|---|
| Environment: Non-Production or Production | Target Database Version: Database version |
| Databases Count: Count of databases | Target Operating System: Operating System |
| Source Operating System: Operating System | Target Security Technology: Target security technology (N/A, OKV, ODV, TDE). |
| Source Database Size: Database size range | Target Compression Technology: Is Target data to be compressed |
| Source Database Version: Database Version | Target Characterset: Is chracterset conversion required |
| Source Replication: Is replication configured (e.g., Oracle ® Goldengate/Streams) | Target Consolation Strategy: Are consolidation strategies to be implemented |
| Source Objects: How many objects are on source (e.g., <500000, >500000) | |
| Source Compression: Are source compression technologies implemented (Yes/No) | Target Downtime: What are the downtime requirements Target Fallback: Is fallback required |

Figure 4:
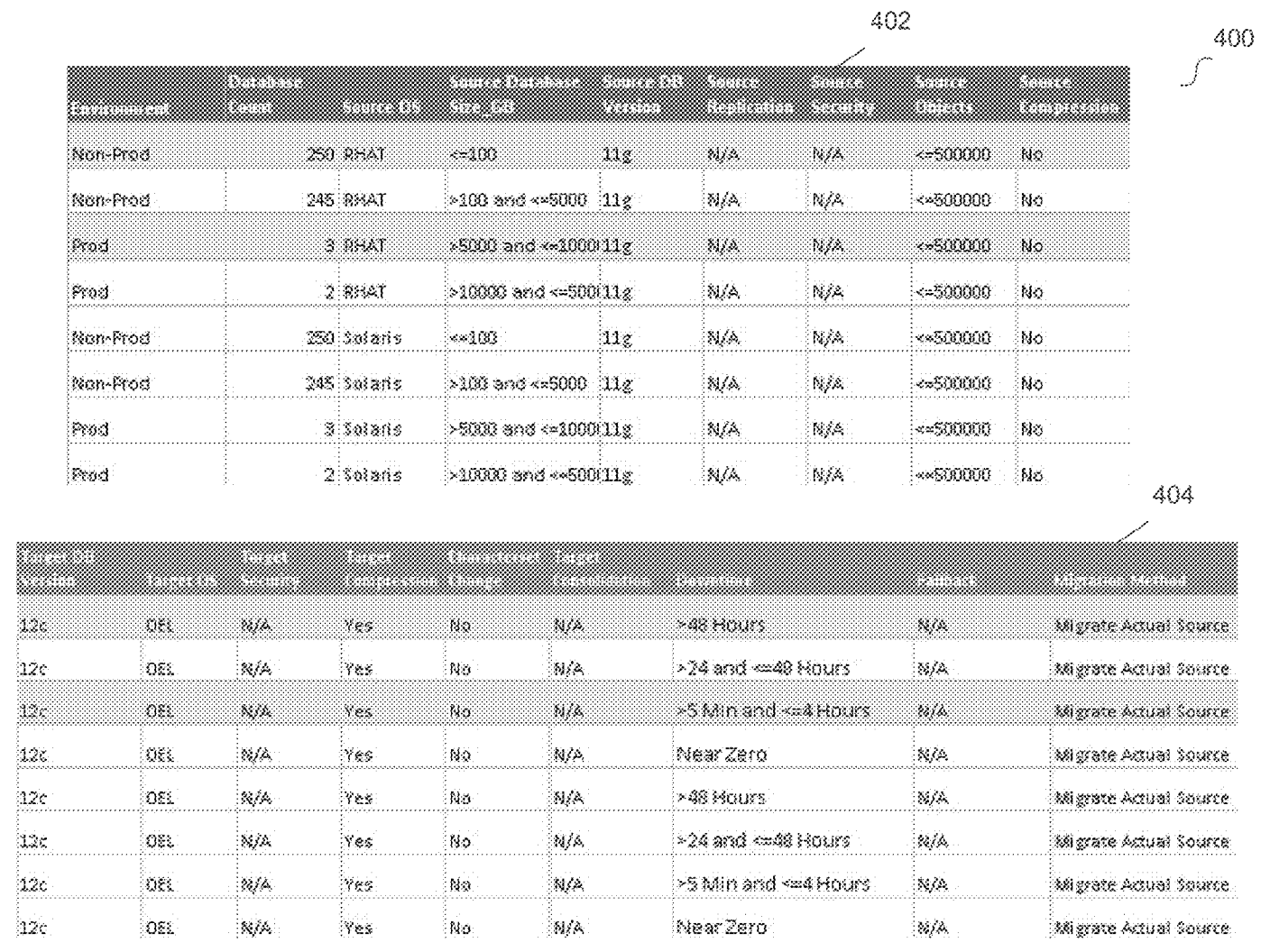

FIG. 4 illustrates a sample questionnaire for statistical loading. For example, element 402 illustrates questionnaire rows for the source system and element 404 illustrates questionnaire rows for the target system.

In some embodiments, a software tool can be implemented that interfaces with one or more users related to the migration to receive migration related information and perform migration related functionality. The software tool can be a web application, applet, native application, virtualized application, or any other suitable software application that is implemented by any suitable technology (e.g., web technology, scripting language, or any other suitable technology/programming language and environment).

Figure 5:
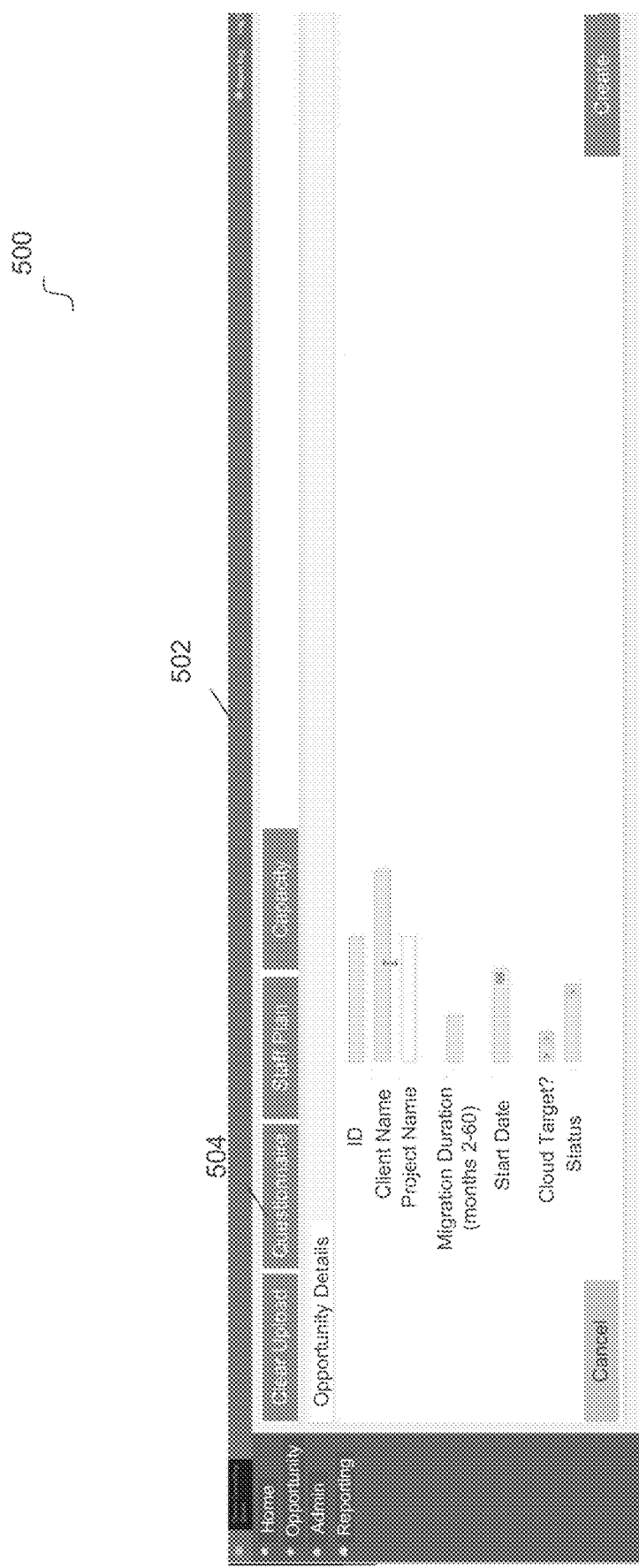
FIG. 5 illustrates a sample software tool for planning a data migration according to an example embodiment.

FIG. 5 illustrates a sample software tool for planning a data migration according to an embodiment. For example, software tool 500 can include user interface 502 which can display questionnaire element 504. In some embodiments, identifying information about an opportunity, or preliminary stage migration, can be input by a user interacting with user interface 502. In addition, questionnaire element 504 can be used to upload or otherwise input the statistical sizing questionnaire, such as the sample illustrated in FIG. 4. For example, when clicking questionnaire element 504, a user may be prompted to upload a data file (e.g., .csv file, or the like) that includes the information relevant to the statistical sizing questionnaire. Once uploaded, a button from user interface 502 (e.g., create button) can be used to load the database information from the statistical sizing questionnaire into the software tool.

Figure 6:
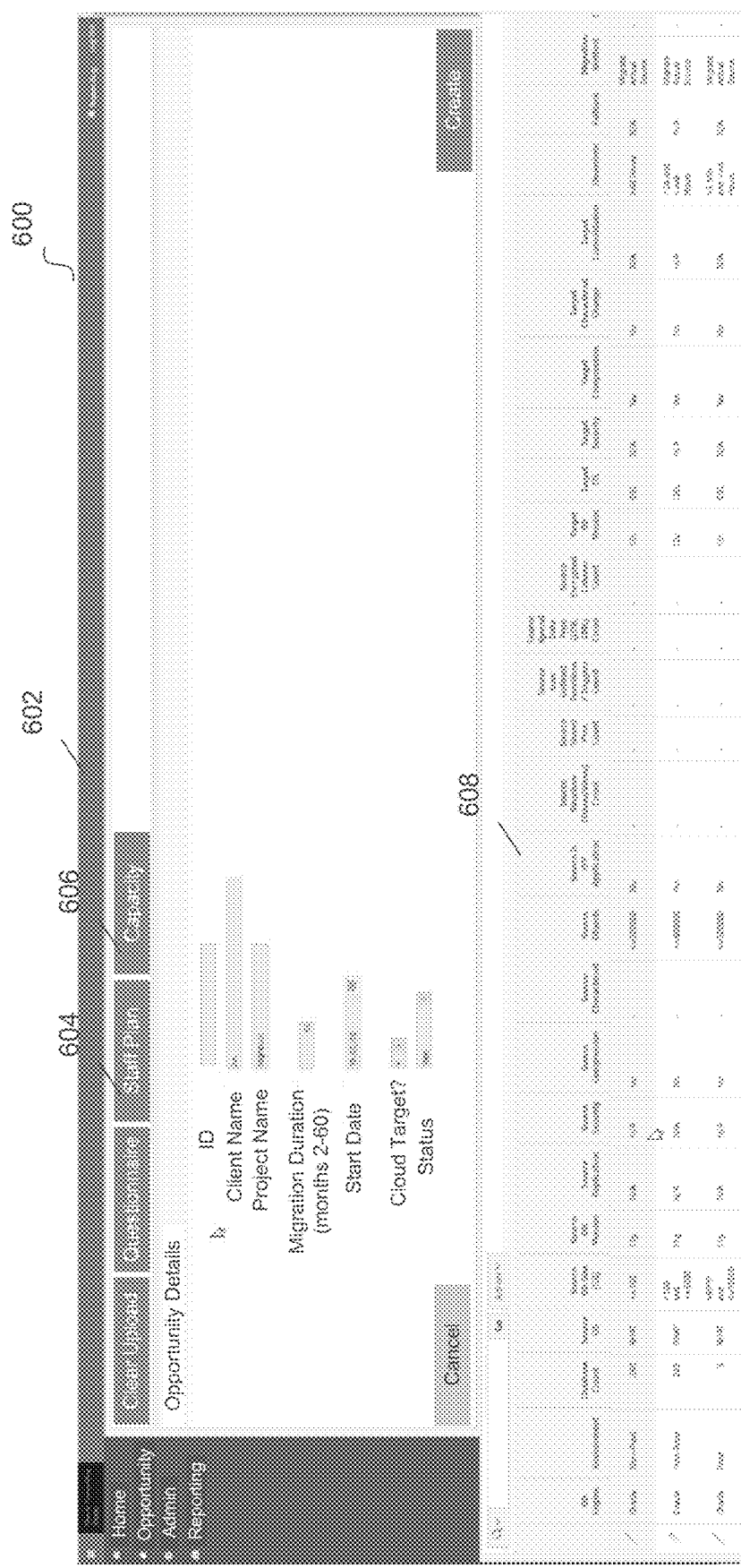
FIG. 6 illustrates a sample software tool with loaded statistical database information for planning a data migration according to an example embodiment.

FIG. 6 illustrates a sample software tool with loaded statistical database information for planning a data migration according to an embodiment. For example, software tool 600 can include user interface 602, which can display statistical information 608, staff planning element 604, and capacity element 606. In an embodiment, statistical information 608 can display the database statistical information uploaded from the statistical sizing questionnaire.

In some embodiments, a variety of functions can be achieved once that statistical sizing information for the databases is loaded into an embodiment of the software tool. For example, staff planning element 604 can be used to generate a staff plan for the data migration. In addition, in some embodiments, capacity element 606 can be used to generate a listing of target hardware that can receive the data/databases of the migration based on the statistical information about the databases.

In an example, staff planning element 604 can be selected, and resource roles and a number of each resource role can be determined for the data migration. In some embodiments, the resources roles and number of each resource role can be based on a migration complexity of the source databases. For example, migration complexity can be based on the loaded statistical information of the source databases and can be determined by migration estimation algorithms. For each row (e.g., of the loaded statistical information), the following column values can be used to determine the migration complexity, which is further described below.
- a. Database size
- b. Maximum downtime
- c. Whether Oracle Goldengate replication is configured
- d. Database environment
- e. Number of objects at the source database Based on the complexity and database environment, sub-task efforts can be added that are associated with each complexity. For example, the sub-tasks can be:
- a. Discovery
- b. Define migration cut-over
- c. Prepare source
- d. Prepare target
- e. Migration unit test
- f. Go-live planning
- g. Go-live transition
- h. Goldengate discovery
- i. Goldengate prepare source
- j. Goldengate prepare target
- k. Goldengate replication testing
- l. Goldengate fall back testing
- m. Goldengate go-live transition FIG. 7 illustrates sample sub-tasks estimates for various source databases classified to various migration complexities. For example, data structure 700 illustrates migration effort as a value of time (e.g., depicted as hours, or a fraction of an hour) for sample sub-tasks of a migration complexity (divided into production and non-production databases). In some embodiments, additional migration effort for uncommon sub-tasks can be added.
- a. Source DB older version
- b. Source security
- c. Source compression
- d. Target Security
- e. Target compression
- f. Target character set conversion A summarization of the migration efforts can represent the total migration effort estimation (e.g., in days). In some embodiments, a staffing plan algorithm can perform the following functionality. For each row, the following column values can be used to determine a migration complexity using a discrete function (e.g., as defined in the database table called "CLASS").
- a. Database size
- b. Maximum downtime
- c. Whether Oracle Goldengate replication is configured
- d. Database environment
- e. Number of objects at the source database The databases for the project duration can be distributed on a weekly basis, in consideration of the project wrap up and wrap down time. Based on the number of database migrations per week, as well as an adjusted weight of each migration based on complexity, a number of resource roles for handling the number of migrations each week can be determined. Those resource roles can include:

| | |
|---|---|
| a. COE | Studio Admin |
| b. COE | PM |
| c. COE | Migration Architect |
| d. COE | Migration Lead |
| e. COE | Oracle Goldengate Architect |
| f. COE | Cloud Specialist |
| g. Migration Team | PM |
| h. Migration Team | PM Admin |
| i. Migration Team | Break fix Specialist |
| j. Migration Team | Migration Specialist |
| k. Migration Team | Oracle Goldengate Specialist |
| l. Test Team | Test Specialist |

FIG. 8 illustrates a sample software tool and staffing plan for a data migration according to an embodiment. For example, software tool 800 can include user interface 802, which can display a database classification summary 804, staff summary 806, and migration summary 808. In an embodiment, database classification summary 804 can display the determined source database migration complexity (e.g., very simple, simple, average, complex, very complex, and any other suitable complexity), along with other source database information from the statistical information (e.g., environment, such as production or non-production, source database count, Oracle® GoldenGate database count, and any other suitable information).

In an embodiment, the resource roles and number of resource roles can be determined based on a plurality of rules. FIG. 9 illustrates a software tool and staff plan rules for determining a staffing plan for a data migration according to an embodiment. Software tool 900 includes user interface 902 for displaying rules used to determine resource roles and a number for each resource role given source database information. For example, user interface 902 defines a number of resource person days for the studio admin resource role based on a source database count. User interface 902 also defines a resource count for a project PM based on a source database count. In some embodiments, the source database count, resource person days, and/or resource count values of user interface 902 are editable by a user of software tool 900. In other words, the staffing plan rules can be customizable by a user.

For example, embodiments include defining, for any defined resource role within a data migration, a resource person days value and/or a resource count value based on one or more of source database count, source database migration complexity, source database environment (e.g., production or non-production), any combination of these, or any other database information (or combination) provided for the migration estate (e.g., from the statistical information loaded into the software tool). In some embodiments, migration of the source database is divided into periods of time (e.g., weeks), in consideration of the project wrap up and wrap down time. Based on the number of database migrations per week, an adjusted weight of each migration based on the migration complexity (further discussed with reference to the scheduling engine), and the defined rules, a number of resource roles for handling the number of migrations each week can be determined.

For example, staff summary 806 can be determined based on the rules defined for the resource roles, a determined number of migrations per week, and the migration complexities for the source databases (as displayed in database classification summary 804). In an embodiment, migration summary 808 illustrates a number of migrations divided into each month. For example, based on each row of database classification summary 804, a number of migrations for the database defined by the given row within a given month can be defined from the start of the migration to the completion.

In some embodiments, a financial payload algorithm can perform the following functionality. A default staffing level can be assigned for each resource role. The hourly unit cost for different staffing levels of each resource role can be loaded. The total cost of each resource in the migration project can be summarized using the following formula: Resource days*24 (hours)*hourly unit cost of default staffing level.

Referring back to FIG. 6, capacity element 606 can be used to generate a target resource projection in some embodiments. For example, a target resource projection algorithm can perform the following functionality:
  a. Estate details from the migration estimation can be obtained
  b. Target hardware architecture can be obtained
  c. Capacity rules can be obtained
  d. Project required hardware can be determined (which can be done using a statistical or a detailed approach, as further described).

In some embodiments, statistical target calculation for applications can be determined by providing an application load sheet outlined in the sizing and costing engine. Example columns for this calculation are as follows:
  i. Source Environment
  ii. Source Application Count
  iii. Source Operating System
  iv. Source Application Storage (GB)
  v. Source Application Memory
  vi. Source Application CPU
  vii. Target Platform In some embodiments, these columns (or similar columns) can be loaded during a load process and can be used for statistical sizing. For example, this data can be loaded in a manner similar to the statistical sizing questionnaire. Once loaded, the functionality of FIG. 35 can be performed to provide a high-level sizing of an application target platform.

In some embodiments, the statistical target calculation for databases can be determined by providing additional columns to the load sheet outlined in the sizing and costing engine. Examples of such columns can be:
  i. Total System Global Area ("SGA")
  ii. Total Central Processing Units ("CPUs")
  iii. Total Storage
  iv. Target Platform In some embodiments, these columns (or similar columns) can be loaded during a load process and can be used for statistical sizing. For example, this data can be loaded in a manner similar to the statistical sizing questionnaire. Once loaded, the functionality of FIG. 36 can be performed to provide a high-level sizing of the target platform.

In some embodiments, once one or more of the above algorithms have been executed, reports and other outputs can be produced. Example reports and outputs include a migration estimation report, a staff plan report, a target resource projection report, a financial payload dump file, and any other suitable subset of migration related data.

In some embodiments, the estate engineering and planning engine includes modules, such as load and classification, scheduling, and consolidation. For example, the load classification module can load a list of databases (estate) containing contacts, business requirements, and high-level sizing (e.g., inventory). The load classification module can also check the inventory against a predefined set of standards (e.g., scrubbing). The load classification module can also obtain technical details from the inventory by doing one of the following: performing reverse engineering on the source databases by connecting to the source and executing customized scripts; or performing reverse engineering on the source databases by connecting to a database application (e.g., Oracle® Enterprise Manager database repository) and executing customized scripts.

In some embodiments, the load classification module can also determine a migration complexity of each source database, assign a migration method for each source database based on the technical details and inventory conditions, assign a standard (e.g., predetermined T-shirt) size to each source database based on the technical details, assign a shape to each source database (e.g., for use in cloud based deployments), and/or assign a service tier to each database based on inventory details.

In some embodiments, the estate engineering and planning engine can use a questionnaire to load and process source system/database inventory. For example, a detailed questionnaire of the database estate to be migrated (e.g., source databases) can be provided to the source (e.g., enterprise or organization associated with the source system/databases). The detailed questionnaire can be uploaded and used for migration planning upon completion. The detailed questionnaire can include one or more of the following fields:

| | |
|---|---|
| SRC_PROVIDER | Is the source database ONPREM or in cloud (e.g., Oracle ® Database Cloud Service ("ODBCS"))? |
| TRG_PROVIDER | Is the target database ONPREM or in ODBCS? |
| APP_OWNER_CONTACT_NAME | Application Owner Name |
| DBA_MANAGER_NAME | DBA Manager Contact |
| DBA_CONTACT_NAME | DBA Contact |
| LINE OF BUSINESS | What Line of Business does this belong to? |
| LOB_CONTACT_NAME | Line of Business Contact Name |
| BUSINESS GROUP | What Business Group does this belong to? |
| BU_CONTACT_NAME | Business Unit Contact |
| NETWORK_MANAGER_CONTACT_NAME | Network Manager Contact |
| STORAGE_ADMIN_CONTACT_NAME | Storage Administrator Contact |
| DATA_CENTER | What is the current (source) data center of this database? |
| DB_PRODUCT | Is this source database ORACLE ®? |
| APP_NAME | What is the application name? |
| APP_ID | What is the ID of this application? |
| DB_SERVICE_TIER | What the database service tier? |
| HOSTNAME | What is the hostname of the source |

| | |
|---|---|
| | database? If this is Oracle ® on RAC, list only node 1 of that cluster. For example, if a RAC database is on nodes 3, 4; then node 3 should be listed. |
| CNDB_NAME | What is the DB_NAME of this database? If multi-tenant environment then enter physical data base ("PDB") name. |
| ENVIRONMENT | What environment does this database belong to? |
| NLS_CHARACTERSET | What is the NLS_CHARACTERSET of this database? |
| SECURITY ZONE | If this database has security regulations, what security zone does it belong in? |
| MAPPING | Does this database require a mapping to a target host, CDB and PDB name? MAPPING = Y means that this migration is to be assigned to a destination (host, cdb & pdb) |
| SCHEDULING | Does this database require migration schedule dates? SCHEDULING = N means that this migration needs to be scheduled and the provided migration dates will be loaded into the MRP |
| TRANSACTION TYPE | Is this an OLTP, Data Warehouse/Analytic, or Hybrid(both) database? |
| REQ_CUTOVER_TIME | What is the maximum downtime allowed for this database? |
| MIGRATION_GROUP | If this database is to be migrated and a migration group is already know, what is it? |
| SGA_GB | What is the memory (RAM) area currently used for this database in bytes? |
| DB_SIZE_GB | What is the size of this database |
| RAC_NODES_NUM | Source RAC database node count |

FIG. 10 illustrates a sample questionnaire for detailed loading according to an embodiment. For example, elements 1002 illustrate questionnaire columns and rows for the source and target system. Embodiments of the detailed questionnaire include any of the information detailed above.

Figure 11:
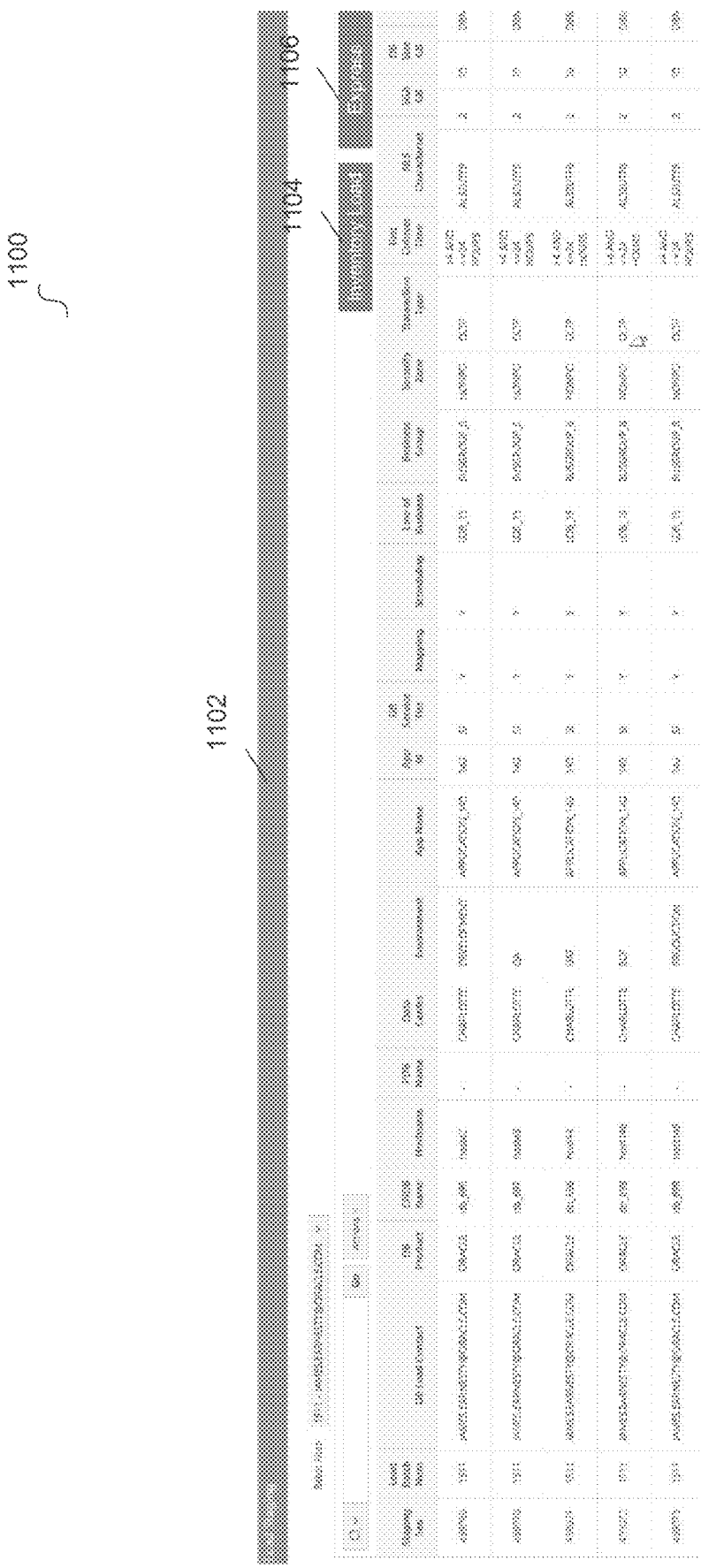
FIG. 11 illustrates a sample software tool for loading a detailed questionnaire and planning a data migration according to an embodiment.

FIG. 11 illustrates a sample software tool for loading a detailed questionnaire and planning a data migration according to an embodiment. For example, software tool 1100 can include user interface 1102, which can include inventory load element 1104 and express element 1106. In an embodiment, inventory load element 1104 can be used to upload or otherwise input the detailed questionnaire, such as the sample illustrated in FIG. 10. For example, when clicking inventory load element 1104, a user may be prompted to upload a data file (e.g., .csv file, or the like) that includes the information relevant to the detailed questionnaire. Once uploaded, a button from user interface 1102 can be used to load the database information (e.g., migration estate) from the statistical sizing questionnaire into the software tool. For example, user interface 1102 can include a display of the loaded detailed database information, or migration estate.

In some embodiments, once loaded, data cleaning and data validation and rejection algorithms can be executed. A data cleaning algorithm can perform one or more of the following: strip leading and trailing white space from fields, convert to upper case for all fields that do not have to be case-sensitive, convert fields with only white-space to nulls, strip characters from numeric fields where they exist (e.g., convert '1,024' to '1024'), strip domains from hostnames, ensure yes or no columns are cleaned consistently to 'y' or 'n', and the like.

In some embodiments, a validity algorithm can perform one or more of the following: ensure host and database names are not null, ensure database name is valid length, ensure spreadsheet specifies environments, data centers, service tiers, cutover times and security zones are validated values as defined in the SCON, ensure numeric columns are null or valid integers, ensure database transaction types are valid values as defined in the load spreadsheet, ensure yes or no columns are not filled with values that do not mean yes or no, ensure no duplicate databases are listed in the spreadsheet, ensure no databases listed in the spreadsheet have been previously loaded for the migration, and the like. A rejection algorithm of the load can perform one or more of the following: obtain a list of records which did not pass the validation algorithm, obtain list of records which are validated but failed to load for other reasons, mark all of above records as rejected, and the like.

In some embodiments, after data cleaning, validation, and rejection have been performed, a migration complexity algorithm can assign a complexity, for example based on the follow inputs: database disk size, whether database replication is used or not (e.g., using replication software such as Goldengate), a number of database user objects, a requested cut-over time (e.g., downtime threshold), and the like. In some embodiments, one or more rules for the assigned complexity can be defined, for example: failover/Business Contingency Plan ("BCP") type databases are automatically classified as SIMPLE, non-production databases may not exceed an AVERAGE complexity, and the like. In some embodiments, the rules can include buckets for database sizes, condition definitions for replication, status, number of objects, and buckets for requested cutover (downtime thresholds). For example, the rules can define complexities as a function of these values.

Example complexity assignments based on the above example inputs are:

| Complexity | DB GB Size (Lower Bound) | DB GB Size (Upper Bound) | Rep? | Status | # of Objects (Lower Bound) | # of Objects (Upper Bound) | Requested Cutover |
|---|---|---|---|---|---|---|---|
| VERY SIMPLE | 0 | 100 | N | PROD | 0 | 500000 | >48 HOURS |
| VERY SIMPLE | 0 | 100 | N | NON PROD | 0 | 500000 | >48 HOURS |
| VERY SIMPLE | 0 | 100 | N | NON PROD | 0 | 500000 | >24 AND <=48 HOURS |
| VERY SIMPLE | 0 | 100 | N | NON PROD | 0 | 500000 | >4 AND <=24 HOURS |
| VERY SIMPLE | 0 | 100 | N | NON PROD | 0 | 500000 | >5 MIN AND <=4 HOURS |
| VERY SIMPLE | 0 | 100 | N | NON PROD | 0 | 500000 | NEAR ZERO |
| VERY COMPLEX | 0 | 100 | N | PROD | 0 | 500000 | NEAR ZERO |
| VERY COMPLEX | 101 | 5120 | N | PROD | 0 | 500000 | NEAR ZERO |
| VERY COMPLEX | 5121 | 10240 | N | PROD | 0 | 500000 | NEAR ZERO |
| VERY COMPLEX | 10241 | 100000000 | Y | PROD | 0 | 500000 | NEAR ZERO |
| VERY COMPLEX | 0 | 100 | Y | PROD | 0 | 500000 | NEAR ZERO |
| VERY COMPLEX | 101 | 5120 | Y | PROD | 0 | 500000 | NEAR ZERO |
| VERY COMPLEX | 5121 | 10240 | Y | PROD | 0 | 500000 | NEAR ZERO |
| VERY COMPLEX | 10241 | 100000000 | N | PROD | 0 | 500000 | NEAR ZERO |
| SIMPLE | 0 | 100 | N | PROD | 0 | 500000 | >24 AND <=48 HOURS |
| SIMPLE | 101 | 5120 | N | PROD | 0 | 500000 | >48 HOURS |
| SIMPLE | 101 | 5120 | N | NON PROD | 0 | 500000 | >48 HOURS |
| SIMPLE | 101 | 5120 | N | NON PROD | 0 | 500000 | NEAR ZERO |
| SIMPLE | 101 | 5120 | N | NON PROD | 0 | 500000 | >4 AND <=24 HOURS |
| SIMPLE | 101 | 5120 | N | NON PROD | 0 | 500000 | >5 MIN AND <=4 HOURS |
| SIMPLE | 101 | 5120 | N | NON PROD | 0 | 500000 | >24 AND <=48 HOURS |
| COMPLEX | 0 | 100 | N | PROD | 0 | 500000 | >5 MIN AND <=4 HOURS |
| COMPLEX | 10241 | 100000000 | Y | NON PROD | 0 | 500000 | NEAR ZERO |
| COMPLEX | 5121 | 10240 | N | PROD | 0 | 500000 | >4 AND <=24 HOURS |
| COMPLEX | 5121 | 10240 | N | PROD | 0 | 500000 | >5 MIN AND <=4 HOURS |
| COMPLEX | 10241 | 100000000 | N | PROD | 0 | 500000 | >48 HOURS |
| COMPLEX | 10241 | 100000000 | N | PROD | 0 | 500000 | >24 AND <=48 HOURS |
| COMPLEX | 10241 | 100000000 | N | PROD | 0 | 500000 | >4 AND <=24 HOURS |
| COMPLEX | 10241 | 100000000 | N | PROD | 0 | 500000 | >5 MIN AND <=4 HOURS |

-continued

| Complexity | DB GB Size (Lower Bound) | DB GB Size (Upper Bound) | Rep? | Status | # of Objects (Lower Bound) | # of Objects (Upper Bound) | Requested Cutover |
|---|---|---|---|---|---|---|---|
| COMPLEX | 0 | 100 | Y | PROD | 0 | 500000 | >4 AND <=24 HOURS |
| COMPLEX | 0 | 100 | Y | PROD | 0 | 500000 | >5 MIN AND <=4 HOURS |
| COMPLEX | 101 | 5120 | Y | PROD | 0 | 500000 | >4 AND <=24 HOURS |
| COMPLEX | 101 | 5120 | Y | PROD | 0 | 500000 | >5 MIN AND <=4 HOURS |
| COMPLEX | 5121 | 10240 | Y | PROD | 0 | 500000 | >24 AND <=48 HOURS |
| COMPLEX | 5121 | 10240 | Y | PROD | 0 | 500000 | >4 AND <=24 HOURS |
| COMPLEX | 5121 | 10240 | Y | PROD | 0 | 500000 | >5 MIN AND <=4 HOURS |
| COMPLEX | 10241 | 100000000 | Y | PROD | 0 | 500000 | >48 HOURS |
| COMPLEX | 10241 | 100000000 | Y | PROD | 0 | 500000 | >24 AND <=48 HOURS |
| COMPLEX | 10241 | 100000000 | Y | PROD | 0 | 500000 | >4 AND <=24 HOURS |
| COMPLEX | 10241 | 100000000 | Y | PROD | 0 | 500000 | >5 MIN AND <=4 HOURS |
| COMPLEX | 10241 | 100000000 | N | NON PROD | 0 | 500000 | >48 HOURS |
| COMPLEX | 10241 | 100000000 | N | NON PROD | 0 | 500000 | >24 AND <=48 HOURS |
| COMPLEX | 10241 | 100000000 | N | NON PROD | 0 | 500000 | >4 AND <=24 HOURS |
| COMPLEX | 10241 | 100000000 | N | NON PROD | 0 | 500000 | >5 MIN AND <=4 HOURS |
| COMPLEX | 10241 | 100000000 | N | NON PROD | 0 | 500000 | NEAR ZERO |
| COMPLEX | 10241 | 100000000 | Y | NON PROD | 0 | 500000 | >48 HOURS |
| COMPLEX | 10241 | 100000000 | Y | NON PROD | 0 | 500000 | >24 AND <=48 HOURS |
| COMPLEX | 10241 | 100000000 | Y | NON PROD | 0 | 500000 | >4 AND <=24 HOURS |
| COMPLEX | 10241 | 100000000 | Y | NON PROD | 0 | 500000 | >5 MIN AND <=4 HOURS |
| COMPLEX | 101 | 5120 | N | PROD | 0 | 500000 | >5 MIN AND <=4 HOURS |
| AVERAGE | 0 | 100 | N | PROD | 0 | 500000 | >4 AND <=24 HOURS |
| AVERAGE | 5121 | 10240 | Y | NON PROD | 0 | 500000 | NEAR ZERO |
| AVERAGE | 101 | 5120 | N | PROD | 0 | 500000 | >4 AND <=24 HOURS |
| AVERAGE | 5121 | 10240 | N | PROD | 0 | 500000 | >48 HOURS |
| AVERAGE | 5121 | 10240 | N | PROD | 0 | 500000 | >24 AND <=48 HOURS |
| AVERAGE | 0 | 100 | Y | PROD | 0 | 500000 | >48 HOURS |

-continued

| Complexity | DB GB Size (Lower Bound) | DB GB Size (Upper Bound) | Rep? | Status | # of Objects (Lower Bound) | # of Objects (Upper Bound) | Requested Cutover |
|---|---|---|---|---|---|---|---|
| AVERAGE | 0 | 100 | Y | PROD | 0 | 500000 | >24 AND <=48 HOURS |
| AVERAGE | 101 | 5120 | Y | PROD | 0 | 500000 | >48 HOURS |
| AVERAGE | 101 | 5120 | Y | PROD | 0 | 500000 | >24 AND <=48 HOURS |
| AVERAGE | 5121 | 10240 | Y | PROD | 0 | 500000 | >48 HOURS |
| AVERAGE | 5121 | 10240 | N | NON PROD | 0 | 500000 | >48 HOURS |
| AVERAGE | 5121 | 10240 | N | NON PROD | 0 | 500000 | >24 AND <=48 HOURS |
| AVERAGE | 5121 | 10240 | N | NON PROD | 0 | 500000 | >4 AND <=24 HOURS |
| AVERAGE | 5121 | 10240 | N | NON PROD | 0 | 500000 | >5 MIN AND <=4 HOURS |
| AVERAGE | 5121 | 10240 | N | NON PROD | 0 | 500000 | NEAR ZERO |
| AVERAGE | 0 | 100 | Y | NON PROD | 0 | 500000 | >48 HOURS |
| AVERAGE | 0 | 100 | Y | NON PROD | 0 | 500000 | >24 AND <=48 HOURS |
| AVERAGE | 0 | 100 | Y | NON PROD | 0 | 500000 | >4 AND <=24 HOURS |
| AVERAGE | 0 | 100 | Y | NON PROD | 0 | 500000 | >5 MIN AND <=4 HOURS |
| AVERAGE | 0 | 100 | Y | NON PROD | 0 | 500000 | NEAR ZERO |
| AVERAGE | 101 | 5120 | Y | NON PROD | 0 | 500000 | >48 HOURS |
| AVERAGE | 101 | 5120 | Y | NON PROD | 0 | 500000 | >24 AND <=48 HOURS |
| AVERAGE | 101 | 5120 | Y | NON PROD | 0 | 500000 | >4 AND <=24 HOURS |
| AVERAGE | 101 | 5120 | Y | NON PROD | 0 | 500000 | >5 MIN AND <=4 HOURS |
| AVERAGE | 101 | 5120 | Y | NON PROD | 0 | 500000 | NEAR ZERO |
| AVERAGE | 5121 | 10240 | Y | NON PROD | 0 | 500000 | >48 HOURS |
| AVERAGE | 5121 | 10240 | Y | NON PROD | 0 | 500000 | >24 AND <=48 HOURS |
| AVERAGE | 5121 | 10240 | Y | NON PROD | 0 | 500000 | >4 AND <=24 HOURS |
| AVERAGE | 5121 | 10240 | Y | NON PROD | 0 | 500000 | >5 MIN AND <=4 HOURS |
| AVERAGE | 101 | 5120 | N | PROD | 0 | 500000 | >24 AND <=48 HOURS |

In some embodiments, once the migration complexity has been identified, a migration method algorithm can be assigned. The assign migration method algorithm can assign a migration approach using rules based decisions based on the following example inputs: downtime allowed for the migration, database disk size, number of user objects, whether there is an operating system change as part of the migration, and the like.

The following table outlines example migration method selections based on the values of these sample inputs. Embodiments include migration method as follows:
  DPUMP—For example, an Oracle® Data Pump Process
  XTTS—For example, an Oracle® Cross Platform Transportable Tablespace Process
  RMAN—For example, an Oracle® Recovery Manager Process DPUMP/GG—For example, an Oracle® Data Pump Process along with Oracle® GoldenGate XTTS/GG—For example, an Oracle® Cross Platform Transportable Tablespace Process along with Oracle® GoldenGate RMAN/GG—For example, an Oracle® Recovery Manager Process along with Oracle® GoldenGate

| Downtime Allowed | DB GB Size (Lower Bound) | DB GB Size (Upper Bound) | # of Objects (Lower Bound) | # of Objects (Upper Bound) | OS? | Migration Method |
|---|---|---|---|---|---|---|
| NEAR ZERO | 0 | 10000 | 0 | 500000 | Y | dpump/gg |
| NEAR ZERO | 0 | 10000 | 500001 | 50000000 | Y | rman/gg |
| NEAR ZERO | 10001 | 50000000 | 0 | 50000000 | Y | rman/gg |
| NEAR ZERO | 0 | 10000 | 0 | 500000 | N | dpump/gg |
| NEAR ZERO | 0 | 10000 | 500001 | 50000000 | N | xtts/gg |
| NEAR ZERO | 10001 | 50000000 | 0 | 50000000 | N | xtts/gg |
| >5 MIN AND <=4 HOURS | 0 | 10000 | 0 | 500000 | Y | dpump/dg |
| >5 MIN AND <=4 HOURS | 0 | 10000 | 500001 | 50000000 | Y | rman/dg |
| >5 MIN AND <=4 HOURS | 10001 | 50000000 | 0 | 50000000 | Y | rman/dg |
| >5 MIN AND <=4 HOURS | 0 | 10000 | 0 | 500000 | N | dpump/gg |
| >5 MIN AND <=4 HOURS | 0 | 10000 | 500001 | 50000000 | N | xtts/gg |
| >5 MIN AND <=4 HOURS | 10001 | 50000000 | 0 | 50000000 | N | xtts/gg |
| >4 AND <=24 HOURS | 0 | 10000 | 0 | 500000 | Y | dpump |
| >4 AND <=24 HOURS | 0 | 10000 | 500001 | 50000000 | Y | rman |
| >4 AND <=24 HOURS | 0 | 10000 | 0 | 500000 | N | dpump |
| >4 AND <=24 HOURS | 0 | 10000 | 500001 | 50000000 | N | xtts |
| >4 AND <=24 HOURS | 10001 | 50000000 | 0 | 50000000 | N | xtts |
| >24 AND <=48 HOURS | 0 | 10000 | 0 | 500000 | Y | dpump |
| >24 AND <=48 HOURS | 0 | 10000 | 500001 | 50000000 | Y | rman |
| >24 AND <=48 HOURS | 10001 | 50000000 | 0 | 50000000 | Y | rman |
| >24 AND <=48 HOURS | 0 | 10000 | 0 | 500000 | N | dpump |
| >24 AND <=48 HOURS | 0 | 10000 | 500001 | 50000000 | N | xtts |
| >24 AND <=48 HOURS | 10001 | 50000000 | 0 | 50000000 | N | xtts |
| >48 HOURS | 0 | 10000 | 0 | 500000 | Y | dpump |
| >48 HOURS | 0 | 10000 | 500001 | 50000000 | Y | rman |
| >48 HOURS | 10001 | 50000000 | 0 | 50000000 | Y | rman |
| >48 HOURS | 0 | 10000 | 0 | 500000 | N | dpump |
| >48 HOURS | 0 | 10000 | 500001 | 50000000 | N | xtts |
| >48 HOURS | 10001 | 50000000 | 0 | 50000000 | N | xtts |

Any other suitable migration methods can be implemented. In some embodiments, once a migration method is selected, a target capacity calculation can be performed. The functionality of FIGS. 37 and 38 can be performed to calculate target capacity sizing.

Referring back to FIG. 11, in some embodiments, once the detailed estate is loaded (e.g., after data cleaning and validation) and migration complexities/migration methods are determined for the source databases, express component 1106 can be used to generate an express path for data migration. For example, the express component 1106 can utilize default rules for scheduling and consolidation to plan the data migration.

Figure 12:
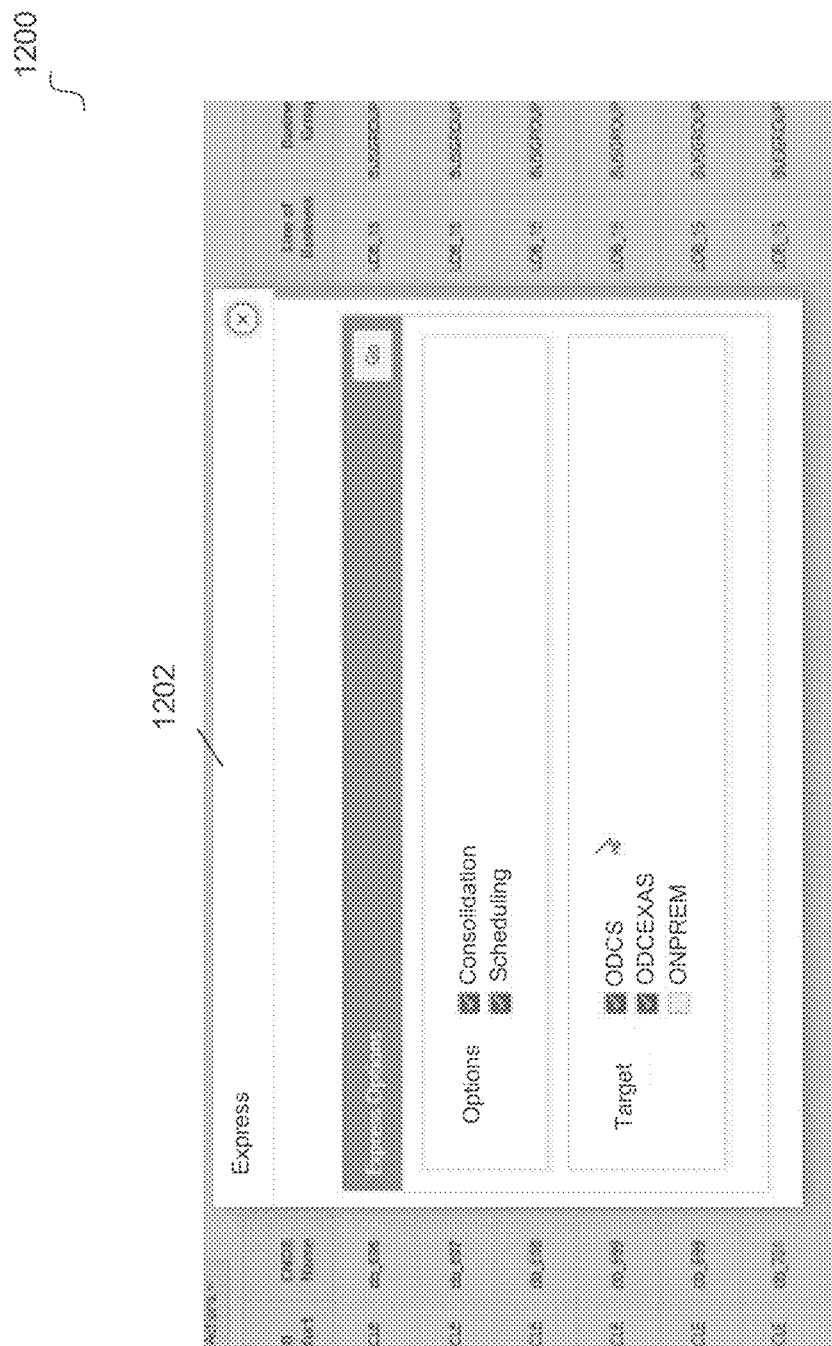
FIG. 12 illustrates a sample software tool for planning a data migration using an express path according to an embodiment.

FIG. 12 illustrates a sample software tool for planning a data migration using an express path according to an embodiment. For example, software tool 1200 can include user interface 1202, which can be used to configure the express path. In some embodiments, the express path options that can be configured by user interface 1202 include options for the planned migration, such as the option to perform consolidation and/or scheduling, target system options, such as which hardware to expect when performing the data migration (e.g., Oracle® cloud database, Oracle® Exadata systems, on-premise databases, and the like), and any other suitable options. Once configured, user interface 1202 can be used to launch the express path (e.g., using a Go component), and a number of automated migration related functions can be performed, such as generation of a detailed schedule, consolidation of databases, mapping of target databases to target hardware, and the like.

In some embodiments, the express path can accomplish a planning phase of the data migration, and the next phase can include an execution phase of the data migration (e.g., provisioning of hardware and migration of the data). While the express path utilizes default rules, other embodiments can utilize user customized rules, for example for schedule generation and consolidation. These data migration related functions are further described below.

In some embodiments, a scheduling module schedules migration workload details for completing the migration tasks based on the overall estate. The scheduling module can include algorithms and graphical user interface ("GUI") applications for scheduling. A scheduling dependencies algorithm can establish relationships between source databases based on business contingency process ("BCP") dependencies, application dependencies, and/or replication dependencies.

In some embodiments, BCP dependencies can be defined based on certain parameters between source databases, such as replication dependencies, primary and standby relationships, and the like. In some embodiments, a unique number can be assigned to databases with BCP dependencies to one another, and this unique number can be stored in the participating databases. In this example, databases with the same BCP dependency number stored are dependent on each other. In some embodiments, certain databases, such as standby contingencies, can be assigned a BCP environment, and the corresponding database (e.g., production) can be identified based on a BCP dependency number (as described above) or other labeling (e.g., database name, such as [DB1, Production] and [DB1, BCP]).

In some embodiments, application and replication dependencies can be determined. For example, application and replication dependencies can be defined by a user marking dependencies using a user interface (e.g., GUI). In some embodiments, a unique number can be assigned to applications with dependencies to one another, and this unique number can be stored in the participating databases. In this example, databases with the same application dependency number stored are dependent on each other. In some embodiments, a unique number can be assigned to databases with replication dependencies to one another, and this unique number can be stored in the participating databases. In this example, databases with the same replication dependency number stored are dependent on each other.

In some embodiments, applications that have dependencies to one another can also include provisioning and/or migration priority levels that are equal (or that are adjusted to be equal) so that they can be migrated with or next to each other (e.g., according to a generated schedule). For example, when applications with different priorities are marked as dependent, the highest priority amongst them can be used such that the application with the lower priority is elevated to the higher priority.

In some embodiments, using default or custom rules, a scheduling prioritization algorithm evaluates the overall migration estate and prioritizes resources to provision and/or migrate. Priorities for applications can be defined, for example, using values from the loaded detailed questionnaire (e.g., the migration group). Adjustments can be automatically performed based on the provided (or based on updated) priorities.

In some embodiments, applications within a priority group can be arranged alphabetically, or based on some other value or metric. A priority number can be generated for each request where the lowest number is the first priority for completion and the highest number is the last to be completed. Databases and resources for the applications are prioritized within the application based on default or custom rules. In a sample implementation, example and development database for Application1 will be prioritized over the production databases for Application1 (for migration purposes). Overall groupings within a specific application can be illustrated by the following example:

Application
    Entire Application's Set of Databases
        Sub-Group A Environments
            Sub-Group B Environments
                Sub-Group C Environments Repeat for each application of Group 1 until application list is exhausted.

In some embodiments, using default or custom rules, resources for creation and/or migration can be scheduled by date and time using a calculated rate of migration (e.g., workload level). For example, a weekly workload can be represented by a weighted value assigned to request (e.g., migration task) and maximum weights allowed for that week. The weight definitions can be defined by default or custom rules. If the workload (weight) of a week is exceeded, the request work (e.g., migration task) is pushed into the next week; and on and on until there are no more requests to complete. Examples rules include: ensure maximum weighted value for a wave (week's) workload does not exceed thresholds; and ensure maximum quantity of provisioning or migrations does not exceed thresholds.

Figure 13:
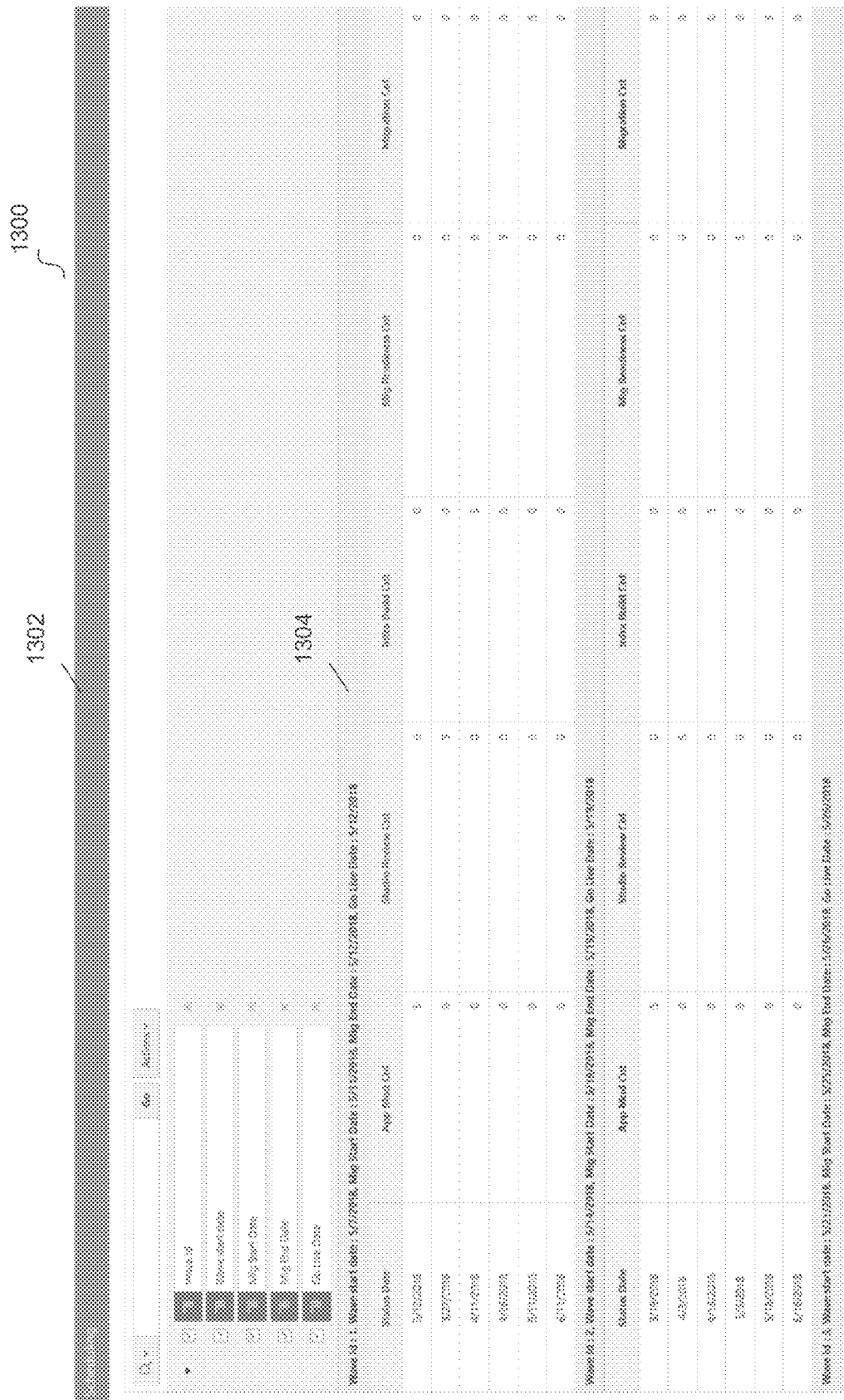
FIG. 13 illustrates a sample software tool for scheduling a data migration according to an embodiment.

FIG. 13 illustrates a sample software tool for scheduling a data migration according to an embodiment. For example, software tool 1300 can include user interface 1302, which can include schedule 1304. In some embodiments, schedule 1304 can be divided into waves (e.g., weeks) which include a start date and end date.

In an embodiment, the execution phase of the data migration can include a number of discrete sub-phases (e.g., application modernization, studio review, infrastructure build, migration readiness, migration, and post-migration). These execution phase sub-phases will be further detailed herein. With regard to generated schedule 1304, for each wave and/or a reference date (e.g., status date), schedule 1304 can list a number of databases at the particular sub-phase of the execution (e.g., 5 databases at the application modernization phase, and the like).

Figure 14:
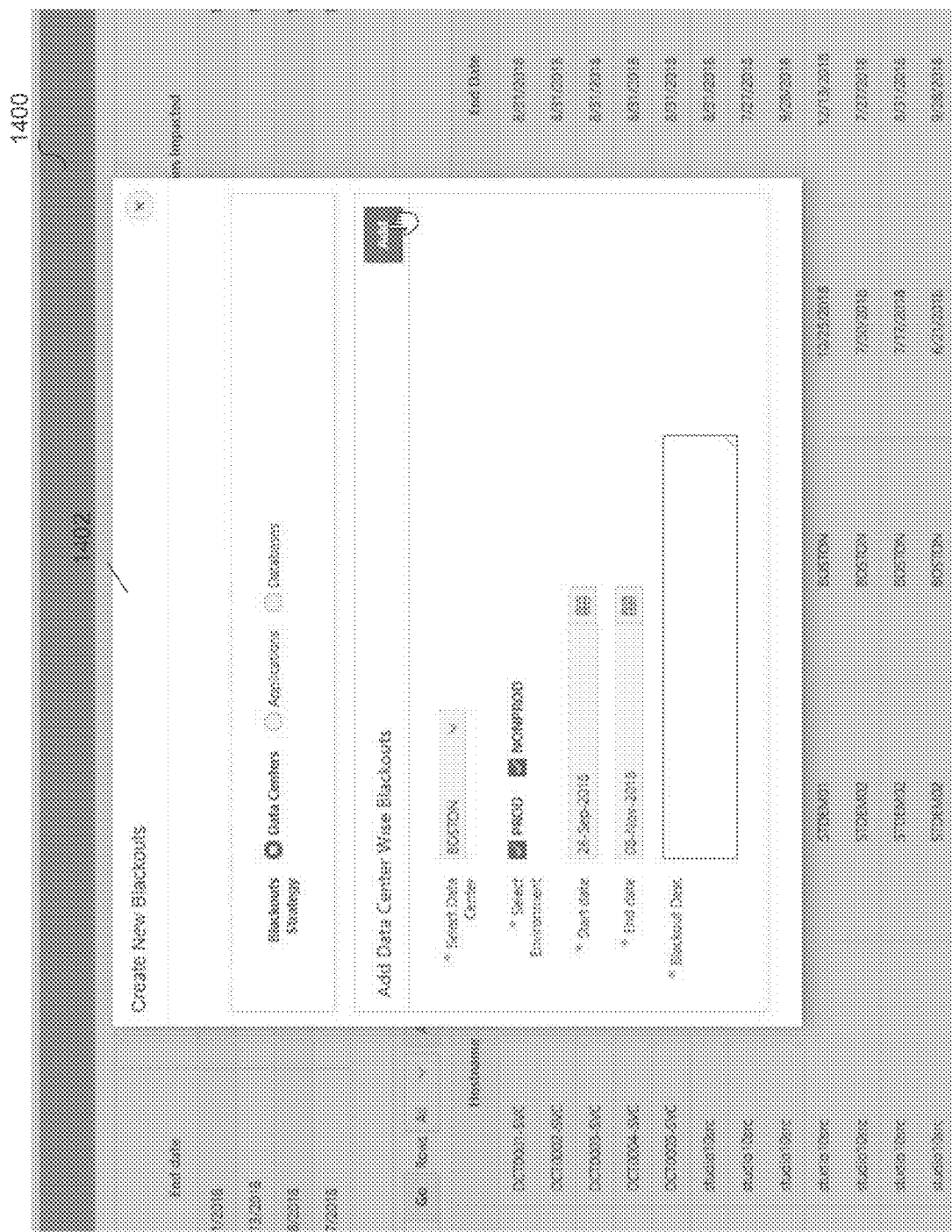
FIG. 14 illustrates a sample software tool for scheduling blackouts for a data migration according to an embodiment.

Embodiments of the software tool include one or more configuration user interfaces that can be used to configure the scheduling using customized rules. FIG. 14 illustrates a sample software tool for scheduling blackouts for a data migration according to an embodiment. For example, software tool 1400 can include user interface 1402, which can be used to configure blackout dates for the planned data migration. For example, blackout dates can be planned per data center (e.g., Boston), application, database, and any other suitable source system parameter. User interface 1402 displays blackout dates between Sep. 26, 2018 and Nov. 8, 2018, for both production and non-production databases from the Boston data center. Any other suitable combination of database information can be used to generate blackout dates. Once configured, user interface 1402 can be used to add (e.g., using an add component), the customized blackout rule to the software tool for use when scheduling.

Figure 15:
FIG. 15 illustrates a sample software tool for configuring scheduling parameters for a data migration according to an embodiment.

FIG. 15 illustrates a sample software tool for configuring scheduling parameters for a data migration according to an embodiment. For example, software tool 1500 can include user interface 1502, which can be used to configure scheduling parameters for planning the database migration. For example, elements of user interface 1502 can be used to input or edit (e.g., edit default values) parameters that define a start date for the planned migration, a number of environmental groupings (e.g., production, non-production, and the like), whether to include application and/or replication dependencies when scheduling, and period of time definitions for execution phase sub-phases (e.g., 60 months prior to migration for application modernization, 45 months prior to migration for studio review, and the like). These parameters can further be used by the customizable rules to generate a migration schedule.

Figure 16:
FIG. 16 illustrates a sample software tool for configuring scheduling weights and limits for a data migration according to an embodiment.

FIG. 16 illustrates a sample software tool for configuring scheduling weights and limits for a data migration according to an embodiment. For example, software tool 1600 can include user interface 1602, which can be used to configure weights and limits for planning the database migration. For example, elements of user interface 1602 can be used to input or edit (e.g., edit default values) limits (e.g., thresholds) for a database migration, including a limit for number of databases for migration during a wave (e.g., period of time, such as a week) and a limit for an overall weight for a wave. Weights can also be defined for each source database based on the migration complexity of the database and environment (e.g., production or non-production). User interface 1602 displays weights for very simple, simple, average, complex, and very complex databases of both the production and non-production varieties.

In an embodiment, the overall weight limit represents a threshold for a sum of the weights for the databases migration in a given wave. For example, given the example illustrated in user interface 1602, if the databases for a given wave include non-production average complexity, non-production simple complexity, production average complexity, and production complex complexity databases, the weight for the wave would be 12 (2+1+4+5). As further described below, databases can be added to a wave until the sum of the weights for the wave's databases meets or exceeds the limit. These weights and limits can further be used by the customizable rules to generate a migration schedule.

Figure 17:
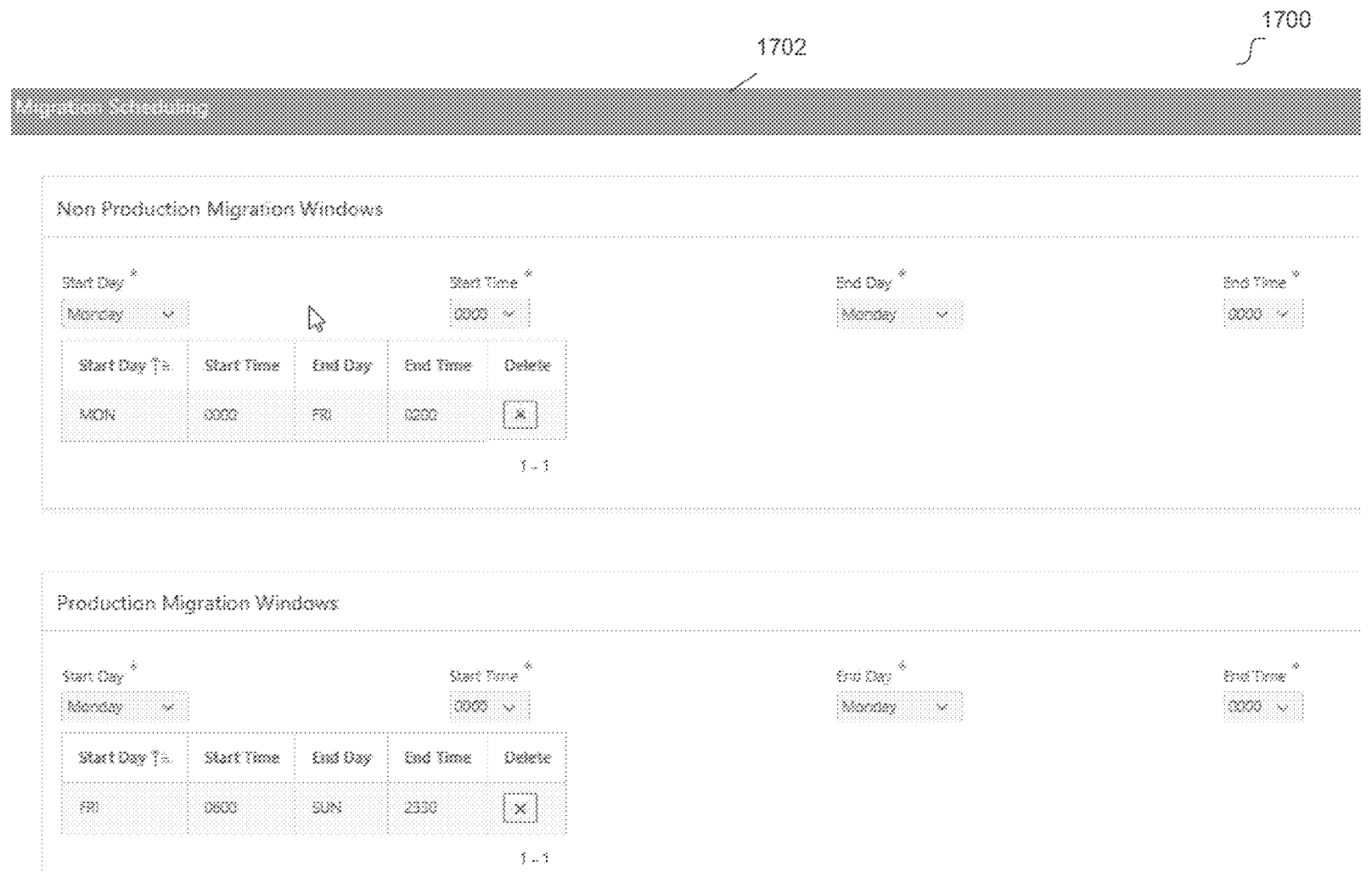

FIG. 17 illustrates a sample software tool for configuring migration windows for scheduling according to an embodiment. For example, software tool 1700 can include user interface 1702, which can be used to configure migration windows for databases, for instance, based on an environment for the database (e.g., production or non-production). For example, the migration windows can define one or more windows within a period of time (e.g., times within a week) over which migration of the specified database (e.g., production or non-production) can be scheduled. In the example illustrated by user interface 1702, non-production databases can be scheduled from Monday at midnight to Friday at 02:00 (e.g., over the weekdays) and production databases can be scheduled from Friday at 6:00 to Sunday at 23:30 (e.g., over the weekend). The elements of user interface 1702 can be used to delete migration windows, edit migration windows (e.g., edit default migration windows), and/or generate new migration windows.

In some embodiments, using the prioritization algorithm and the configuration details defined above, source databases can be fed into a time frame (e.g., weekly time frame) as follows:

1. Example default rules (or customized rules) can be defined as follows:

| Migration Type | | Migration Weight |
| --- | --- | --- |
| Non-Production | Very Simple | 1 |
| | Simple | |
| Non-Production | Average | 3 |
| | Complex | |
| | Very Complex | |
| Production | Very Simple | 4 |

-continued

| Migration Type | | Migration Weight |
| --- | --- | --- |
| Production | Simple | 5 |
| Production | Average | 8 |
| Production | Complex | 10 |
| Production | Very Complex | 12 |

| Weekly Workload Rule | Value |
| --- | --- |
| Maximum Workload Weight Allowed | 110 |
| Maximum # of Migrations Allowed | 35 |

2. Week X has no migrations assigned (e.g., weekly workload weight=0).
3. Loop
    a. Take the next prioritized migration candidate for Week X workload.
    b. Add the workload weight of migration candidate based on the Migration Type (listed in above table) to the week X's total workload weight.
    c. Does the week X workload exceed the defined maximum?
    d. Does the week X workload exceed the maximum quantity of migrations?
    e. If no to any of the above two questions then add the migration to week X's workload.
    f. If yes to any of the above two questions then do not add migration to week X's workload. Proceed to week X+1 and enter this loop again for Week X+1
4. Stop when all database migrations have been assigned to a week.

In some embodiments, dates can be assigned to each migration task/request during windows defined for production or non-production migrations. These windows can be defined using default or custom definitions. The customizable rules can also be defined to ensure blackout dates for specific migrations are honored by adjusting assigned dates to the first available window after any defined blackouts. Migrations subject to dependencies can be assigned migration dates to match their production counter-part dates.

In some embodiments, databases can be grouped based on their target infrastructure build date. Groups can include components, such as databases, and packages. Packages can include one or more of applications, databases, web servers, application servers, applications, database servers, databases, other types of storage, network resources, and the like. In some embodiments, databases can be grouped based on their target migration date.

Figure 18:
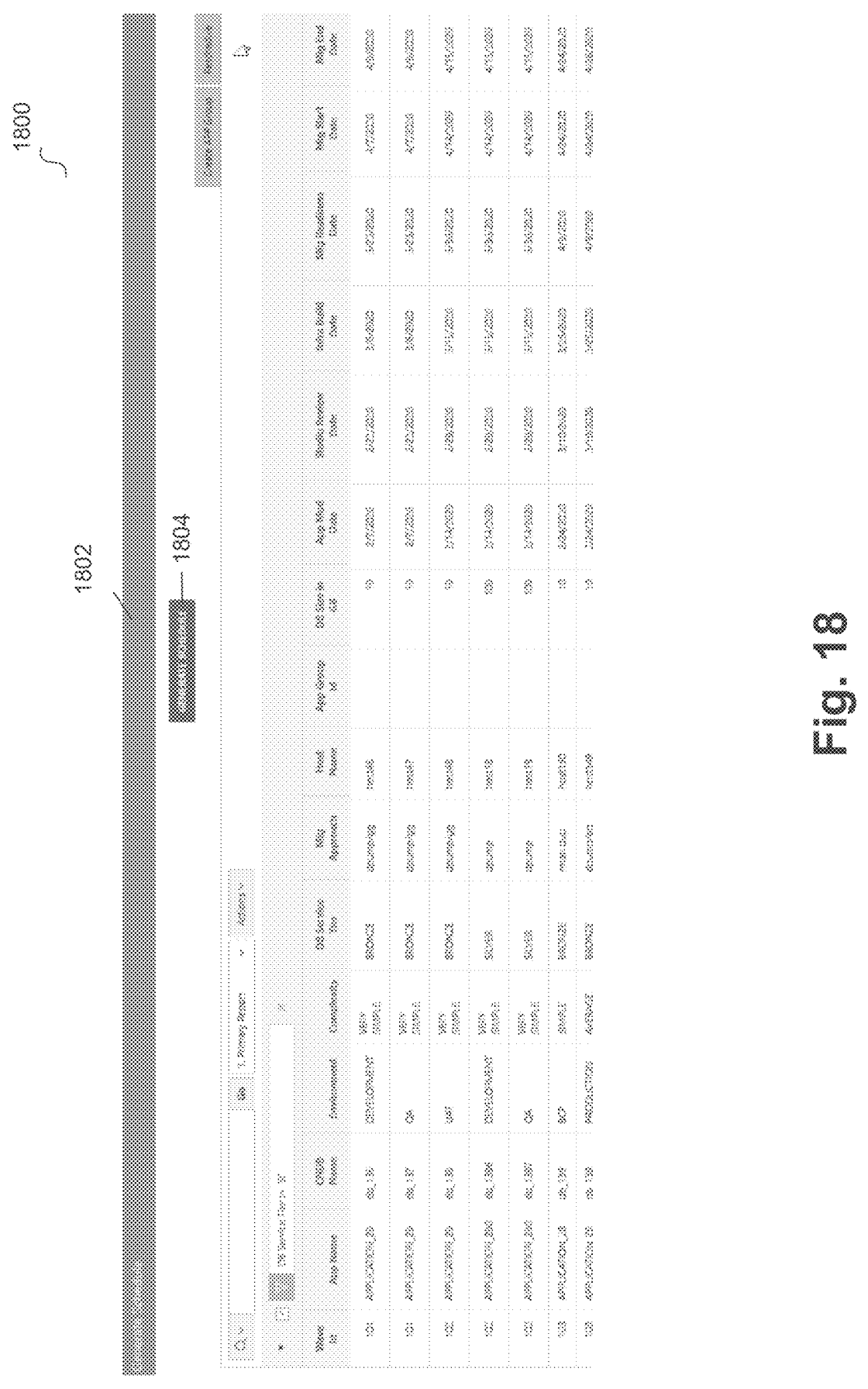
Figure 19:
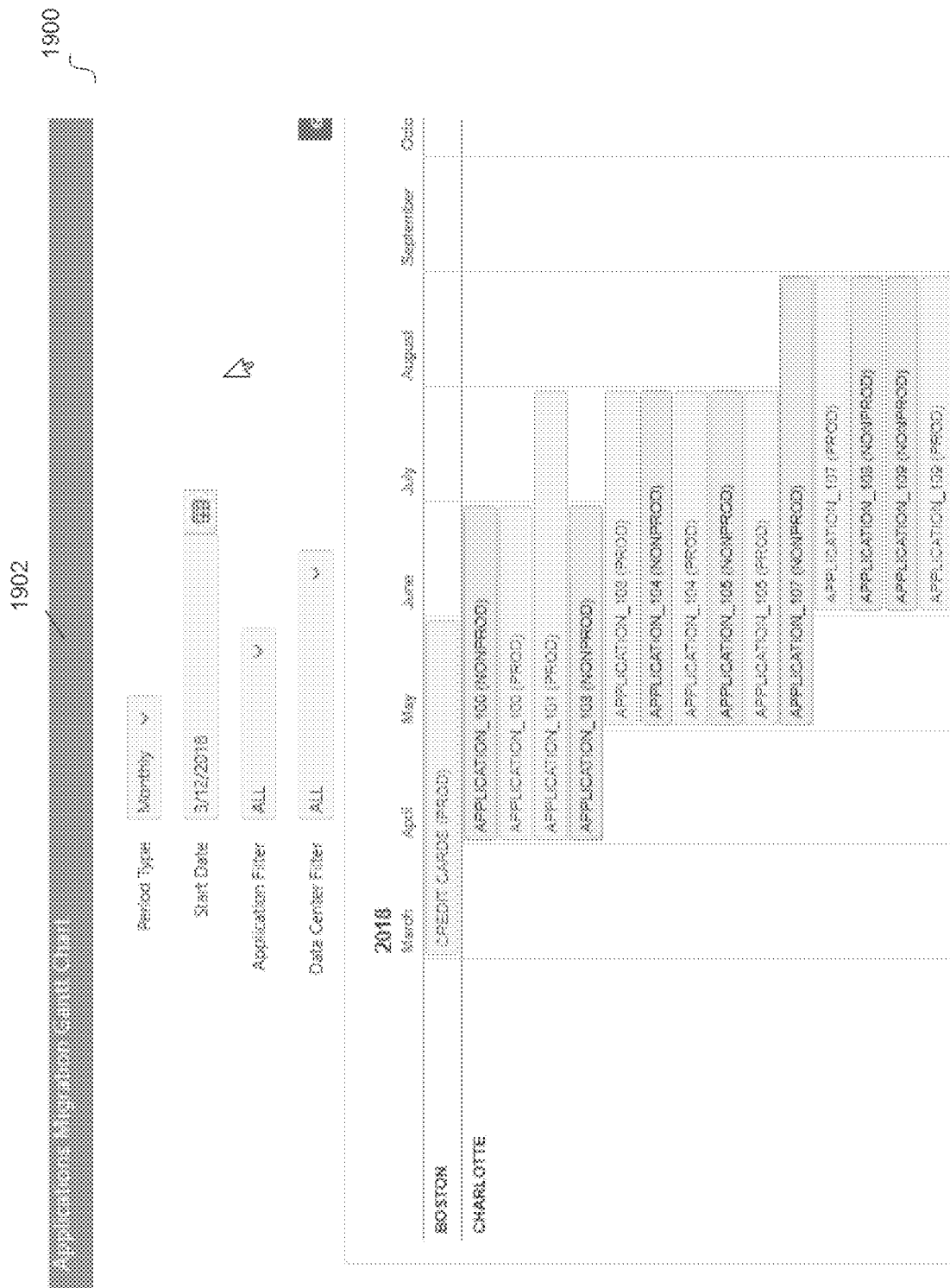
FIG. 19 illustrates a sample software tool for displaying a migration schedule as a chart according to an embodiment.

FIG. 18 illustrates a sample software tool for generating a migration schedule according to an embodiment. For example, software tool 1800 can include user interface 1802, which can include generate schedule component 1804. In an embodiment, once rules have been defined for the scheduling (or using the default rules) generate schedule 1804 can be used to assign migrations to specific waves (e.g., weeks) and specific times within the waves (e.g., times of the week that comply with any database blackout dates and migrations windows per database environment). In some embodiments, the migrations can be assigned to waves based on the above described algorithm. FIG. 19 illustrates a sample software tool for displaying a migration schedule as a chart according to an embodiment. For example, software tool 1900 can include user interface 1902, which can display a generated migration schedule as a chart (e.g., a Gantt chart).

In some embodiments, a consolidation engine receives the databases that have been loaded and classified by the load and classification engine, and consolidates and maps them to a target platform based on consolidation rules and capacity rules (e.g., default, predefined, and/or customized rules). The consolidation engine can consolidate/map to a number of platforms (e.g., ODBCS, Exadata cloud service and compute infrastructure service, on-premise platforms such as Exadata database machine, custom infrastructures, and any other suitable platform/database system). For example, the consolidation engine can perform planning and operation functions.

In some embodiments, the consolidation engine can run consolidation for the source databases and generate capacity analytics to determine whether there is sufficient capacity on the target platform to consolidate the source databases. If not, the consolidation engine can identify which databases and applications cannot be mapped and for what migration dates. In addition, the consolidation engine can determine additional hardware in order to complete the consolidation to the target platform.

In operation mode, the consolidation engine can run consolidation for individual source database groups according to a migration workflow. The output from consolidation engine can form the mapping of source database to the target platform with regard to:
1. The target container database ("CDB") and/or pluggable database ("PDB") names
2. The target database service tier
3. The target database shape (cpu/sga/number of RAC nodes)
4. The target database placement (on which compute nodes that database instances run)

FIG. 20 illustrates a sample software tool for configuring database consolidation according to an embodiment. For example, software tool 2000 can include user interface 2002, which can include editable configuration values for database consolidation. In an embodiment, user interface 2002 can include a data limit, depicted as 80, a consolidation strategy, illustrated as lift and shift (e.g., non-PDB), default target platform, illustrated as ODBCS, target archive log retention, and target database compression ratio, illustrated as 1.0. For example, the data limit can indicate how much storage space of a data store can be used by mapped databases (e.g., 80%, 85%, and the like).

In a sample implementation, where the data limit is 80%, a 10 GB database can take up 50% of a 20 GB data store. Thus, when mapping an additional database to the data store, a database up to 6 GB can be mapped since the aggregate of these mapped databases would take up 16 BG of the 20 GB data store (e.g., 80%). However, a database over 6 GB could not be mapped to the data store, as this would violate the 80% limit. As will be further described, if a database larger than 6 GBs was mapped, the consolidation engine would move to another data store for the mapping. As can be seen, an adjusted limit (e.g., 85%, 90%, and the like) can allow higher resource utilization, however also leaves less room for growth of the mapped databases. Because the rules of the consolidation engine are customizable, a user can edit the data limit to use resources efficiently based on the given circumstances. In some embodiments, consolidation configuration can also include a limit for CPU oversubscription (e.g., oversubscription threshold). For example, the CPU oversubscription limit can define an oversubscription value for hardware CPU (e.g., 110%, 115%, and the like).

In some embodiments, the consolidation strategy can be lift and shift or PDB. For example, lift and shift consolidation can include CDB groups and assignments based on these CDB. In another example, PDB consolidation can include customizable containers. In some embodiments, target database compression ratio can define a ratio of data compression for the migration (e.g., 1.0 is no compression, 2.0 reduces the size of the data by 50%, and the like).

In some embodiments, the output from the consolidation engine can generate the input for provision engine. In the case of PDB consolidation, the consolidation engine supports user defined/custom consolidation policies by software development life cycle, security zone, service tier, application, and other metrics. For target platform mapping, the consolidation engine supports multiple target platforms and data center consolidations.

Figure 21:
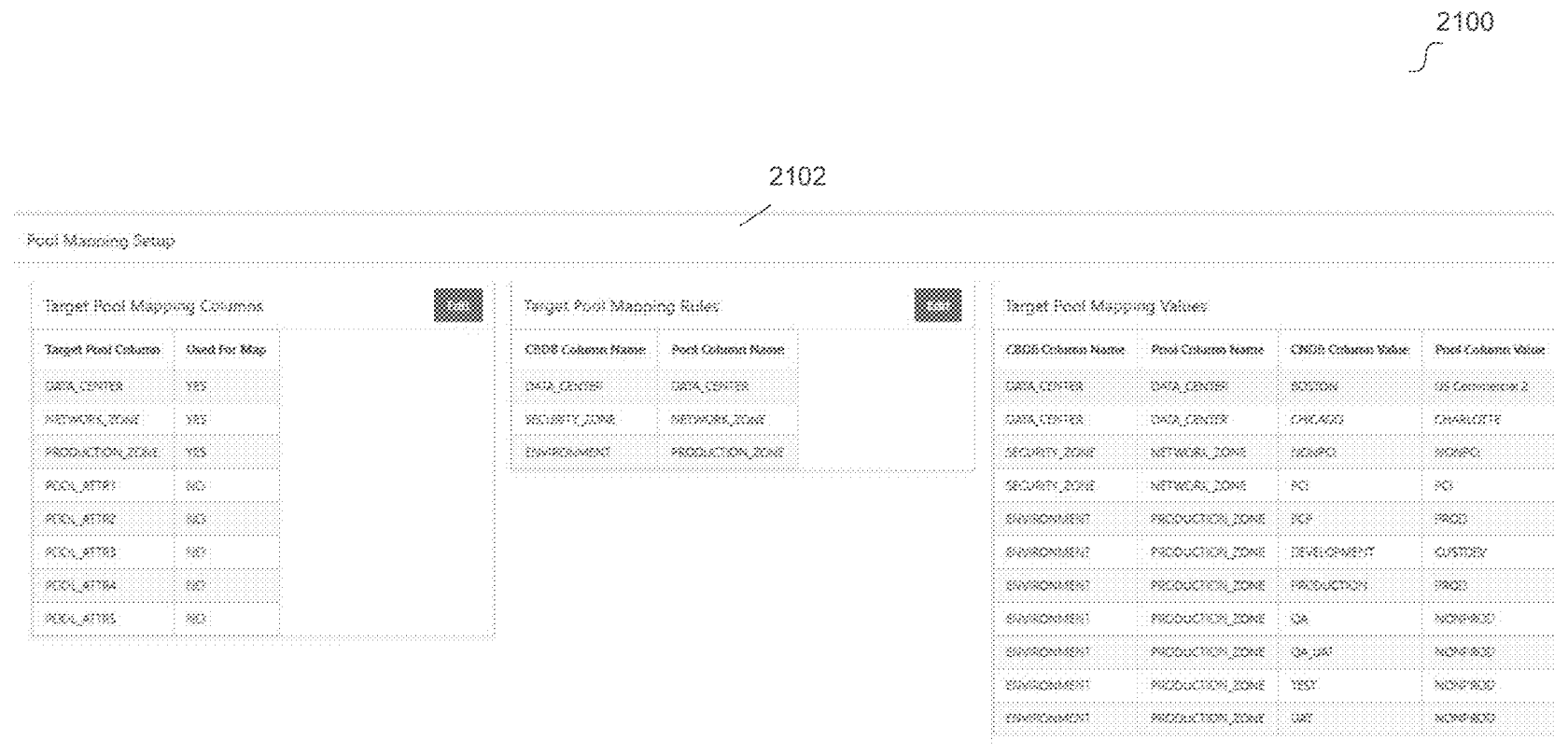

FIG. 21 illustrates a sample software tool for configuring database consolidation including pool mapping according to an embodiment. For example, software tool 2100 can include user interface 2102, which can include editable configuration values for database consolidation that uses pool mapping. In an embodiment, user interface 2102 can include editable target pool mapping columns, target pool mapping rules, and target pool mapping values.

In an embodiment, the target pool mapping columns can define the columns, or database parameters, that are used to map migration databases to defined pools. Target pool mapping rules can map CDB columns to pool columns. Target pool mapping values can define a mapping between CDB column values and pool column values.

FIG. 22 illustrates a sample software tool for configuring pluggable database consolidation ("PDB") according to an embodiment. For example, software tool 2200 can include user interface 2202, which can include editable configuration values for PDB database consolidation. In an embodiment, user interface 2202 can include editable container database mapping columns and container database mapping values.

In some embodiments, PDB consolidation can be a rule based engine that supports the consolidation policies (e.g., discrete functions defined in consolidation configuration tables). For example, PDB consolidation can be used in combination with pool mapping to generate containers defined by specific database parameters. For example, selected hardware can be labeled as containers with defined parameters (e.g., custom database parameters). Migrating databases can then be matched and mapped to corresponding containers based on resource limits for selected hardware (e.g., storage limits, CPU oversubscription limits, and the like).

In some embodiments, consolidation can involve pools of capacity (e.g., hardware) to which CDBs (or customizable containers) can be assigned. For example, the definitions for the pools of capacity can be configured using user interface 2102 of FIG. 21. Each CDB can include a list of attributes for the consolidation policy. A tuple of those attributes can define a CDB group. In some embodiments, the CDB group tuple can correspond to the attributes used to define pools of capacity (as depicted in FIG. 21). For example, the following three CDB attributes can be used for consolidation: data center, environment, and security zone. In this example, a tuple of CChicago, 'TEST', 'PCI') represents a CDB consolidation group. In this example, Chicago can represent the location of the data center, Test can represent the database environment (e.g., testing phase), and PCI can represent a security zone (e.g., Payment Card Industry ("PCI") Data Security Standard). Any other suitable data center locations, database environments (e.g., production, non-production, test, and the like), and security zone (e.g., PCI, non-PCI, and the like) can be implemented.

The consolidation policy can specify how a source database is mapped to a CDB group as specified by configuration tables. A source database with value ('Chicago','UAT', 'PCI') can be mapped to the above CDB group if the configuration table defines that 'UAT' is mapped to 'test' for CDB consolidation, as shown below:

| CDB Column Name | CDB Column Value | PDB Column Value |
|---|---|---|
| ENVIRONMENT | TEST | SIT |
| ENVIRONMENT | TEST | UAT |

User interface 2102 of FIG. 21 can also be used to configure the rules for capacity pool mapping. For example, user interface 2102 displays that the target pool mapping columns include the data center, security zone, and environment (e.g., tuple for defining a CDB group explained above), the target pool mapping rules for mapping CDB columns to the pool columns, and target pool mapping values that define how values of the CDB columns evaluate to values of the pool columns. Each of these definitions can be edited by a user to customize the pools of capacity and how source databases are mapped to the pools. The above table can reflect a mapping accomplished using the rules defined in user interface 2102.

In some embodiments, PDB consolidation can use customizable containers with customizable parameters, and the customizable containers can then be assigned to the pools of capacity. For example, user interface 2202 of FIG. 22 can be used to define parameters for customizable containers and mapping values that map container values to PDB values (similar to above). In other words, rather than using a CDB tuple and mapping the CDB tuple to a pool of capacity, PDB supports customizable containers and customizable rules for mapping the containers to pools of capacity. As illustrated in FIG. 22, the number of attributes and particular attributes used to define a PDB are customizable, as is the mapping between values for the given attributes (e.g., as shown for the Environment attribute in user interface 2202).

In some embodiments, a project impact analysis can determine whether there are enough hardware resources selected for the target to consolidate source databases. When enough target resources have not been selected, project impact analysis determines the migrations (e.g., source databases) that cannot be mapped and the dates for these migrations. This allows a project manager to assess potential project impact due to lack of resource.

Figure 23:
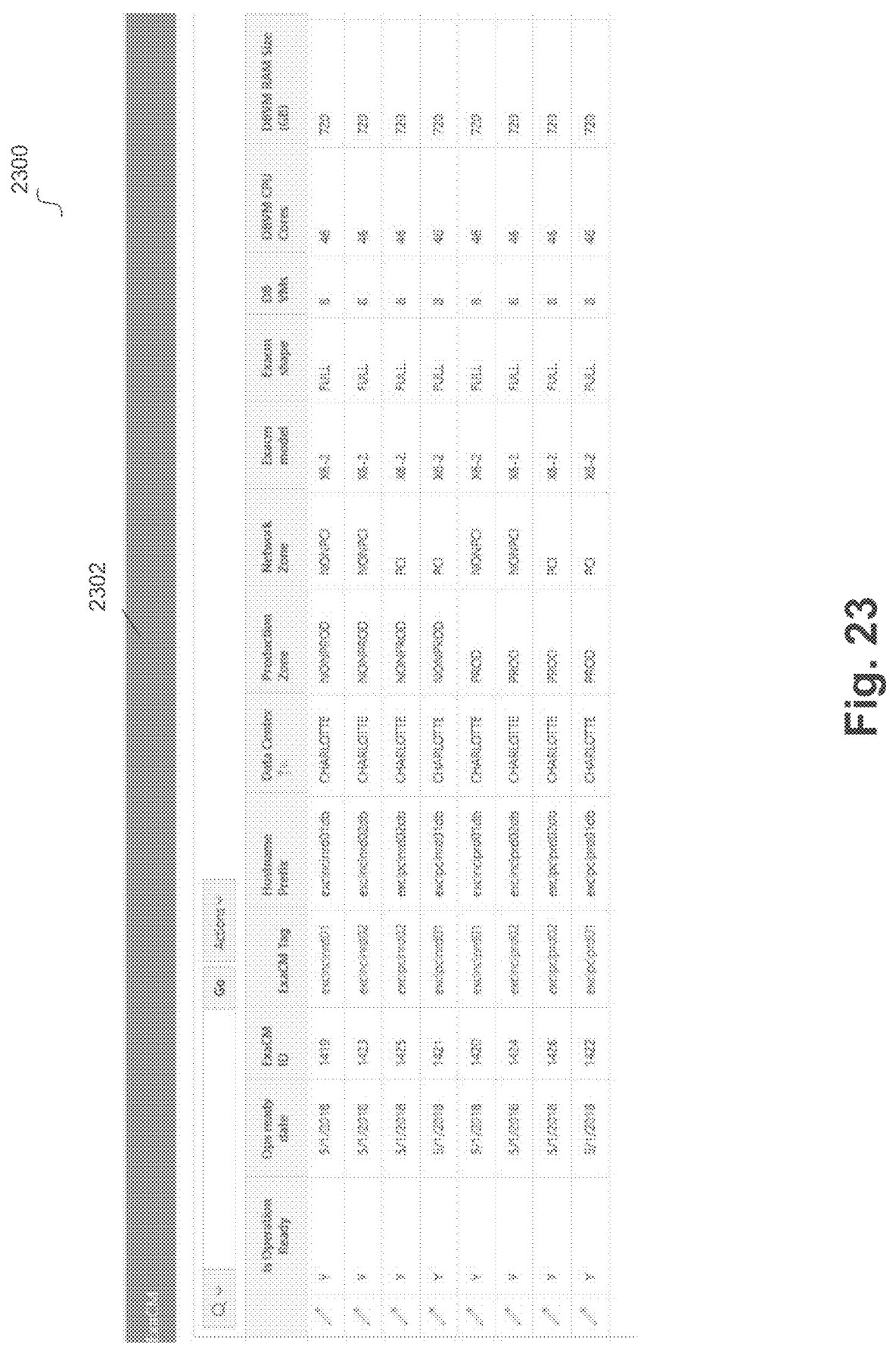

In some embodiments, a plurality of target hardware can be selected. FIG. 23 illustrates a sample software tool with selected target hardware according to an embodiment. For example, software tool 2300 can include user interface 2302, which can include selected target hardware for a data migration. The illustrated example includes ExaCM resources, but any other suitable type of hardware (or mix of multiple types of hardware) can be selected.

Figure 24:
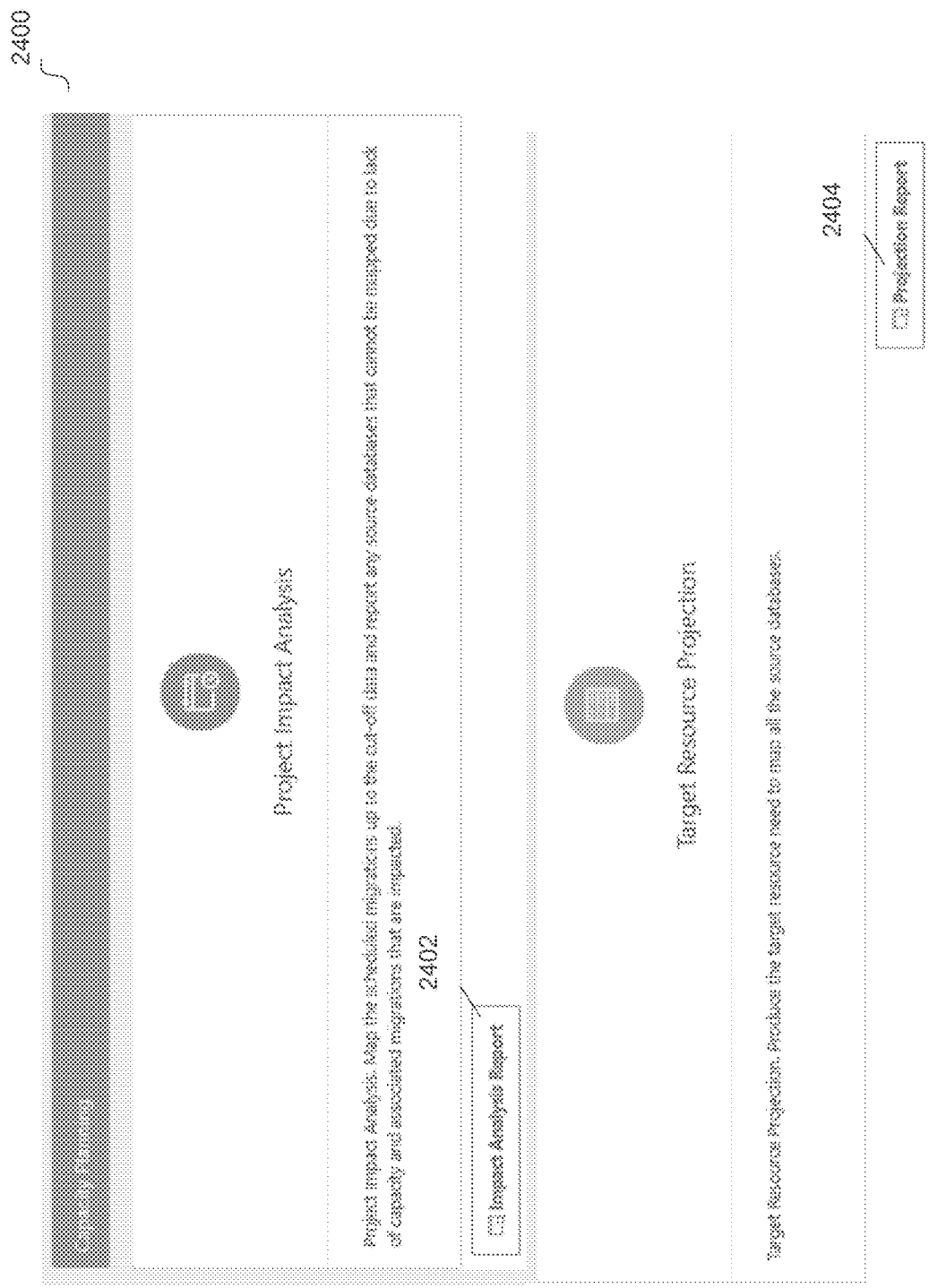
FIG. 24 illustrates a sample software tool for capacity planning according to an embodiment.

FIG. 24 illustrates a sample software tool for capacity planning according to an embodiment. For example, software tool 2400 can include impact analysis component 2402 and projection component 2404. Impact analysis component 2402 can be used to launch an impact analysis of selected hardware for the data migration while projection component 2404 can be used to launch a target resource projection for determining hardware suitable for a data migration.

The project impact analysis can work as follows:
a. Copy the current mapping result from "STUDIO" to "STUDIOAPL".
b. Consolidate the source databases that have not been mapped in the chronicle order of migration go-live date from earliest to latest until cut-off date;
c. Generate report of mapping result, which can be used by project manager for impact analysis In some embodiments, STUDIO APL, which is a copy of the current mapping, can be used to perform adjustments or changes to a migration. For example, the STUDIO mapping may be used by the migration engine to perform the migration related tasks, and thus changes to the STUDIO mapping may go into effect before they are finalized or agreed upon by the relevant parties. The STUDIO APL copy supports a project impact analysis with inputs that are not yet final, thus allowing planning and scenarios to be used when selecting a final change (e.g., final new hardware that is to be used in the migration). In some embodiments, data migrations can be performed over long periods of time (e.g., months or years) and thus final hardware many not all be selected at once, or other changes may come up over the migration period. The STUDIO APL can be used to generate reports (e.g., mappings) that indicate how changes (e.g., new hardware) impacts the migration.

Figure 25:
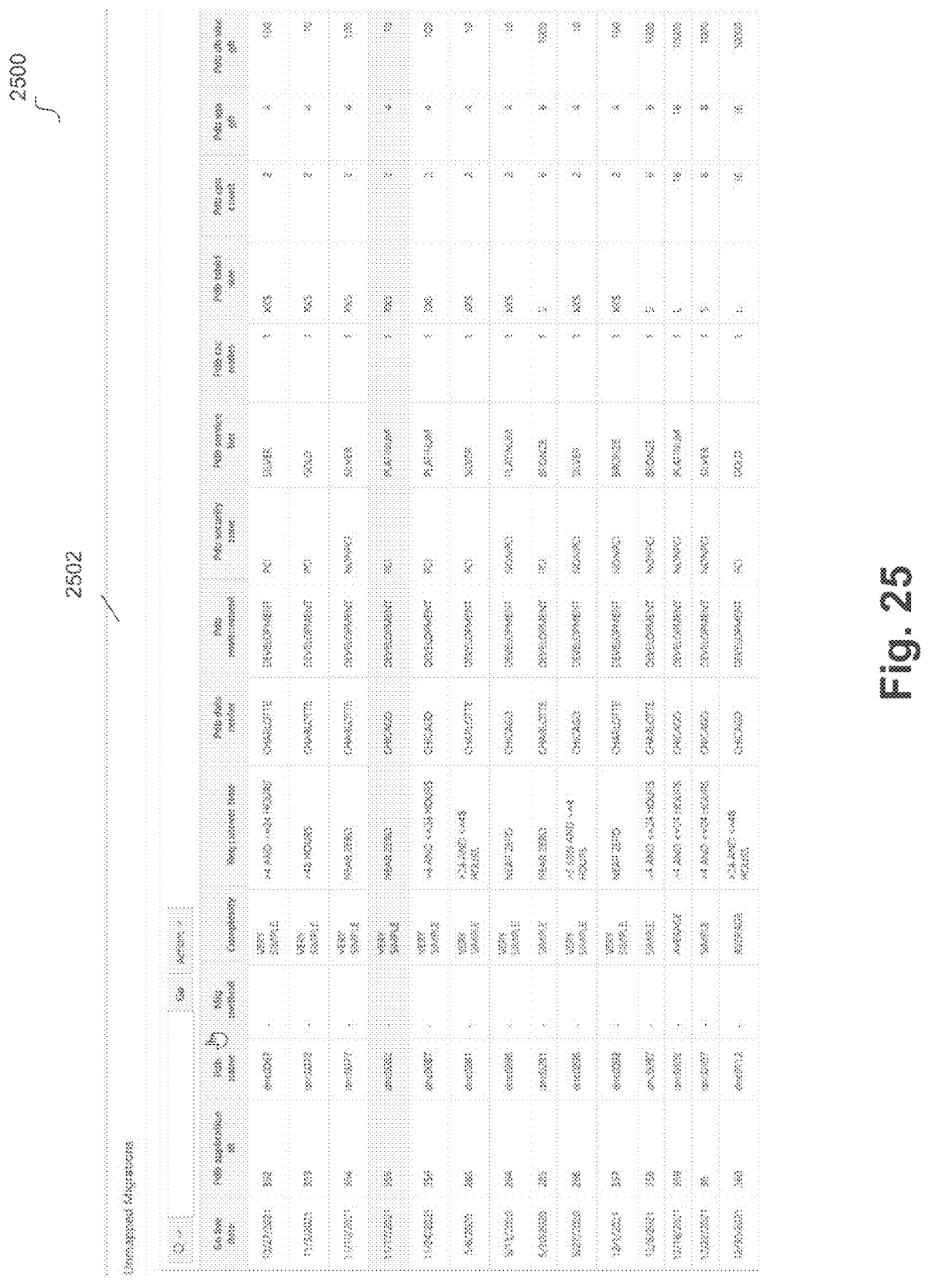

FIG. 25 illustrates a sample software tool for capacity planning results according to an embodiment. For example, software tool 2500 can include user interface 2502, which shows unmapped regions from a project impact analysis result. For example, project impact analysis can attempt to map migrating databases to target hardware. User interface 2502 displays unmapped migrations in the case where the selected target hardware is insufficient.

In cases where selected target hardware is found to be insufficient, various changes to the migration can be implemented. For example, changes to the consolidation rules (e.g., storage limits, CPU oversubscription, and the like) can increase the density at which databases are assigned to target hardware. However, these changes may result in performance compromises. In some embodiments, additional target hardware can be selected to account for the unmapped data migrations. For example, with reference to FIG. 24, projection component 2404 can be used to launch a target resource projection for determining hardware suitable for a data migration.

Figure 26:
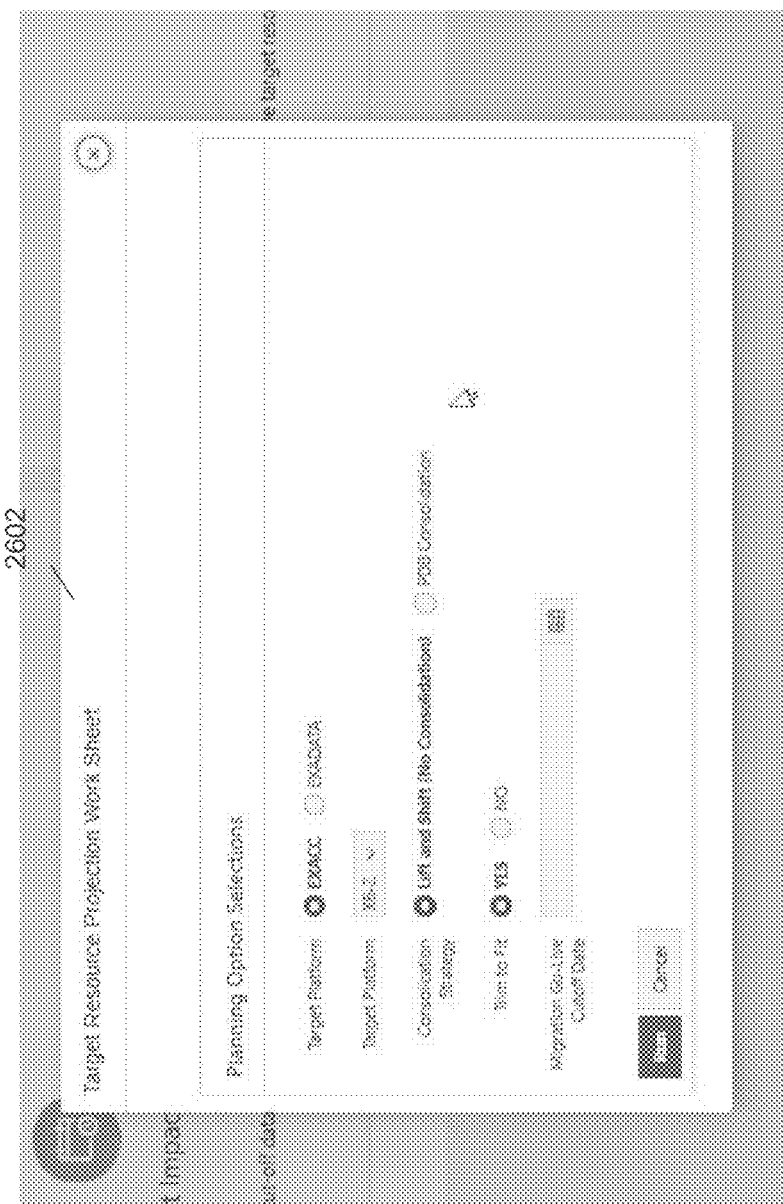
FIG. 26 illustrates a sample software tool for target resource projection according to an embodiment.

FIG. 26 illustrates a sample software tool for target resource projection according to an embodiment. For example, software tool 2600 can include user interface 2602, which includes components for configuring parameters of a target resource projection. For example, user interface 2602 can be used to select a target platform (e.g., ExaCC, ExaCS, ODBCS, sub-platforms of each, such as X6, and any other suitable target platform). A consolidation strategy can also be selected (e.g., lift and shift, PDB, and the like). In some embodiments, the consolidation used by the target resource projection can be similar (or the same) as the consolidation used to map migrating databases to target hardware previously configured, as discussed with references to FIGS. 20-22, 39A, and 39B. For example, consolidation can be configured for the migration as a whole (e.g., to map migrating databases to target hardware), and the configuration for this consolidation can also be used by the target resource projection to determine additional hardware. User interface 2602 can also be used to select a trim to fit option, which trims the selected hardware to a level that fits the determined resource need.

For example, Exadata hardware can include full rack (8 nodes), half rack (4 nodes), or quarter rack (2 node) options, with increasing numbers of compute nodes and storage sizes. When a new Exadata server is added by a resource projection, a full rack with maximum capacity can be initially added. After consolidation, it can be determined that less than a full rack of capacity has been utilized, and the reported new hardware can be trimmed to only the portion that is utilized (e.g., half rack or quarter rack). This functionality of finding the smallest Exadata is accomplished by trim to fit.

In some embodiments, target resource projection can work as follows:
 a. Copy the current mapping result from "STUDIO" to "STUDIOAPL".
 b. Consolidate the source databases that have not been mapped in the chronicle order of migration go-live date from earliest to latest;
 c. When a source database cannot be mapped due to lack of resource at target, a new target resource (e.g., Virtual Machine/Exadata/ExaCC) is added.
 d. Generate report of mapping result, including new target resource that are added to complete mapping.

In some embodiments, STUDIO APL, which is a copy of the current mapping, can be used to perform adjustments or changes to a migration. The STUDIO APL copy supports a target resource projection with inputs that are not yet final, thus allowing planning and scenarios to be used when selecting a final change (e.g., final new hardware that is to be used in the migration). In some embodiments, data migrations can be performed over long periods of time (e.g., months or years) and thus final hardware many not all be selected at once, or other changes may come up over the migration period. The STUDIO APL can be used to generate reports (e.g., mappings) that indicate how changes (e.g., new hardware) impacts the migration.

Figure 27:
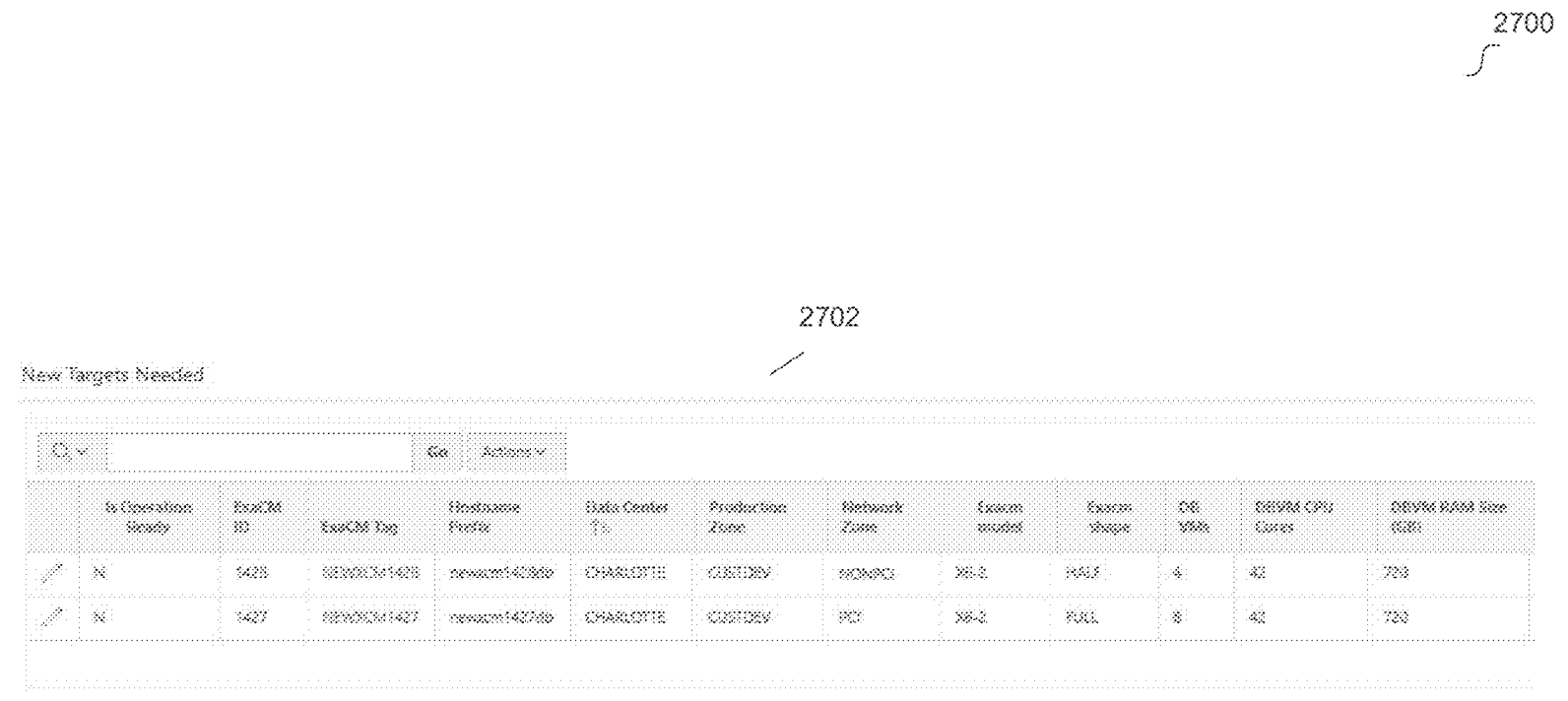

FIG. 27 illustrates a sample software tool for target resource projection results according to an embodiment. For example, software tool 2700 can include user interface 2702, which includes results for a target resource projection, including additional hardware that can be selected for the data migration. In the illustrated example, two Exadata computing machines are listed, one a non-PCI half rack machine and one a PCI full rack machine. User interface 2702 can be used to select these hardware resources and add them to the target hardware for the data migration.

In some embodiments, project impact analysis and target resource projection have a similar workflow. However, when a database cannot be mapped, project impact analysis will skip the unmapped database, and target resource projection will add new target resources to complete the mapping.

In some embodiments, a detailed target capacity calculation for applications can be initiated by providing (e.g., to the source system) a query that can retrieve the contents of applications that are registered (e.g., in an Oracle® Enterprise Manager Cloud Control database) into a comma separated file which can then be loaded into the sizing and costing engine. For example, this data can be loaded in a manner similar to the detailed questionnaire. Once loaded, the functionality of FIG. 37 can be performed to provide a detailed sizing of the target platform.

In some embodiments, a detailed target capacity calculation for databases is initiated by providing (e.g., to the source system) a query that will retrieve the contents of databases (e.g., in an Oracle® Enterprise Manager Cloud Control database) into a comma separated file which can then loaded into the sizing and costing engine. For example, this data can be loaded in a manner similar to the detailed questionnaire. Once loaded, the functionality of FIG. 38 can be performed to provide a detailed sizing of the target platform.

Figure 28:
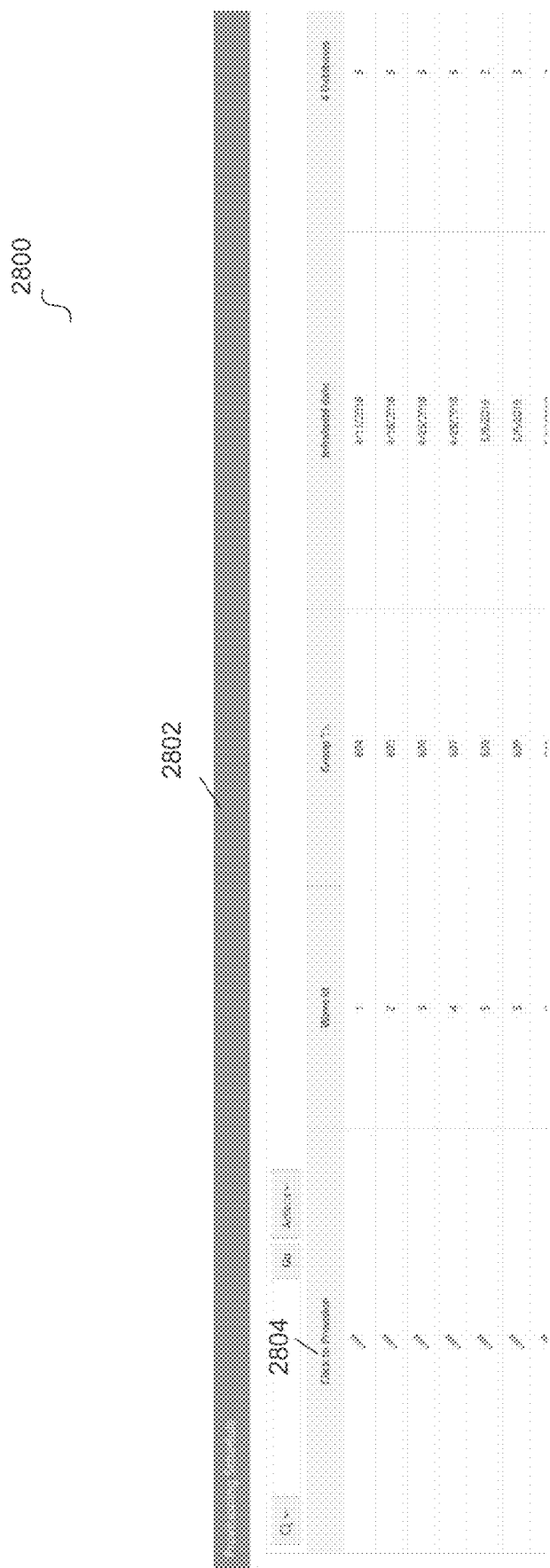
FIG. 28 illustrates a sample software tool for provisioning target hardware according to an embodiment.

In some embodiments, the provisioning engine is used to provision assets which are subsequently used for migration purposes downstream. The provisioning engine can performs the following:
 1. Obtain Provisioning State/package (group of technology to be provisioned)
 2. Build provisioning Payload
 3. Provision storage
 4. Provision network
 5. Provision server (App, Web, DB)
 6. Provision database
 7. Obtain provisioning status In some embodiments, the provisioning engine obtains data from the consolidation engine and transfers the data to the provisioning base tables to include the provisioning groups and state definitions. FIG. 28 illustrates a sample software tool for provisioning target hardware according to an embodiment. Software tool 2800 can include user interface 2802, which includes target hardware for provisioning, for example provided from the consolidation engine, and selection components 2804. User interface 2802 can also divide the target hardware into provisioning groups, for example based on migration waves and a timing for each wave. A schedule and/or workflow generated for the migration can determine a timing for provisioning of individual groups. In an embodiment, target hardware within a provisioning group can be automatically provisioned according to the generated schedule and/or workflow for the migration. A provisioning group can also be provisioned using the selection element 2804 for the provisioning group.

Figure 29:
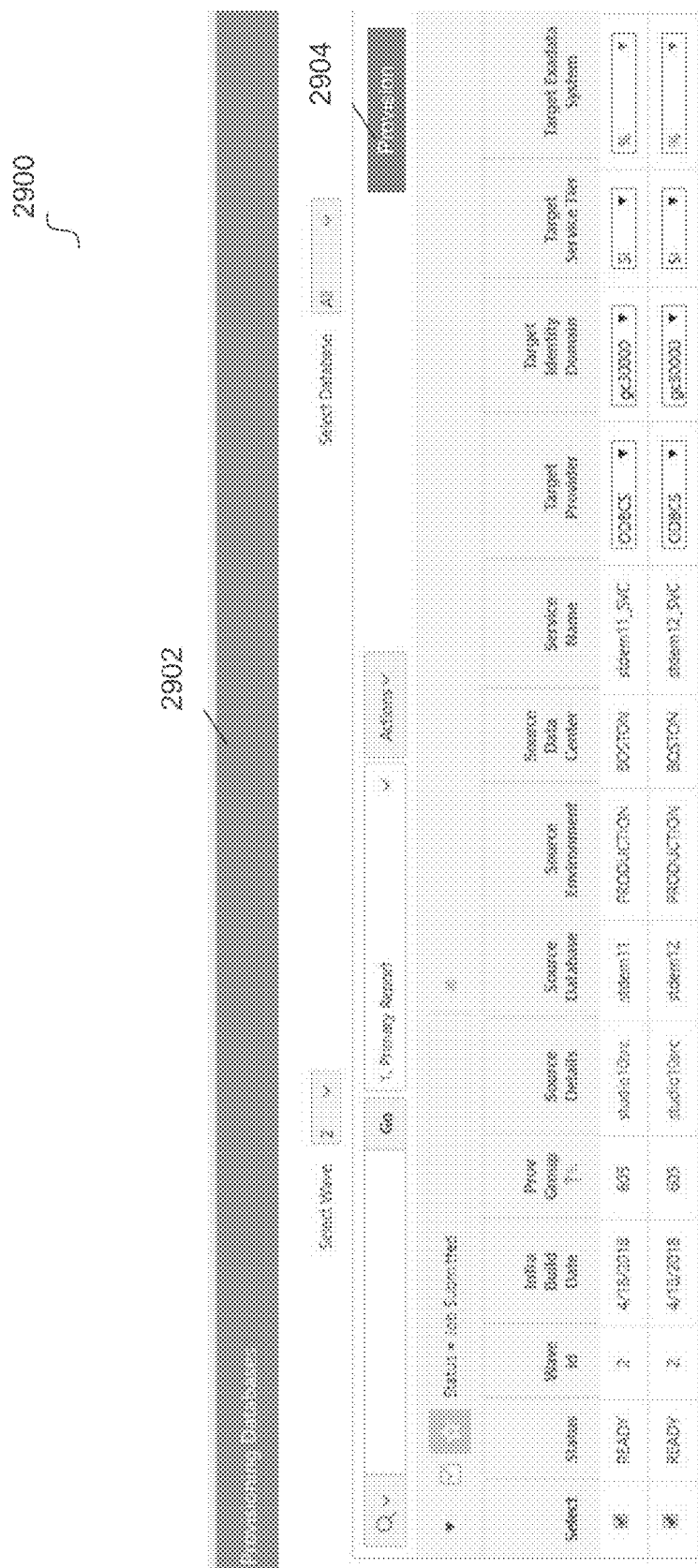
FIG. 29 illustrates a sample software tool for provisioning selected target hardware according to an embodiment.

FIG. 29 illustrates a sample software tool for provisioning selected target hardware according to an embodiment. Software tool 2900 can include user interface 2902, which includes target hardware for provisioning, for example based on a selected provisioning group (e.g., as selected using selection element 2804), and provisioning components 2904. User interface 2902 displays the target hardware within the select provisioning group(s), and selection elements within user interface 2902 can be used to select the individual target hardware. Provisioning element 2904 can be used to launch provisioning of the selected hardware.

Once launched, the batch provisioning of assets from the estate can be performed, for example as follows:
 1. The provisioning engine can obtain the provisioning state of the technology groups/packages (infrastructure components) to be provisioned (e.g., via the obtain provisioning state algorithm).
  a. Obtain Provisioning State
   i. Obtain Storage details and requirements
   ii. Obtain Network details and requirements
   iii. Obtain Database Server, CPU and Memory resource requirements
   iv. Obtain Service Tier requirements
   v. Obtain Application details
   vi. Obtain Application Server CPU and Memory resource requirements
   vii. Obtain Web Server CPU and Memory resource requirements 2. The provisioning engine can then build the provisioning payload from details in the load and classification, scheduling and consolidation modules using a build provisioning payload algorithm.
   a. Build Provisioning Payload
      i. Obtain provisioning state using obtain_provisioning_state algorithm per infrastructure component.
      ii. Build rest_api string per infrastructure component to be executed
3. The provisioning engine can then provision storage, networks, servers (app, database, web), and databases of which these algorithms can be referred to as provision_storage, provision_network, provision_server and provision_database. The status of the provisioning process can be obtained via the obtain_provisioning_status.
   a. provision_storage
      i. Call the Build Provisioning Payload function for infrastructure type storage,
      ii. Execute the provision storage algorithm.
         1. Execute payload
   b. provision_network
      i. Call the Build Provisioning Payload function for infrastructure type network,
      ii. Execute the provision network algorithm.
         1. Execute payload
   c. provision_server
      i. Call the Build Provisioning Payload function for infrastructure type server, subtype App, Web, DB,
      ii. Execute the provision server algorithm.
         1. Execute payload
   d. provision_database
      i. Call the Build Provisioning Payload function for infrastructure type database,
      ii. Execute the provision database algorithm.
         1. Execute payload
   e. obtain_provisioning_status
      i. Pass current job details to obtain_provisioning_status
      ii. Display provisioning status.

Figure 30:
FIG. 30 illustrates a sample software tool with provisioned target hardware according to an embodiment.

FIG. 30 illustrates a sample software tool with provisioned target hardware according to an embodiment. Software tool 3000 can include user interface 3002, which displays target hardware that has been provisioning, for example using the provisioning engine. The provisioned hardware can be used by the migration engine to perform the physical migration of data.

Figure 31:
FIG. 31 illustrates a sample software tool for migrating from a source system to a target system according to an embodiment.

In some embodiments, a migration engine can be used to migrate from the source system to the target system, including migrating applications and databases. The migration engine can:
1. Obtain migration estate (applications, databases)
2. Build migration payload
3. Migrate databases
4. Migrate applications
5. Obtain migration status In some embodiments, the migration engine can obtain data from the scheduling, consolidation modules, and the provisioning engines, and can prepare the assets (e.g., databases and applications) for migration. FIG. 31 illustrates a sample software tool for migrating from a source system to a target system according to an embodiment. Software tool 3100 can include user interface 3102, which includes migration data, for example broken into migration waves, and selection components 3104. A schedule and/or workflow generated for the migration can determine a timing for migration of individual migration groups. In an embodiment, source data can be automatically migrated according to the generated schedule and/or workflow. A migration group can also be migrated using the selection element 3104 for the migration group.

Figure 32:
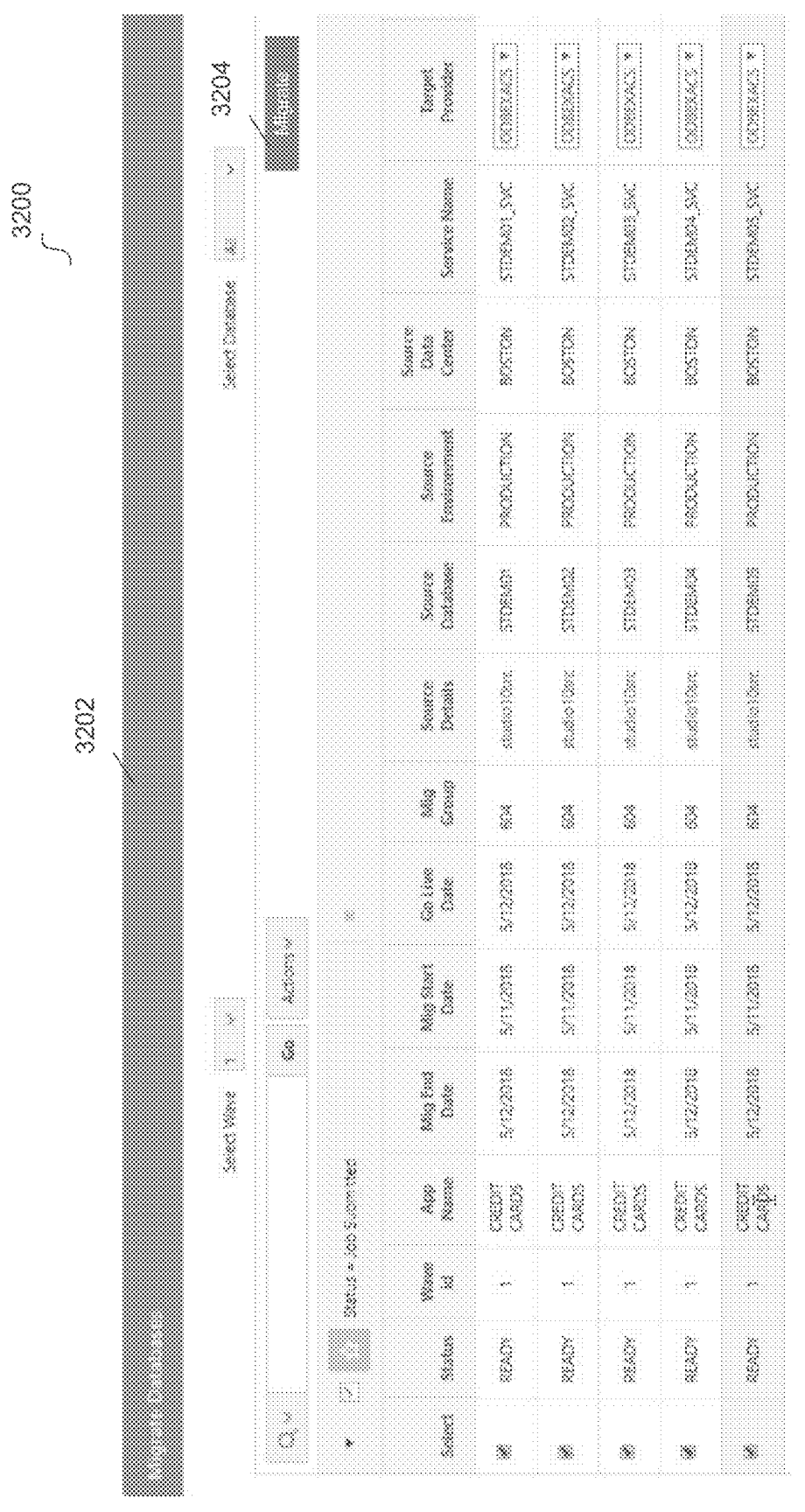

FIG. 32 illustrates a sample software tool for performing selected migrations according to an embodiment. Software tool 3200 can include user interface 3202, which includes source system data for migration (e.g., databases, applications, and the like), for example based on a selected migration group (e.g., as selected using selection element 3104), and migration components 3204. User interface 3202 displays the individual data migrations within the select migration group(s), and selection elements within user interface 3202 can be used to select the individual migrations. Migration element 3204 can be used to launch the selected migrations.

Once launched, the batch migration of assets for the estate can be performed as follows.
1. The migration engine can obtain the state of the technology groups to be migrated (e.g., via the obtain migration state algorithm).
   a. Obtain Migration State
      i. Obtain Migration Technical Details
      ii. Obtain Migration Date
      iii. Obtain Migration Method
2. The migration engine can then build the migration payload using data from the load and classification, scheduling and consolidation modules along with the provisioning engine.
   a. Build Migration Payload
      i. Obtain migration state using obtain_migration_state algorithm.
      ii. Build rest_api string per migration technical details and method.
3. The migration engine can then migrate applications and databases of which these algorithms can be referred to as migrate_application and migrate_database. The status of the migration process can be obtained via the obtain_migration_status. The details of these algorithms are as follows.
   a. Migrate_application
      i. Call the Build Migration Payload function per migration technical details
      ii. Execute the migrate applications algorithm.
         1. Pass migration payload to a server (e.g., nodejs server)
         2. Login to source application server (e.g., via Terraform)
         3. Obtain application source code and backup to storage (e.g., NAS storage)
         4. Copy application code to target
         5. Migrate application into target
   b. Migrate_database
      i. Execute the migrate database algorithm.
         1. Pass migration payload to the server (e.g., nodejs server)
         2. Login to source database server (e.g., via Terraform)
         3. Export/XTTS/Dpump database data and backup to storage (e.g., NAS Storage)
         4. Copy database data to target
         5. Migrate database into target
   c. Obtain_migration_status
      i. Pass current job details to obtain_migration_status
      ii. Display migration status.

In some embodiments, multiple migration scripts support multiple migration approaches (e.g., migrations methods).

For example, and as described above, a migration approach can be determined by many factors, such as source database size, server platform, and allowable downtime for migration, and the like. During actual migration, the migration scripts can take inputs from the consolidation engine and provisioning engine, which can indicate target databases, servers, and/or hardware that the define where to migrate data.

Figure 33:
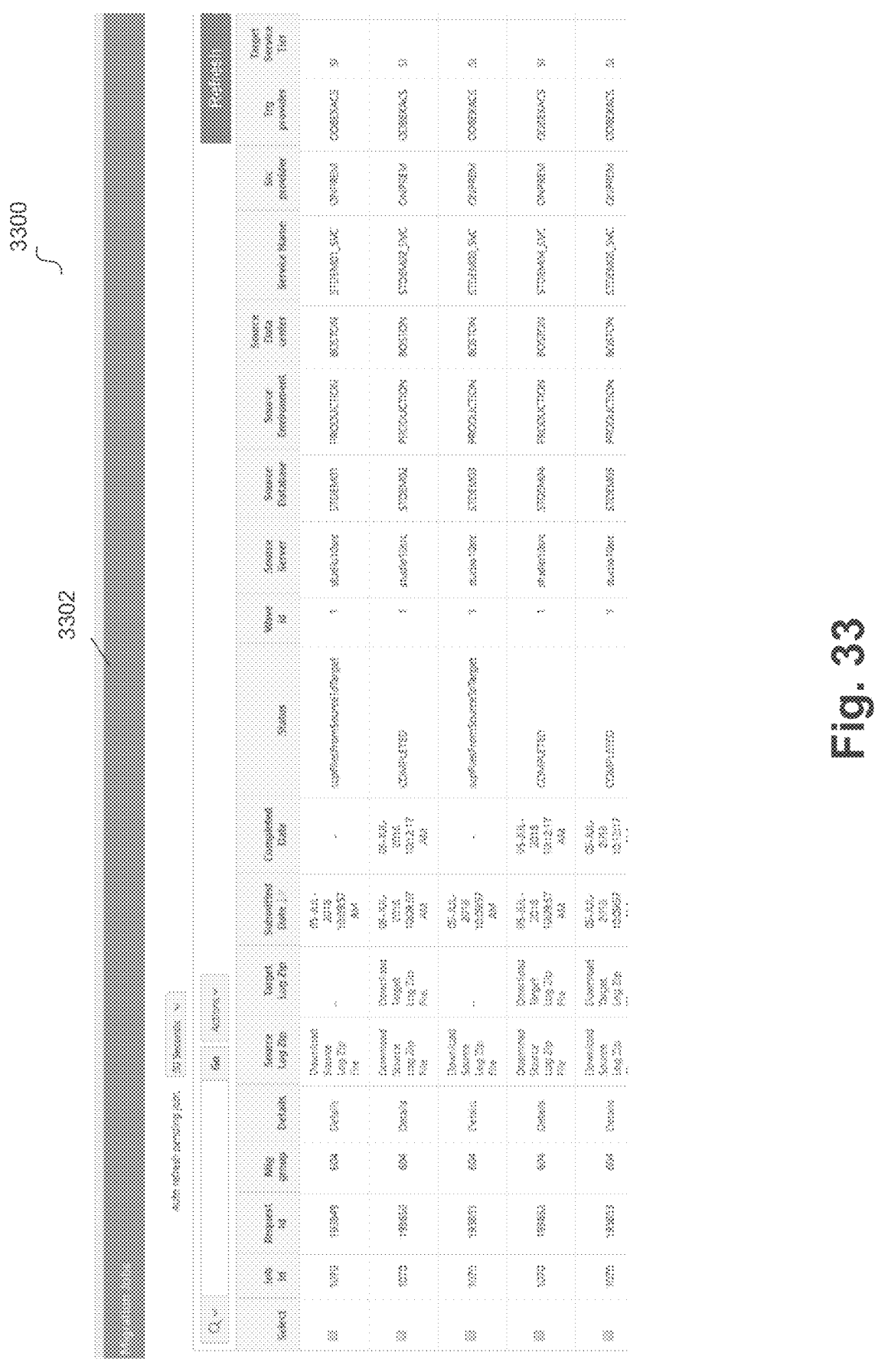

FIG. 33 illustrates a sample software tool with data migrations according to an embodiment. Software tool 3300 can include user interface 3302, which displays the status of data migrations. For example, one or more migrations can be launched (e.g., using migration element 3204) and user interface 3302 can display that status of the migration (e.g., status of the batch migration).

In some embodiments, the migration can be broken into two phases, planning and execution, and the execution phase can be performed and/or monitored using a workflow engine. For example, the workflow engine can include a workflow for performing the migrations according to the generated schedule. In other words, the workflow engine can be used to manage relevant tasks in the execution phase of a project. In some embodiments, a workflow engine can obtain data from the current workflow and bump the status to the next phase of the workflow using the bump_workflow algorithm.

Figure 34:
FIG. 34 illustrates a sample software tool with a migration workflow according to an embodiment.

Once tasks have been executed in the estate engineering and planning engine, records can be set to the application modernization status which allows for the following functionality:
1. Initiate Application Modernization
   a. Schedule Review
   b. Inventory Review
   c. Application & Database Review
   d. Certification Review
   e. Business Continuity Review
   f. When completed, bump to Studio Review calling the bump workflow algorithm
2. Studio Review
   a. Technical Details Review
   b. Migration Review
   c. Performance Review
   d. Consolidation review and Physical Mapping (source to target)
   e. When completed, bump to Infrastructure Build calling the bump workflow algorithm
3. Infrastructure Build
   a. Review Provisioning Groups and State using the obtain_provisioning_state algorithm.
   b. Provision assets using the build_provisioning_payload, provision_network, provision_storage, provision_server, provision_database algorithms
   c. Review provisioning status via the obtain_provisioning_status algorithm.
   d. When complete, bump to Migration Readiness calling the bump workflow algorithm
4. Migration Readiness
   a. Review Migration Architecture
   b. Review Migration Considerations
   c. When complete, bump to Migration calling the bump workflow algorithm
5. Migration
   a. Review Migration Groups and State via the obtlna_migration_state algorithm.
   b. Migrate Databases and applications by calling the migrate_applications and migrate_databases algorithms.
   c. Review Migration status via obtain_migration status algorithm.
   d. When complete, bump to Post Migration calling the bump workflow algorithm
6. Post Migration
   a. Review application and database performance for migration group.
   b. Build proactive performance report FIG. 34 illustrates a sample software tool with a migration workflow according to an embodiment. Software tool 3400 can include user interface 3402, which include application modernization component 3404, studio review component 3406, infrastructure build component 3408, migration readiness component 3410, migration component 3412, and post migration component 3414. For example, any of components 3404, 3406, 3408, 3410, 3412, and 3414 can be used to launch a user interface for performing and/or monitoring the above functionality for each sub-phase of the workflow.

Embodiments include software tools that can be used to plan and execute an end-to-end migration from a source system to a target system using various levels of automation. Technical improvements that relate to one or more of source classification, target database determination, target hardware analysis and/or recommendation, target hardware mapping, scheduling, provisioning, and physical migration achieve an efficient yet customizable solution previously unavailable.

In some embodiments, the classification of source databases to predetermined sizes (e.g., t-shirt sizes) generates an efficient implementation downstream in the migration process. For example, without these standardized sizes, databases can take a variety of sizes, creating a large number of differently sized components, which can be inefficient to consolidate, map, schedule, and migrate. In addition, the standard sizes can provide databases and/or mapped hardware with room to grow, thus providing a practical solution to one of the problems generated by complex migrations. Embodiments further realize a consolidation flow that leverages the efficiency benefits of the standardized sizes. For example, the disclosed capacity pools, CDB groups, and/or custom containers (e.g., PDBs) can provide an efficient database to hardware mapping based on these sizes. In some implementations and embodiments, thousands of source databases can be loaded, classified, consolidated, provisioned, schedule, and migrated. Thus, the efficiency benefits can produce significant resource savings.

In some embodiments, source classification can be achieved using different levels of information granularity. For example, a statistical migration estate can be determined using the statistical questionnaire (as previously described), while a detailed migration estate can be determined using the detailed questionnaire (as previously described). Based on the classified source system and/or determined migration estate, source applications and databases can be mapped to target applications and databases.

For example, a source application can be mapped to a target application capacity (e.g., resource needs of the target application corresponding to the source application). In some cases, adjustments can be performed based on a resource metric for the source. Some embodiments including determining and/or retrieving resource metrics for hardware (e.g., source hardware and/or target hardware). For example, resource metrics for a given piece of hardware can be used to indicate certain specifications about the hardware (e.g., performance).

In some embodiments, a resource metric value can be a unitless value that indicates a hardware's capabilities. For example, testing can be performed on a type of hardware (e.g., brand, model, sub-model, and any other fine grain indication of hardware type), where one or more software applications are executed on the hardware and performance of the hardware can be measured. The applications can include benchmark software applications for performance testing, as implemented by one of ordinary skill in the art. In other examples, the applications can be similar to the applications that run on the source system or applications expected to run on the target system (e.g., one or more of database management system software, accounting software, inventory management software, and the like). In some embodiments, the resource metric value can be indicative of a hardware's measured performance when executing one or more of these applications.

Embodiments can use determined or retrieved resource metrics to compare hardware of different types, as further described below. For example, resource metrics can be calculated for a plurality of hardware types, and the calculated values can be stored. Embodiments can retrieve these stored resource metrics based on the source and/or target hardware types.

Figure 35:
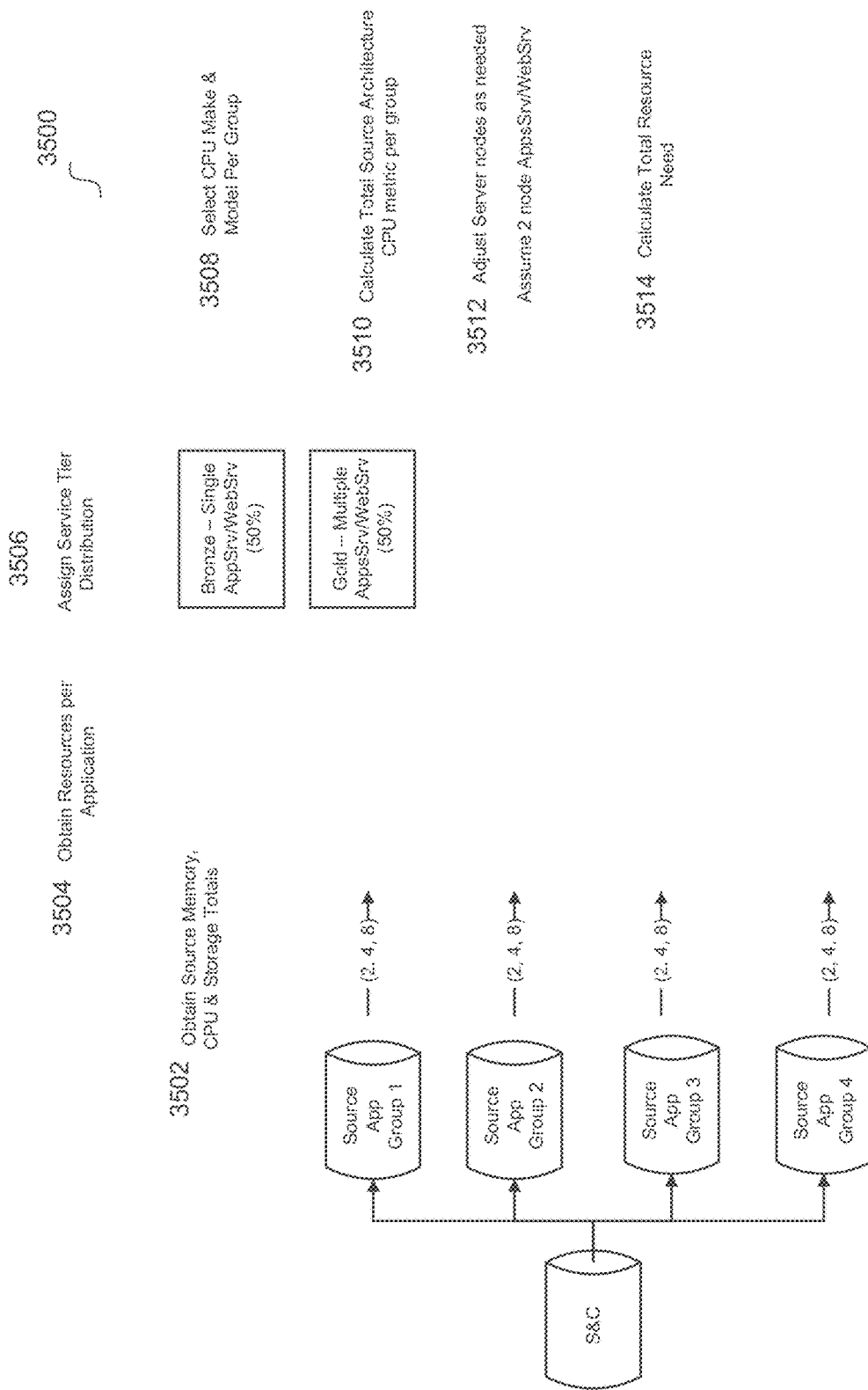
FIG. 35 illustrates a flow diagram for determining resource requirements of target applications based on source applications according to an example embodiment.

FIG. 35 illustrates a flow diagram for determining resource requirement of target applications based on source applications according to an example embodiment. In one embodiment, the functionality of FIGS. 35-42 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 35-43 can be performed by one or more elements of system 200 of FIG. 2.

At 3502, source information about one or more source applications can be obtained. In an embodiment, a source application can include one or more web servers/application servers used to host or otherwise execute an application. Statistical information about the source system can be loaded to embodiments of the software tool using a statistical questionnaire. The statistical information can include memory utilization by a source application, CPU utilization for a source application, storage requirements for a source application, and any other suitable information.

In some embodiments, resource requirements can be determined for a plurality of source applications. For example, FIG. 35 illustrates four groups of source applications (each group containing one or more applications) for which resource requirements can be determined.

At 3504, resources for the source applications can be obtained. For example, resources for each source application (e.g. source application group) can be obtained. In an embodiment, the resources per application (or application group) can obtained based on resources for web servers and/or application servers that implement the source applications.

In some embodiments, applications can include sub-applications within them (e.g., suites). Embodiments can retrieve resource usage from the loaded statistical information for application suites (e.g., CPU, memory, and the like) and then obtain the resources per sub-application (e.g., CPU, memory, and the like). In these embodiments, a breakdown of the sub-applications can be maintained in the event that certain sub-applications or components are migrated to different hardware components. For example, a webserver can be moved to another server, away from the application, and the application can be placed on a separate application server.

In some embodiments, scripts (e.g., a software utility that executes scripts on the source system) can be used to determine and/or verify the statistical information. For example, the resources per application group, application, and/or sub-application can be determined based on execution of one or more scripts on the source system, as described herein. When these scripts verify the statistical information, embodiments can continue using the information unchanged. When the statistical information is not verified (e.g., the scripts return different information), embodiments can prioritize the resource information returned by the scripts and utilize this information for the determination of resource requirements. In other examples, embodiments can prioritize the statistical information, some combination of these values can be used, or any other suitable resolution technique can be implemented.

At 3506, a service tier distribution can be assigned for the source applications (e.g., per application group). For example, based on the source environment for each application a service tier (e.g., silver, gold, and/or platinum) can be assigned to each application (e.g., per application group). In some embodiments, a service tier can define parameters for a target architecture, such as memory, CPU, and storage, replication, availability requirements (redundancy), load balancing, and the like. For example, a bronze service tier can represent a simple architecture (e.g., standard CPU/memory available) while a silver or gold tier can represent additional functionality (e.g., replication, distributed hardware for higher availability, load balancing for improved performance, and the like). Based on the loaded statistical information, applications can be assigned service tiers that represent the target architecture for the applications.

At 3508, a CPU can be selected for the source applications (e.g., per application group). For example, based on the source environment for each application (e.g., memory, CPU, and storage utilization, source hardware, and the like) and/or the assigned service tier (e.g., silver, gold, and/or platinum), a CPU can be selected (per application group). In some embodiments, the selected CPU can include characteristics, such as performance characteristics (e.g., speed, cache, and the like) as well as a make and model.

At 3510, a source architecture resource metric can be determined for the source applications (e.g., per application group). For example, based on the CPU characteristics, a CPU resource metric can be calculated for the applications. In some embodiments, resource metrics can be calculated/determined for various types of hardware and stored, as disclosed herein. During migration (e.g., at load and classification) resource metrics for corresponding source hardware can be retrieved/obtained/determined.

In some embodiments, when source hardware does not include a corresponding resource metric (e.g., a resource metric was not determined calculated for the specific type of source hardware), a graphical user interface can be used to select a comparable source hardware type that does have a resource metric. Once the comparable hardware has been selected, load and classification can be performed with the resource metric value for the comparable hardware.

Figure 38:
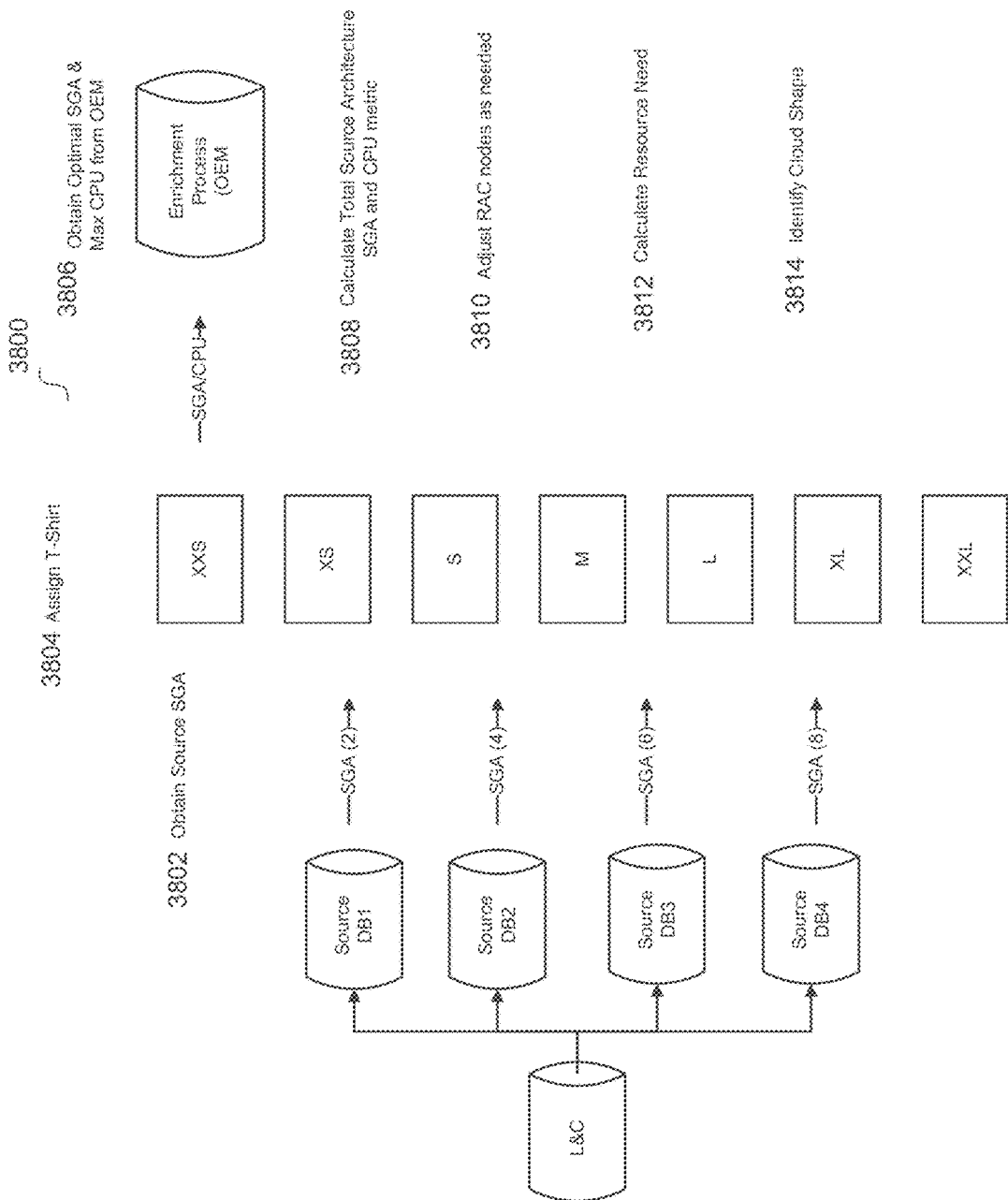
FIG. 38 illustrates a flow diagram for determining resource requirements of target database based on detailed information about source databases according to an example embodiment.

In some embodiments, source architecture CPU resource metric values can be determined based on the statistical information for the source application groups, applications, or sub-applications, the CPU utilization for the source application groups, applications, or sub-applications, and the obtained resource metric for the source system. FIG. 38 and the accompanying descriptions include calculations for determining CPU resource metric values for source databases based on a source system resource metric and CPU utilization about the source databases. For example, a particular database's resource metric value share of the hardware that implements the particular database can be calculated. Similar calculations can be used to determine the CPU resource metric values for the source application groups, applications, or sub-applications.

At 3512, a number of nodes (e.g., computing nodes) can be adjusted based on one or more conditions. For example, a number of computing nodes (e.g., server nodes) can be adjusted based on the service tier assigned to a source application and/or the resource metric determined for the source architecture.

In some embodiments, a number of nodes implemented in the source architecture may be different form the number of nodes determined for the target architecture. For example, for a given application group, application, or sub-application, migration to a target architecture that includes updated hardware (e.g., faster processor, more efficient storage, improved memory, and the like) can reduce the number of nodes required on the target system. In these examples, the service tier can also be considered to ensure the number of nodes is able to accomplish the defined performance measure of the service tier (e.g., redundancy, availability, load balancing/performance).

In some embodiments, based on a comparison between resource metrics for the source and target systems, it may be determined that a 4 node implementation at the source system is to be reduced to a 2 node implementation in the target system. In addition, it can be determined whether the 2 node implementation can accomplish the service tier for the source application. For example, a silver or gold service tier may include availability requirements that are not satisfied by the 2 node implementation, and thus an adjustment to 3 nodes may be performed. In another example, the service tier may be accommodated by the 2 node implementation (e.g., for a bronze service tier) and thus no additional adjustment would be performed. Some examples may include single instance implementations, and a single node can be used in these examples.

At 3514, total resource requirements for the source applications can be calculated. For example, based on the number of nodes, determined CPU resource metrics, and service tier, resource requirements can be determined for a given application group, application, or sub-application. In some embodiments, the resource requirements can include a number of processors required within a particular target architecture (e.g., given one or more types of processors of the target architecture). FIG. 38 and the accompanying descriptions include calculations for determining a number of processors for source databases based on target system architecture (e.g., resource metric for target hardware), CPU resource metrics for the source databases, and a determined number of nodes. Similar calculations can be used to determine the resource requirements for the source application groups, applications, or sub-applications.

Figure 36:
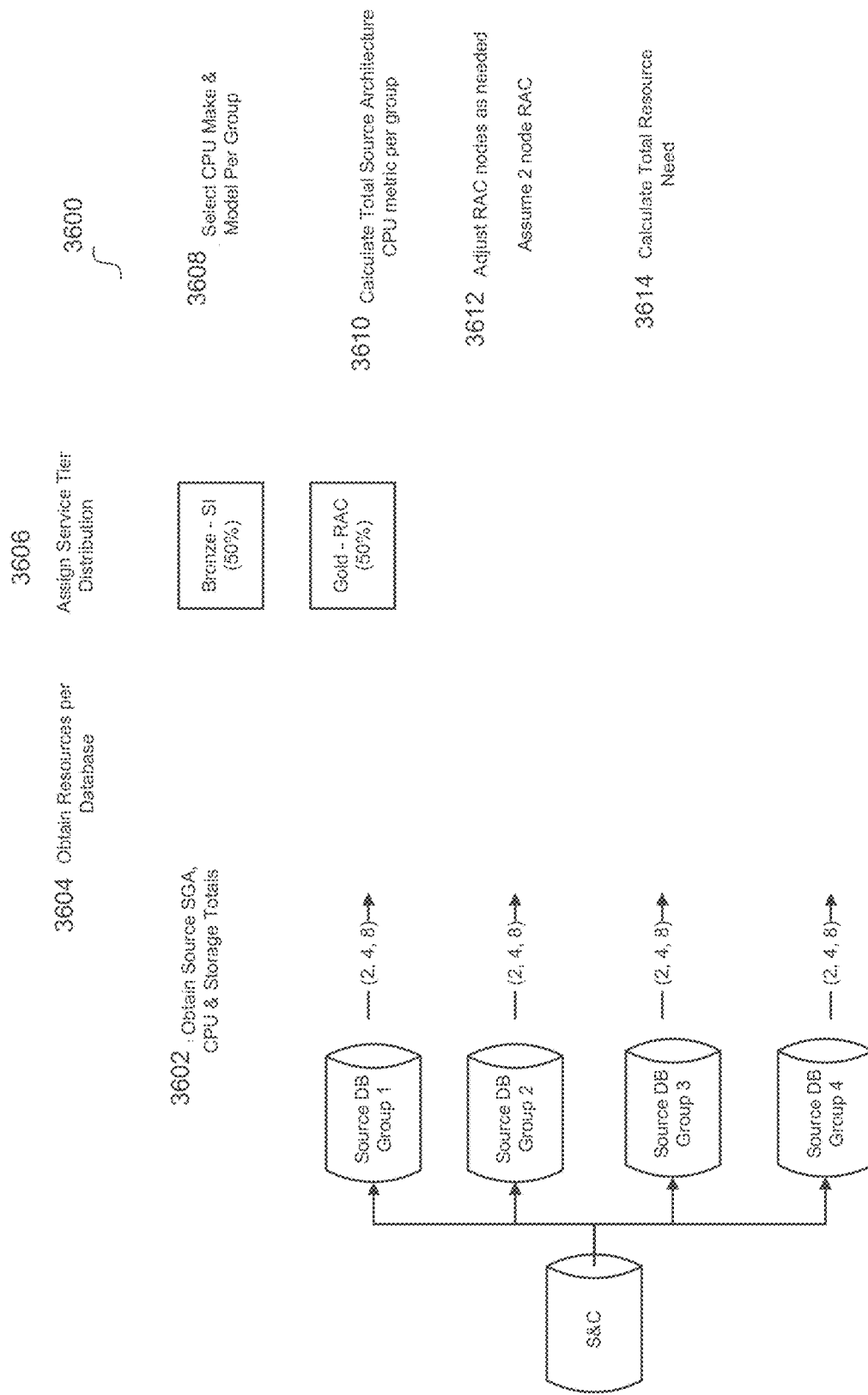
FIG. 36 illustrates a flow diagram for determining resource requirements of target databases based on source databases according to an example embodiment

FIG. 36 illustrates a flow diagram for determining resource requirements of target databases based on source databases according to an example embodiment. At 3602, source information about one or more source databases can be obtained. In an embodiment, a source database can include source hardware (e.g., on-premise or cloud based machines) used to operate the database. Statistical information about the source system can be loaded to embodiments of the software tool using a statistical questionnaire. The statistical information can include SGA utilization by a source database, CPU utilization for a source database, and storage utilization for a source database. For example, the SGA, CPU, and/or storage utilization can be associated with the source hardware that implement the source application.

In some embodiments, resource requirements can be determined for a plurality of source databases. For example, FIG. 36 illustrates four groups of source databases (each group containing one or more databases) for which resource requirements can be determined.

At 3604, resources for the source databases can be obtained. For example, resources for each database (for which resource requirements on the target are being determined) can be obtained. In an embodiment, the resources per database can be determined based on the source hardware that is used to host or otherwise run the source database.

In some embodiments, scripts (e.g., a software utility that executes scripts on the source system) can be used to determine and/or verify the statistical information. For example, the resources per database group or database can be determined based on execution of one or more scripts on the source system, as described herein. When these scripts verify the statistical information, embodiments can continue using the information unchanged. When the statistical information is not verified (e.g., the scripts return different information), embodiments can prioritize the resource information returned by the scripts and utilize this information for the determination of resource requirements. In other examples, embodiments can prioritize the statistical information, some combination of these values can be used, or any other suitable resolution technique can be implemented.

At 3606, a service tier distribution can be assigned for the source databases. For example, based on the source environment for each database (e.g., SGA, CPU, and storage utilization, source hardware, and the like) a service tier (e.g., silver, gold, and/or platinum) can be assigned to each database (e.g., per database group).

In some embodiments, a service tier can define parameters for a target architecture, such as memory, CPU, and storage, replication, availability requirements (redundancy), recovery requirements, and the like. For example, a bronze service tier can represent a simple architecture (e.g., standard CPU/memory available) while a silver or gold tier can represent additional functionality (e.g., replication, distributed hardware for higher availability, stringent downtime/recovery requirements, and the like). Based on the loaded statistical information, databases can be assigned service tiers that represent that target architecture for the databases.

At 3608, a CPU can be selected for the source databases (e.g., per database group). For example, based on the source environment for each database (e.g., memory, CPU, and storage utilization, source hardware, and the like) and/or the assigned service tier (e.g., silver, gold, and/or platinum), a CPU can be selected (per database group). In some embodiments, the selected CPU can include characteristics, such as performance characteristics (e.g., speed, cache, and the like) as well as a make and model.

At 3610, a source architecture resource metric can be calculated for the source databases (e.g., per database group). For example, based on the CPU characteristics, a CPU resource metric can be calculated for the source databases. In some embodiments, resource metrics can be calculated/determined for various types of hardware and stored, as disclosed herein. During migration (e.g., at load and classification) resource metrics for corresponding source hardware can be retrieved/obtained/determined.

In some embodiments, when source hardware does not include a corresponding resource metric (e.g., a resource metric was not determined calculated for the specific type of source hardware), a graphical user interface can be used to select a comparable source hardware type that does have a resource metric. Once the comparable hardware has been selected, load and classification can be performed with the resource metric value for the comparable hardware.

In some embodiments, source architecture CPU resource metric values can be determined based on the statistical information for the source databases, the CPU utilization for the source databases, and the obtained resource metric for the source system. FIG. 38 and the accompanying descriptions include calculations for determining CPU resource metric values for source databases based on a source system resource metric and CPU utilization about the source databases. For example, a particular database's resource metric value share of the hardware that implements the particular database can be calculated. Similar calculations can be used to determine the CPU resource metric values for the source databases.

At 3612, a number of nodes (e.g., computing nodes) can be adjusted based on one or more conditions. For example, a number of computing nodes (e.g., RAC nodes) can be adjusted based on the service tier assigned to a source database and/or the resource metric determined for the source architecture.

In some embodiments, a number of nodes implemented in the source architecture may be different form the number of nodes determined for the target architecture. For example, for a given database group or database, migration to a target architecture that includes updated hardware (e.g., faster processor, more efficient storage, improved memory, and the like) can reduce the number of nodes required on the target system. In these examples, the service tier can also be considered to ensure the number of nodes is able to accomplish the defined performance measure of the service tier (e.g., redundancy, availability, recovery, and the like).

In some embodiments, based on a comparison between resource metrics for the source and target systems, it may be determined that a 4 node implementation at the source system is to be reduced to a 2 node implementation in the target system. In addition, it can be determined whether the 2 node implementation can accomplish the service tier for the source database. For example, a silver or gold service tier may include availability requirements that are not satisfied by the 2 node implementation, and thus an adjustment to 3 nodes may be performed. In another example, the service tier may be accommodated by the 2 node implementation (e.g., for a bronze service tier) and thus no additional adjustment would be performed. Some examples may include single instance implementations, and a single node can be used in these examples.

At 3614, total resource requirements for the source databases can be calculated. For example, based on the number of nodes, determined CPU resource metrics, SGA utilization, and service tier, resource requirements (e.g., a number of processor and/or SGA requirements) can be determined for a given database group or database. In some embodiments, the resource requirements can include a number of processors required within a particular target architecture (e.g., given one or more types of processors of the target architecture). FIG. 38 and the accompanying descriptions include calculations for determining a number of processors and an SGA size for source databases based on target system architecture (e.g., resource metric for target hardware), CPU resource metrics for the source databases, and a determined number of nodes. Similar calculations can be used to determine the resource requirements (e.g., number or processors and SGA size) for the source databases.

Figure 37:
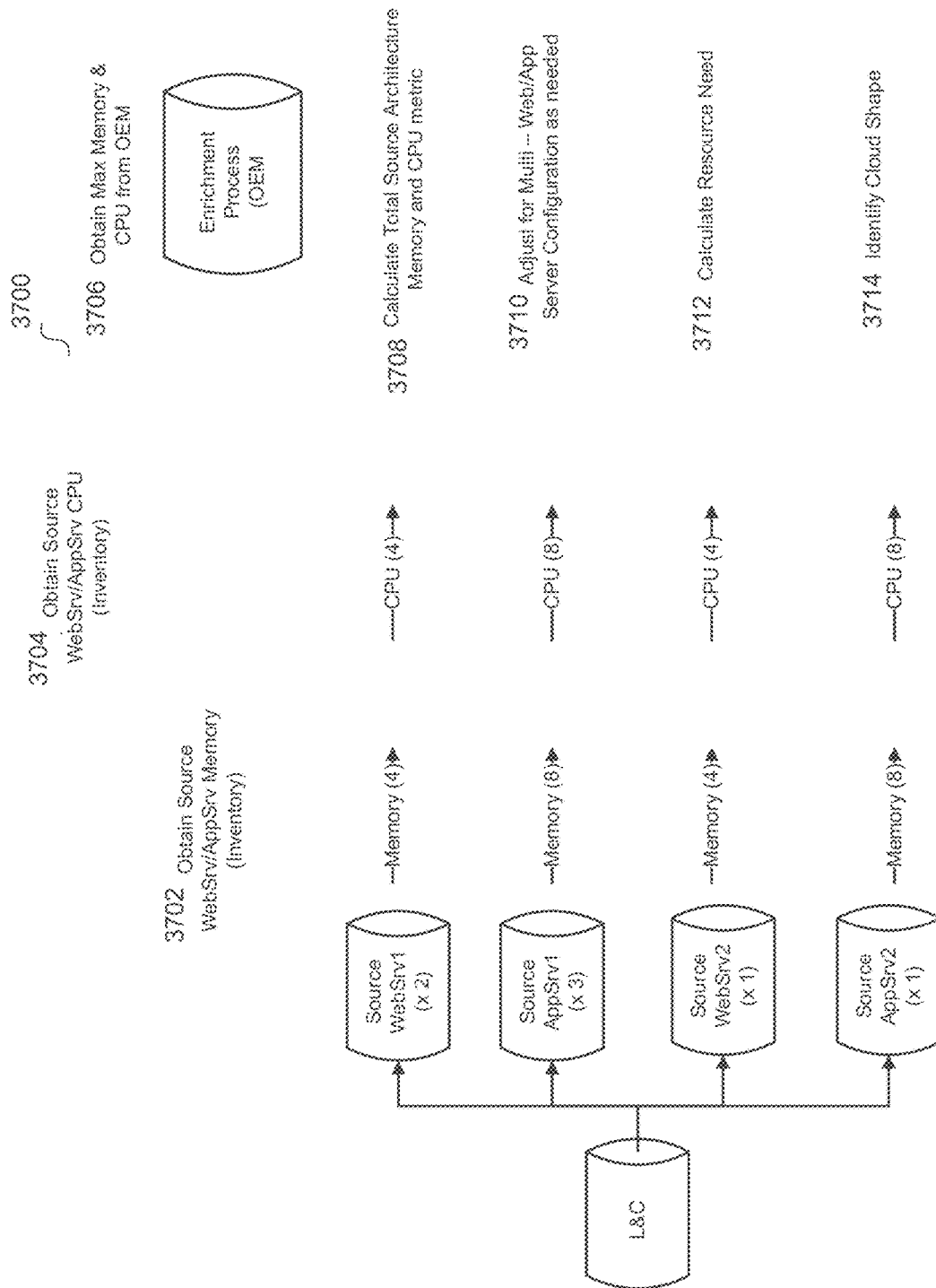
FIG. 37 illustrates a flow diagram for determining resource requirements of target applications based on detailed information about source applications according to an example embodiment.

FIG. 37 illustrates a flow diagram for determining resource requirements of target applications based detailed information about source applications according to an example embodiment. At 3702, source memory information about source hardware can be obtained. In an embodiment, one or more web servers and/or application servers can be used to implement source applications. Detailed information about the source system can be loaded to embodiments of the software tool using a detailed questionnaire. The detailed information can include memory utilization source application, CPU utilization for a source application, and storage requirements for the web servers/application servers. In an embodiment, the memory utilization for each web server and/or application server from the detailed information can be obtained. At 3704, source CPU information about source hardware can be obtained. For example, the CPU utilization for each web server and/or application server from the detailed information can be obtained.

At 3706, source memory and CPU utilization can be obtained from the source hardware. For example, one or more scripts can be executed on the source system to retrieve the memory utilization for each web server and/or application server (e.g., memory utilization when hosting source applications). Similarly, one or more scripts can be executed on the source system to retrieve the CPU utilization for each web server and/or application server (e.g., CPU utilization when hosting source applications). FIG. 38 and the accompanying descriptions include reverse engineering scripts for retrieving memory and CPU utilization information from a source system, and similar scripts can be implemented.

At 3708, source architecture memory values and CPU resource metric values can be calculated for the source webservers and/or application servers. For example, based on CPU characteristics for the source system, a resource metric can be calculated for source hardware. In some embodiments, resource metrics can be calculated/determined for various types of hardware and stored, as disclosed herein. During migration (e.g., at load and classification) resource metrics for corresponding source hardware can be retrieved/obtained/determined. In some embodiments, resource metrics can be obtained for the web servers and/or applications servers based on the particular hardware type for the servers.

In some embodiments, when source hardware does not include a corresponding resource metric (e.g., a resource metric was not determined calculated for the specific type of source hardware), a graphical user interface can be used to select a comparable source hardware type that does have a resource metric. Once the comparable hardware has been selected, load and classification can be performed with the resource metric value for the comparable hardware.

In an embodiment, the memory information obtained from the detailed information about the source system can be compared to the memory utilization obtained from the source hardware (e.g., via execution of scripts). If the memory utilization obtained from the source hardware is less than the memory information obtained from the detailed information, the memory value can be set to a number that exceeds the obtained memory utilization by a delta (e.g., set to 1.2, 1.3., or 1.4 times the obtained memory utilization, or any other suitable delta) to allow for a reduction in size and provide for sufficient headroom for spikes in capacity.

In some embodiments, source architecture CPU resource metric values can be determined based on the detailed information for the source web servers and/or application servers, the CPU utilization obtained from the source hardware, and the obtained resource metric for the source system. FIG. 38 and the accompanying descriptions include calculations for determining CPU resource metric values for source databases based on a source system resource metric and CPU utilization about the source databases. For example, a particular database's resource metric value share of the hardware that implements the particular database can be calculated. Similar calculations can be used to determine the CPU resource metric values for the source web servers and/or applications servers.

At 3710, adjustments can be performed based on multiple web server and/or application server configurations. For example, a number of web servers and/or applications servers can be adjusted based on the resource metric determined for the source architecture. In some embodiments, a number of web servers and/or applications servers implemented in the source architecture may be different form the number of web servers and/or applications servers determined for the target architecture. For example, migration to a target architecture that includes updated hardware (e.g., faster processor, more efficient storage, improved memory, and the like) can reduce the number of web servers and/or applications servers required on the target system.

At 3712, resource requirements for the web servers and/or application servers can be calculated. For example, based on the CPU resource metric and memory values for the web servers and/or application servers, a target architecture resource metric (e.g., obtained from the stored resource metrics for various hardware types), and number of web servers and/or web applications, resource requirements at the target system can be determined for the web servers and/or application servers. For example, the resource requirements can include number of processors and memory size requirements. FIG. 38 and the accompanying descriptions include calculations for determining a number of processors for source databases based on target system architecture (e.g., resource metric for target hardware), CPU resource metrics and SGA values for the source databases, and a determined number of nodes. Similar calculations can be used to determine the resource requirements on the target system (e.g., number of processors and memory size) for the web servers and/or application servers.

At 3714, a shape for target hardware (e.g., cloud shape) can be identified based on the total resource requirements. For example, the resource requirements can be achieved by target hardware (e.g., target web server and/or application servers), such as the servers listed in the below table. A plurality of the servers can be selected as the shape for the target hardware. For example, given a resource requirement for a web server or application server (e.g., number of processors and/or memory), a server from the below table that can achieve the resource requirement can be selected for the web server or application server.

In some embodiments, a smallest size server can be selected that still meets the resource requirements. For example, where the resource requirements indicate 6 CPUs and 20 MEM GB, the oc5 server/shape can be selected, as this server exceeds both CPU and memory requirements but is the closest in value to the requirements when compared to the remaining servers that exceed the requirements.

| RPOVIDER | SHAPE | DESCR | VCPU | OCPU | MEM_GB |
|---|---|---|---|---|---|
| OCI-C | oc3 | Standard OC3 | 2 | 1 | 8 |
| OCI-C | oc4 | Standard OC4 | 4 | 2 | 15 |
| OCI-C | oc5 | Standard OC5 | 8 | 4 | 30 |
| OCI-C | oc6 | Standard OC6 | 16 | 8 | 60 |
| OCI-C | oc7 | Standard OC7 | 32 | 16 | 120 |
| OCI-C | oc1m | High Memory OC1M | 2 | 1 | 15 |
| OCI-C | oc2m | High Memory OC2M | 4 | 2 | 30 |
| OCI-C | oc3m | High Memory OC3M | 8 | 4 | 60 |
| OCI-C | oc4m | High Memory OC4M | 16 | 8 | 120 |
| OCI-C | oc5m | High Memory OC5M | 32 | 16 | 240 |

FIG. 38 illustrates a flow diagram for determining resource requirements of target database based on detailed information about source databases according to an example embodiment. In some embodiments, the following table can represent a default target configuration that is refined through the functionality of FIG. 38.

| Parameter | XXS (PDB) | XS (PDB) | S (PDB) | M (PDB) | L (CDB/PDB) | XL (CDB/PDB) | XXL (CDP/PDB) |
|---|---|---|---|---|---|---|---|
| db_block_size | 8192 | 8192 | 8192 | 8192 | 8192 | 8192 | 8192 |
| cpu_count | 2 | 4 | 6 | 10 | 16 | 24 | 32 |
| java_pool_size | 64 MB | 64 MB | 80 MB | 128 MB | 128 MB | 128 MB | 256 MB |
| large_pool_size | 64 MB | 64 MB | 128 MB | 256 MB | 256 MB | 512 MB | 512 MB |
| log_buffer | 128 MB | 128 MB | 128 MB | 128 MB | 128 MB | 128 MB | 128 MB |
| pga_aggregate_target | 512M | 512M | 1024 MB | 2048 MB | 4096 MB | 8192 MB | 16384 MG |
| pga_aggregate_limit | 2X PAT | 2X PAT | 2X PAT | 2X PAT | 2X PAT | 2X PAT | 2X PAT |
| processes | 512 | 512 | 1024 | 1024 | 3000 | 6000 | 8000 |
| redo size | 512 MB | 512 MB | 512 MB | 1024 MB | 2048 MB | 4096 MB | 4096 MB |
| resource_manager_plan | plan | plan | plan | plan | plan | plan | plan |
| sga_target | 4 GB | 6 GB | 8 GB | 10 GB | 16 GB | 24 GB | 32 GB |
| shared_pool_size | 64 MB | 64 MB | 128 MB | 256 MB | 256 MB | 512 MB | 1024 MB |
| use_large_pages | true | true | true | true | true | true | true |

At 3802, source SGA information about source hardware can be obtained. For example, a source database sga_target_gb value can be obtained, and a cpu_count for the source database can be derived from the SGA value (e.g., per instance). For example, a command can be executed, such as get sga_target_gb, which can obtain the SGA information for a given database from the loaded detailed source system information. For example, a sample database oradb01 can be a 3-node RAC database that has a sga_target_gb of 7.5 GB (e.g., based on the loaded detailed source database information).

At 3804, the source databases can be classified based on the obtained SGA information. For example, source databases can be classified into one of a plurality of predetermined database sizes (e.g., T-shirt sizes) based on sga_target_gb. For example, the classification can be based on the following table:

| SGA_TARGET_GB_H | TSHIRT_SIZE |
|---|---|
| 4 | XXS |
| 6 | XS |
| 8 | S |
| 10 | M |
| 16 | L |
| 24 | XL |
| 32 | XXL |
| 2000 | CUSTOM |

In some embodiments, when a database SGA size falls between two predetermined sizes, the lower predetermined size can be selected for the database (e.g., based on the desire to migrate to a more efficient system). In other implementations, the higher predetermined size may be used, a half size may be used, or any other suitable classification techniques can be implemented. Given the example oradb01 database above, the database can be classified as XS t-shirt size after factoring down (e.g., because it falls between the X and XS sizes).

In some embodiments, a cpu_count can be obtained based the classified database size. For example, the predetermined database sizes can include associated CPU_count values, as illustrated in the following table.

| TSHIRT_SIZE | SGA_TARGET_GB_H | CPU_COUNT_H |
|---|---|---|
| XXS | 4 | 2 |
| XS | 6 | 4 |
| S | 8 | 6 |
| M | 10 | 10 |
| L | 16 | 16 |
| XL | 24 | 24 |
| XXL | 32 | 32 |
| CUSTOM | 48 | 48 |

Given the above example, oradb01 has an XS database size with sga_target_GB=6 GB and cpu_count=4. Cpu_count values can be mapped to sga_target values using any other suitable metric.

At 3806, SGA utilization and CPU utilization can be obtained from the source hardware. For example, one or more scripts can be executed on the source system to retrieve the memory utilization for each database. Similarly, one or more scripts can be executed on the source system to retrieve the CPU utilization for each database.

In some embodiments, the source hardware can be interrogated to obtain a metric of CPU utilization (e.g., original equipment manufacturer ("OEM") maximum CPU utilization metric based on historical use) using the following scripts (e.g., SQL), depending on whether the database is a RAC database.
  RAC database:
  select ceil(max(m.maximum)) cpu_count
  from sysman.mgmt$metric_daily m,
  sysman.mgmt$target_members c
  where
    c.aggregate_target_guid='AAAABBBBBCCCDDDD'
    and c.aggregate_target_type='rac_database'
    and c.member_target_type='type_database'
    and m.target_guid=c.target_guid
    and m.target_type='type_database'
    and m.metric_name='sysTime'
    and m.metric_column='Cpus';
  Single Instance:
  select ceil(max(m.maximum)) cpu_count
  from sysman.mgmt$metric_daily m
  where m.target_guid=' AAAABBBBBCCCDDDD'
  and m.target_type='type_database'
  and m.metric_name='sysTime'
  and m.metric_column='Cpus';

In some embodiments, the script can return a value, and the cpu_count can be overwritten with the returned value. In other embodiments, the script may not be able to obtain a value, in which case the original cpu_count (associated with the database size) remains. For example, the script can return a CPU utilization metric of 8 for the sample oradb01 database. Accordingly, the values for oradb01 can be sga_target=6 GB and cpu_count=8.

In some embodiments, the source hardware can be interrogated to obtain a metric of SGA size (e.g., original equipment manufacturer ("OEM") SGA size based on historical use) using the following scripts (e.g., SQL), depending on whether the database is a RAC database.
  RAC database:
  select ceil(max(m.maximum)) max_db_cpu_count
  from sysman.mgmt$metric_daily m,
  sysman.mgmt$target_members c
  where c.aggregate_target_guid='AAAABBBBCCCC'
    and c.aggregate_target_type='rac_database'
    and c.member_target_type='type_database'
    and m.target_guid=c.member_target_guid
    and m.target_type='type_database'
    and m.metric_name='sga'
    and m.metric_column='sga_size';
  Single Instance:
  select ceil(max(m.maximum)) max_db_cpu_count
  from sysman.mgmt$metric_daily m
  where m.target_guid='AAAAABBBBCCCCC'
    and m.target_type='type_database'
    and m.metric_name='sga'
    and m.metric_column='sga_size';

In some embodiments, if the value returned from the source hardware is less than the sga_target (e.g., from the loaded detailed source information), then sga_target can be overwritten with the returned value. In some embodiments, if the retuned value is greater than the sga_target, the original sga_target can remain. For example, implementations can select the lesser values since new architecture may not require as much memory. In some embodiments, using the lesser value can allow standard SGA sizes that achieve a reduced memory footprint.

In an example, the script can return an SGA metric value of 10 for the sample oradb0l database. Accordingly, the values for oradb0l can be sga_target=6 GB (no change, as 10>6) and cpu_count=8.

At 3808, a source architecture resource metric value can be calculated for the source databases. For example, based on the CPU characteristics, a CPU resource metric value can be calculated for the source databases. In some embodiments, the source database cpu_count can be converted to a CPU resource metric value based on characteristics for the source hardware (e.g., make and model of the source hardware). For example, oradb01 can be running on IBM® Power 750 with POWER7+ processor with 4.00 Ghz, with 28 cores, 112 CPUs (SMT=4). In some embodiments, a database's share (e.g., based on percentage of cpu_count) of the total resource metric of the source hardware can be calculated. For example, the resource metric for the source hardware that runs oradb01 can be 2,090,000. Accordingly, oradb01's share can be calculated as:

oradb01 ResourceM=cpu_count (8)/total_cpu (112)*ResourceM (2090000)=149,286

In some embodiments, additional source totals can be calculated, such as a source total SGA and a source total resource metric. For example, these source totals can be calculated based on a number of RAC nodes according to the following:

Source total SGA=3 (# RAC nodes)*6 (sga_target_gb) =18 GB

Source total ResourceM=3 (# RAC nodes)*149,286 (ResourceM share)=447,858

In some embodiments, when source hardware does not include a corresponding resource metric (e.g., a resource metric was not determined calculated for the specific type of source hardware), a graphical user interface can be used to select a comparable source hardware type that does have a resource metric. Once the comparable hardware has been selected, load and classification can be performed with the resource metric value for the comparable hardware.

At 3810, adjustments can be performed based on a number of computing nodes. For example, if rules or target architecture conditions are defined to increase or decrease the number of RAC nodes, then the number of RAC nodes can be increased or decreased accordingly. For example, conditions for the migration may define that 2 RAC nodes should be used for Oracle Database Cloud Service or upgrade to more to increase availability. For the above example, conditions may be defined such that a reduction to 2 nodes is performed for oradb01.

At 3812, total resource requirements for the target databases can be calculated. In some embodiments, resource requirements per RAC instance on the target (cpu count per instance+SGA) can be calculated. For example, the calculation can include the following:

Obtain sga_target_gb per instance
For example: 18 GB Total/2 (number of RAC nodes)=9 GB
Obtain resource metric for target platform
For example: Intel Xeon E5-2699 v4, 44 cores with ResourceM of 3,520,000
Calculate ResourceM per core
For example: ResourceM for target platform/# cores or 3,520,000/44 cores
Obtain cpu_ResourceM per instance
For example: Source Total ResourceM/# rac nodes or 447,858/2 RAC nodes
Obtain cpu count per instance
For example: cpu_ResourceM per instance/ResourceM per core)*cpu thread per core Given the above example, for oradb01, given that the sample database will be running an ExaCS X6-2 platform with Intel Xeon E5-2699 v4, 44 cores with ResourceM of 3,520,000, the cpu count per instance (vCPU) can be calculated as:

$$\text{ceil}(\text{Source total ResourceM } 447{,}858/2 \text{ number of RAC nodes})/\text{ResourceM\_per\_core } (3{,}520{,}000/44)*\text{vCPUs or threads } (2 \text{ Threads per core}))=6$$

In some implementations, given the sample database oradb01, resource requirements can be determined as 9 GB SGA and 6 CPU per instance (reduced from 8 to 6 on new architecture).

At 3814, a shape for target hardware (e.g., cloud shape) can be identified based on the total resource requirements. For example, the target_cpu_count (e.g., 6), target_sga_target_gb (e.g., 9 GB) from step 6 can be used to find the smallest target shape that can host the database (targe_cpu_count, target_sga_target_gb) for the specific provider/database type (e.g., provider/database type=ExaCS, ODBCS, and the like). For example, oradb01 can be a 2-node RAC on ExaCS of shape M with sga_target=16 GB, cpu_count=8, for instance when this database exceeds both CPU and SGA requirements but is the closest in value to the requirements when compared to the remaining databases of the specific provider/database type that exceeds the requirements. See below table for sample selection of sizes per provider/database type:

| Provider | Shape | Descr | Vcpu | SGA_TargetGB | Ocpu | MemGB |
|---|---|---|---|---|---|---|
| ODBCS | oc3 | Standard OC3 | 2 | 5.6 | 1 | 8 |
| ODBCS | oc4 | Standard OC4 | 4 | 10.5 | 2 | 15 |
| ODBCS | oc5 | Standard OC5 | 8 | 21 | 4 | 30 |
| ODBCS | oc6 | Standard OC6 | 16 | 42 | 8 | 60 |
| ODBCS | oc7 | Standard OC7 | 32 | 84 | 16 | 120 |
| ODBCS | oc1m | High Memory OC1M | 2 | 10.5 | 1 | 15 |
| ODBCS | oc2m | High Memory OC2M | 4 | 21 | 2 | 30 |
| ODBCS | oc3m | High Memory OC3M | 8 | 42 | 4 | 60 |
| ODBCS | oc4m | High Memory OC4M | 16 | 84 | 8 | 120 |
| ODBCS | oc5m | High Memory OC5M | 32 | 168 | 16 | 240 |
| ONPREM | XXS | | 2 | 2 | 1 | |
| ONPREM | XS | | 4 | 4 | 2 | |
| ONPREM | S | | 6 | 6 | 3 | |
| ONPREM | M | | 10 | 10 | 5 | |
| ONPREM | L | | 16 | 16 | 8 | |
| ONPREM | XL | | 24 | 24 | 12 | |
| ONPREM | XXL | | 32 | 32 | 16 | |
| ONPREM | CUSTOM | | 32 | 48 | 16 | |
| EXACS | XXS | | 2 | 4 | 1 | |

-continued

| Provider | Shape | Descr | Vcpu | SGA_TargetGB | Ocpu | MemGB |
|---|---|---|---|---|---|---|
| EXACS | XS | | 4 | 8 | 2 | |
| EXACS | S | | 6 | 8 | 3 | |
| EXACS | M | | 8 | 16 | 4 | |
| EXACS | L | | 16 | 16 | 8 | |
| EXACS | XL | | 24 | 24 | 12 | |
| EXACS | XXL | | 32 | 32 | 16 | |
| EXACS | CUSTOM | | 32 | 48 | 16 | |

In some embodiments, predetermined database sizes that are used to classify databases (e.g., t-shirt sizes) can be mapped to other software as a service, infrastructure as a service, and/or platform as a service definitions. For example, cloud service categories can include defined specifications (e.g., defined by available processing power/number of processor, storage space, memory size, and the like). Relationships can be determined between these defined specifications and the predetermined database sizes in some embodiments, and thus the predetermined database sizes can be mapped to the defined specifications for cloud services.

In some embodiments, a target configuration for oradb01 can be a 2-node RAC on EXACS with shape of M, sga_target=16, cpu_count=8. For example, such a target configuration for oradb01 can be the foundation for consolidation (e.g., PDB consolidation). For example, containers can be sized based on the number of PDBs required per container or a maximum number vCPUs (e.g., 32, or any other suitable maximum).

In some embodiments, if the database servers do not have available data, the CPU and Memory can be allocated on a 1 per 1 basis (taken from load sheet). A facility can be provided to select CPU make and model to obtain the resource metric for comparison and reclassification after the load and classification flow.

Figure 39A:
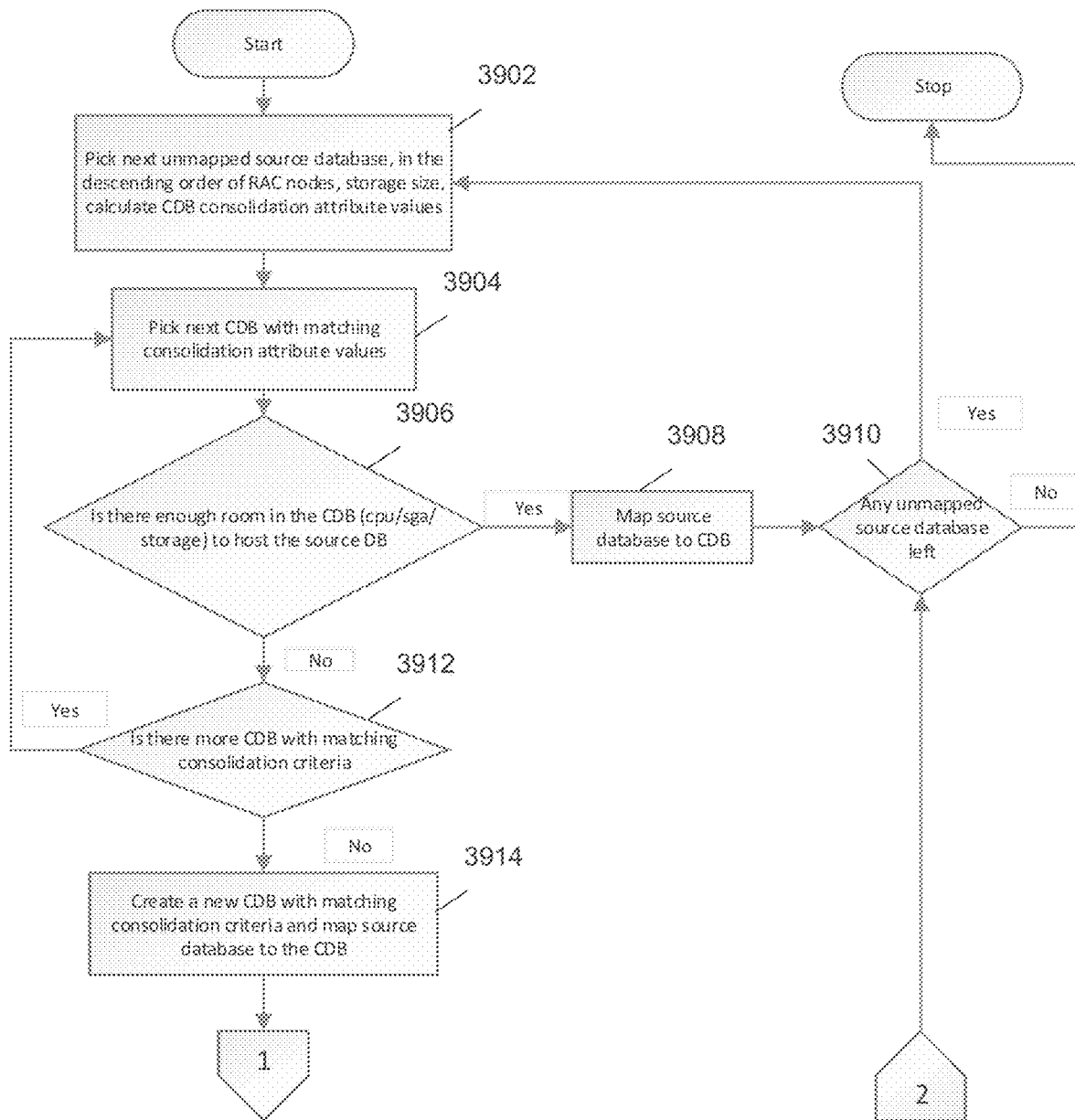
FIGS. 39A-B illustrate a flow diagram for target hardware consolidation according to an example embodiment.
Figure 39B:
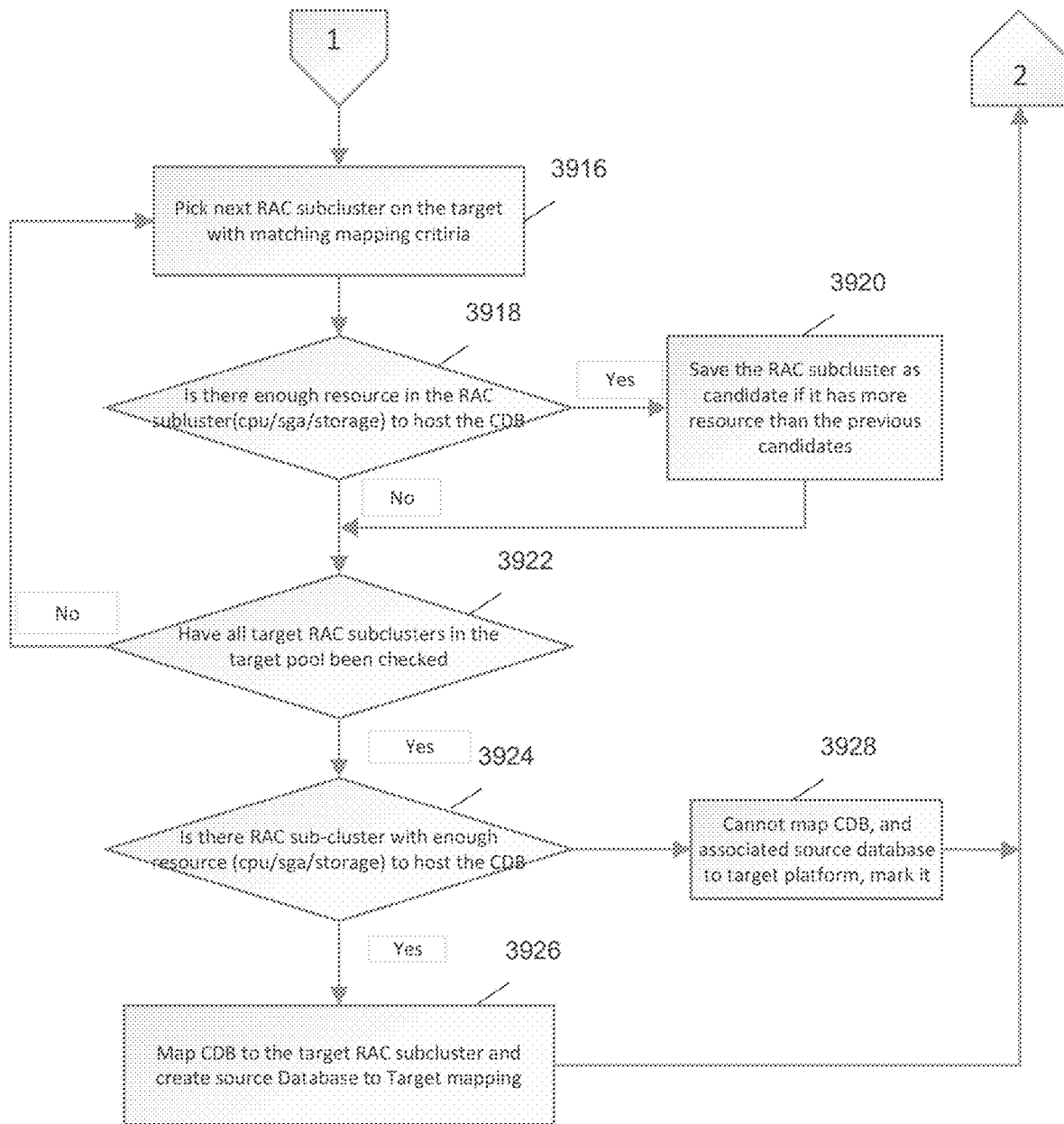

FIGS. 39A-B illustrate a flow diagram for target hardware consolidation according to an example embodiment. In some embodiments, PDB consolidation can be used in combination with pool mapping to generate customizable containers defined by specific database parameters. For example, selected hardware can be labeled as containers with defined parameters (e.g., custom database parameters). Migrating databases can then be matched and mapped to corresponding containers based on resource limits for selected hardware (e.g., storage limits, CPU oversubscription limits, and the like).

In some embodiments, consolidation (e.g., PDB and/or lift and shift) can be a rule based engine that supports the consolidation policies (e.g., discrete functions defined in consolidation configuration tables). Each CDB or PDB can include a list of attributes that are significant for the consolidation policy. For example, a tuple of those attributes can define a CDB group. In an example, the following three CDB attributes can be used for consolidation: data center, environment, and security zone. In this example, a tuple of ('Chicago, 'TEST', 'PCI') represents a CDB consolidation group.

The consolidation policy can specify how a source database is mapped to a CDB group as specified above using the configuration tables. A source database with value ('Chicago','UAT','PCI') can be mapped to the above CDB group if the configuration table defines that 'UAT' is mapped to 'test' for CDB consolidation. As disclosed herein, a customizable list of attributes can also define a custom container for PDB consolidation, and the custom list of attributes can be used to map source databases to PDBs similarly.

In some embodiments, a configuration table that defines the discrete functions can also be utilized for target platform mapping. For example, each compute node (e.g., component of target hardware) that can host database instances can be classified into different pools. These compute nodes can be further grouped into clusters (e.g., Oracle® ASM clusters if they are in the same GI cluster). For example, a full rack Oracle® Exadata cluster has eight compute nodes in the same cluster, and a quarter rack Exadata has two compute nodes in the same cluster. When a 2-node RAC database is mapped onto a full rack Exadata cluster, there are 28 combinations of two compute nodes to host the 2-node RAC databases. For 3-node RAC databases, there are 56 combinations. When there are many Exadata in the same pool, the combinations can be even larger.

In some implementations, the large number of combinations not only makes it take longer to search for a candidate, but it also makes it more challenging for the operation DBA to manage the target databases. To reduce the mapping search space and simplify the DBA operation, logical RAC sub-clusters of smaller number of nodes can be built sequentially rather than using the more computationally challenging combination approach. For example, for a full rack Exadata, the following logical RAC subclusters for mapping can be generated:

| Number of RAC nodes | Compute nodes in the logical cluster |
|---|---|
| 8 | 1, 2, 3, 4, 5, 6, 7, 8 |
| 7 | 1, 2, 3, 4, 5, 6, 7 |
| 6 | 1, 2, 3, 4, 5, 6 |
| 5 | 1, 2, 3, 4, 5 |
| 4 | 1, 2, 3, 4 |
| 4 | 5, 6, 7, 8 |
| 3 | 1, 2, 3 |
| 3 | 5, 6, 7 |
| 2 | 1, 2 |
| 2 | 3, 4 |
| 2 | 5, 6 |
| 2 | 7, 8 |
| 1 | 1 |
| 1 | 2 |
| 1 | 3 |
| 1 | 4 |
| 1 | 5 |
| 1 | 6 |
| 1 | 7 |
| 1 | 8 |

At 3902, a new unmapped source database, in descending order of RAC nodes and/or storage size, can include a CDB consolidation attribute that is calculated. For example, the CDB consolidation group can be defined similar to the data center, environment, and security zone tuple disclosed above.

In some embodiments, a PDB consolidation attribute can be calculated. For example, customizable attributes can be used to define customized containers. The PDB consolidation attribute can be similar to the data center, environment, security zone tuple described above, however can include any attribute defined for PDB consolidation.

In some embodiments, the descending order of RAC nodes and/or storage size can be used to select a largest databases and largest number of RAC nodes early in the consolidation. In general, larger databases can be challenging to place once CDBs or custom containers begin to be filled. Accordingly, larger databases can be selected first or early.

At 3904, a CDB with matching consolidation attribute values can be selected. For example, as described above, rules can be determined for matching a database's attribute values with a CDB group's values (e.g., matching "UAT" to "Test" for the environment attribute). Based on the matching rules defined, a CDB group can be selected for the unmapped source database.

In some embodiments, a custom container with matching consolidation attribute value can be selected, such as for PDB consolidation. For example, as described above, rules can be determined for matching a database's attributes with a customizable container's defined attribute values (e.g., matching "UAT" to "Test" for the environment attribute). Based on the matching rules defined, a custom container can be selected for the unmapped source database.

At 3906, it is determined whether the selected CDB or customizable container includes enough available resources to map the unmapped source database. For example, the CDB can be mapped to a portion (or all) of a component of target hardware (e.g., capacity pool) allocated to the CDB, as disclosed herein. It can be determined whether the selected CDB has enough resources (e.g., storage space and processor capacity) to satisfy the requirements of the source database.

In some embodiments it is determined whether the selected custom container has enough available resources to map the unmapped source database. For example, the custom container can be mapped to a portion (or all) of a component of target hardware (e.g., capacity pool) allocated to the custom container, as disclosed herein. It can be determined whether the selected custom container has enough resources (e.g., storage space and processor capacity) to satisfy the requirements of the source database.

In some embodiments, CDBs and/or custom containers (PDBs) can have defined sizes for CPU and memory, as shown in the below table. Based on the size of the CDB or custom container and the databases already mapped to it (and their corresponding processor and memory needs), it can be determined whether enough room is available to handle the CPU and memory needs of the current database.

In some embodiments, CDB or PDB sizes (e.g., S, M, L, and the like) can be maintained, and the corresponding CPU and memory values for the size can be used. In other embodiments, when a CDB or PDB does not have enough capacity for a database, the size of the CDB or PDB can be increased to make room for the database. For example, based on the capacity pool for the CDB and PDB and remaining capacity, the CDB or PDB may be stepped up in size if the remaining capacity can afford the change.

| Parameter | XXS (PDB) | XS (PDB) | S (PDB) | M (PDB) | L (CDB/PDB) | XL (CDB/PDB) | XXL (CDB/PDB) |
|---|---|---|---|---|---|---|---|
| db_block_size | 8192 | 8192 | 8192 | 8192 | 8192 | 8192 | 8192 |
| cpu_count | 2 | 4 | 6 | 10 | 16 | 24 | 32 |
| java_pool_size | 64 MB | 64 MB | 80 MB | 128 MB | 128 MB | 128 MB | 256 MB |
| large_pool_size | 64 MB | 64 MB | 128 MB | 256 MB | 256 MB | 512 MB | 512 MB |
| log_buffer | 128 MB | 128 MB | 128 MB | 128 MB | 128 MB | 128 MB | 128 MB |
| pga_aggregate_target | 512M | 512M | 1024 MB | 2048 MB | 4096 MB | 8192 MB | 16384 MG |
| pga_aggregate_limit | 2X PAT | 2X PAT | 2X PAT | 2X PAT | 2X PAT | 2X PAT | 2X PAT |
| processes | 512 | 512 | 1024 | 1024 | 3000 | 6000 | 8000 |
| redo size | 512 MB | 512 MB | 512 MB | 1024 MB | 2048 MB | 4096 MB | 4096 MB |
| resource_manager_plan | plan | plan | plan | plan | plan | plan | plan |
| sga_target | 4 GB | 6 GB | 8 GB | 10 GB | 16 GB | 24 GB | 32 GB |
| shared_pool_size | 64 MB | 64 MB | 128 MB | 256 MB | 256 MB | 512 MB | 1024 MB |
| use_large_pages | true | true | true | true | true | true | true |

When the selected CDB or custom container has enough available resources, the flow chart can progress to 3908, where the unmapped source database can be mapped to the CDB or custom container. In other words, the hardware allocated to the CDB or custom container can be assigned to host the unmapped source database. In some embodiments, data from the mapped source database can be migrated to the CDB or custom container (e.g., associated hardware) at the migration stage such that the CDB or custom container hosts the target database corresponding to the source database.

At 3910, it is determined whether any additional unmapped source databases are remaining. When unmapped source databases are remaining, the flow chart can proceed back to 3902 to select an unmapped source database. When no unmapped source databases are remaining, the flowchart can terminate.

At 3906, when the selected CDB or custom container does not have enough available resources, the flow chart can progress to 3912, where it is determined whether other CDB groups or custom containers with matching consolidation attributes are available (e.g., existing and available for mapping). When other CDB groups or custom containers are available, the flow chart can progress back to 3904, where a next CDB group or custom container with matching attributes can be selected.

When other CDB groups or custom containers are not available, the flow chart can progress to 3914, where a new CDB group or custom container can be created with matching consolidation attributes, and the unmapped source database can be mapped to the new CDB group or custom container.

FIG. 39B illustrates a flow diagram for creating a new CDB group or custom container when performing consolidation according to an example embodiment. At 3916, A RAC subcluster can be selected based on the target hardware with attributes that match the created CDB group or custom container. In some embodiments, a next subcluster with matching attributes can be selected according to a sequential order, as disclosed in the above table.

At 3918, it can be determined whether the RAC subcluster (e.g., CPU/SGA/storage) has enough resources to host the CDB or custom container. For example, it can be determined whether the RAC subcluster has enough hardware resources (e.g., available CPUs, SGA, and/or storage space) to accommodate the new CDB group or custom container.

In some embodiments, this determination can be based on the size (e.g., S, M, L, and the like) for the CDB group or custom container (e.g., PDB). For example, the size of the CDB or custom container can be based on the size of the database created for the CDB group (e.g., which can also be defined by S, M, L and the like, predetermined sizes). In some embodiment, a CDB or custom container may have a floor on size (e.g., M or L), and thus a database of a certain size below the floor may have a CDB or custom container of the floor size created.

Based on the size of the CDB or custom container and the CDBs or custom containers already mapped to the RAC subcluster (and their corresponding processor and memory needs), it can be determined whether enough room is available to handle the CPU and memory needs of the CDB or custom container. In some embodiments, this determination is made based on CPU oversubscription definitions and memory thresholds for target hardware defined for the consolidation, as previously disclosed.

When the RAC subcluster has enough available resources, the flow can progress to 3920, where the selected RAC subcluster can be saved as a candidate for the CDB group or custom container. The flow can then progress back to 3916, where a next RAC subcluster with matching attributes can be selected. When the RAC subcluster does not have enough available resources, the flow can progress to 3922, where it can be determined wither there are additional RAC subclusters in the target pool.

For example, the target hardware can be segregate into pools of capacity with defined attributes, as previously disclosed. When there are additional RAC subclusters in the target pool, the flow can progress back to 3916, where a next RAC subcluster can be selected.

At 3916-3922, a list of candidate RAC subclusters can be stored. When there are no additional RAC subclusters in the target pool, the flow can progress to 3924, where it is determined whether a RAC subcluster with enough resources is available for the CDB group or custom container. When there is a RAC subcluster with enough resources (e.g., at least one candidate is stored), the flow can progress to 3926, where the CDB group or custom container is assigned to one of the candidate RAC subclusters. For example, the RAC subcluster with the highest level of available resources (e.g., processors, memory, and/or storage) among the candidates can be selected for the database.

Once the CDB group or custom container is assigned to hardware, the unmapped source database can be mapped to the newly created CDB group or custom container. The flow can then progress back to 3910, where it can be determined whether there are additional unmapped source databases, as described above.

When there is no RAC subcluster with enough resources (e.g., no candidates are stored), the flow can progress to 3928, where it is determined that the CDB group or custom container and associated unmapped source database cannot be mapped to the target platform, as selected. The unmapped source database can then be marked, and can be reported to embodiments of the software tool as an unmapped database. The flow can then progress back to 3910, where it can be determined whether there are additional unmapped source databases, as described above. While RAC subclusters are described with reference to FIGS. 39A-39B, other hardware components (e.g., computing grid hardware or other types of hardware) can be similarly implemented.

In some embodiments, the consolidation flow can be part of a project impact analysis and/or target resource projection, as previously disclosed. For example, any unmapped databases can be reported as part of a project impact analysis. In addition, new hardware can be determined for the unmapped databases using a target resource projection.

For example, the flow for determining new hardware for the unmapped databases can be similar to the consolidation flow. In particular, target resource projection includes selecting a target platform and consolidation strategy, as previously disclosed. Embodiments can take all unmapped databases, consolidate them to instances of the selected target platform (the same or similar to the way the mapped databases are consolidated in FIGS. 39A-39B), and report any utilized hardware (e.g., hardware with new mappings) as the projected hardware need. In some embodiments, trim to fit can be implemented to trim the utilized hardware to the smallest size that still provides mappings for the previously unmapped databases. Thus, the size of the reported hardware can be trimmed to the portion that is utilized in the new consolidation. In some embodiments, the conditions for the data migration can be adjusted, such as adjusting consolidation parameters (e.g., oversubscription and/or memory usage thresholds) or the amount of selected target hardware resources, until all selected source databases are mapped to target hardware.

Figure 40:
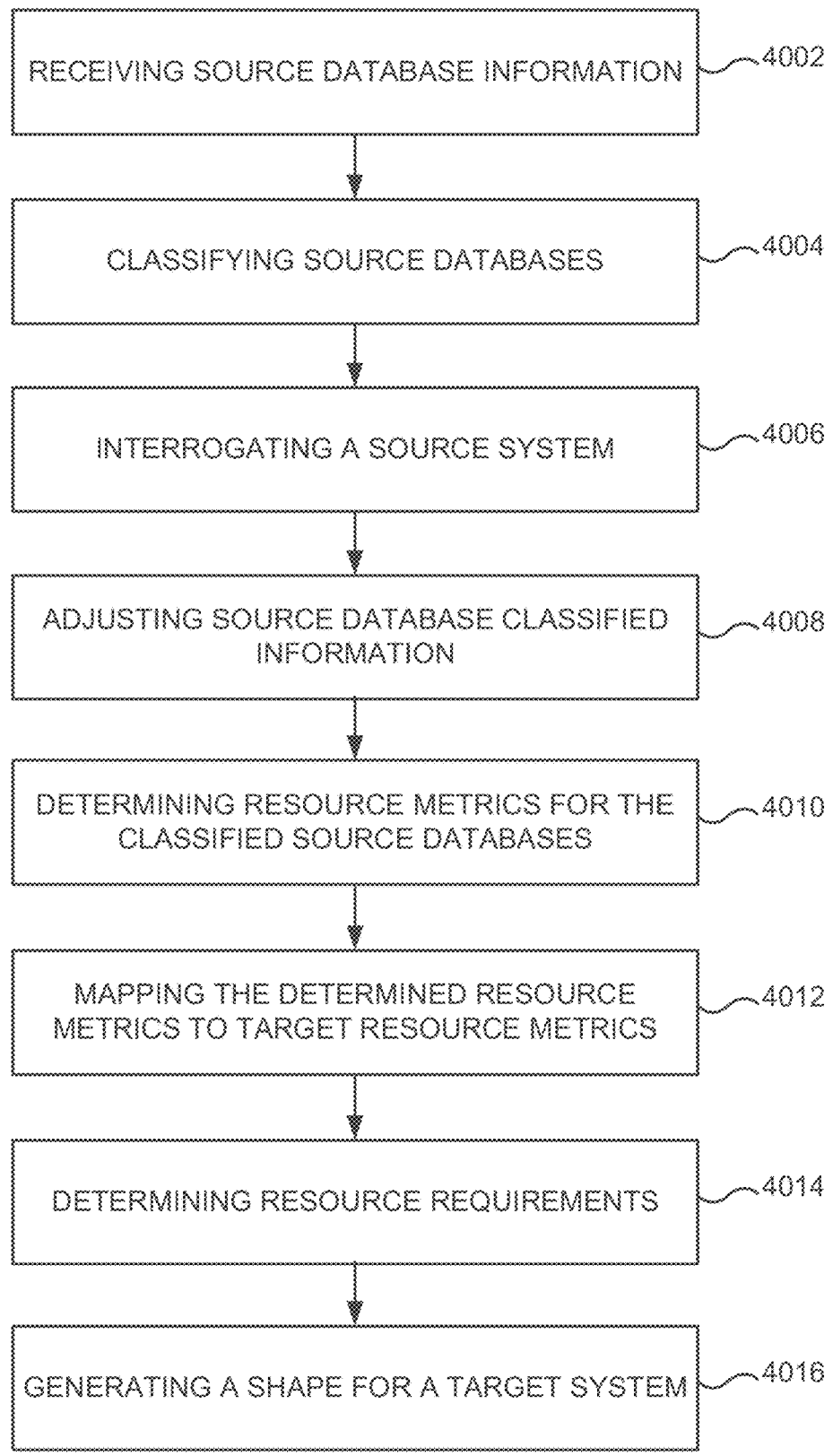
FIG. 40 illustrates a flow diagram for performing data migration using source database classification according to an example embodiment.

FIG. 40 illustrates a flow diagram for performing data migration using source database classification according to an example embodiment. At 4002, information about a plurality of source databases from a source system can be received, the information comprising source hardware types for the source databases and processor information for the source databases. For example, the received information about the source databases can include any of the detailed source database information (e.g., detailed questionnaire) disclosed herein.

At 4004, each of the plurality of source databases can be classified to one of a plurality of predetermined database sizes based on the received information. For example, the source databases can be classified to a predetermined size (e.g., T-shirt size) based on the processor information for the source databases. In some embodiments, the plurality of predetermined database sizes are segregated based on CPU ranges, storage capacity ranges, and system global area ("SGA") capacity ranges.

At 4006, the source system can be interrogated to derive information about the plurality of source databases, the derived information including at least a processor utilization per database. For example, one or more reverse engineering scripts can be executed on the source system to retrieve the processor utilization per database and/or an SGA utilization per database.

At 4008, characteristics of the classified database size can be adjusted based on the derived information. For example, adjusting characteristics of the classified database size can include resolving the derived processor utilization and SGA utilization with the processor utilization from the received information and a corresponding SGA value from the classified database size. In some embodiments, the derived processor utilization can overwrite the received processor utilization when determining resource requirements. In some embodiments, the lesser of the derived SGA utilization and the SGA value from the classified database size can be used when determining resource requirements.

At 4010, resource metrics for the classified source databases can be determined based on a type for the source hardware the implements the source databases, processor utilization, and SGA utilization. For example, the resource metric can be determined/retrieved for the source system hardware (e.g., based on hardware type) that implements a particular source database. In some embodiments, a resource metric for a given classified source database can be a share of a total resource metric for a component of source hardware (e.g., share of the hardware component used by the classified source database).

At 4012, the resource metric for the classified source databases can be mapped to a resource metric for the target system, wherein the resource metric for target system is determined based on a type for the target hardware selected for data migration. For example, the mapping can include determining target system SGA and CPU values per classified source database.

At 4014, resource requirements at a target system can be determined for the classified source databases. For example, the resource requirements can be the determined target system SGA and CPU values per classified source database.

At 4016, a shape for a plurality of target databases can be generated based on the resource requirements for the source databases, the shape comprising a plurality of target databases of predetermined database sizes implemented by target hardware, wherein the plurality of target databases are configured to receive migration data from the plurality of source databases. For example, generating the shape for the plurality of target databases can be based on the determined target system SGA and CPU values. In some embodiments, the shape for the plurality of target databases can be the target system hardware assigned to host/implement the target databases.

Figure 41:
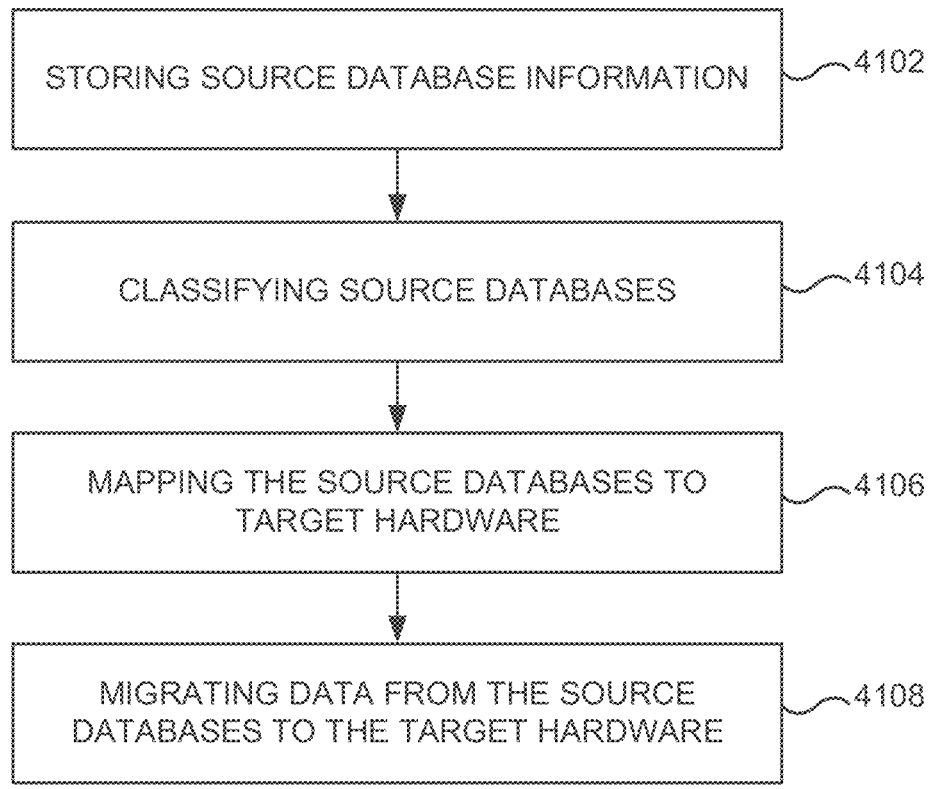
FIG. 41 illustrates a flow diagram for performing data migration using source database classification according to an example embodiment.

FIG. 41 illustrates a flow diagram for performing data migration using source database classification according to an example embodiment. At 4102, information and parameters about a plurality of source databases from a source system can be stored, the parameters comprising a location, a security zone, and processor information for the source databases. For example, the received information about the source databases can include any of the detailed source database information (e.g., detailed questionnaire) disclosed herein.

At 4104, each of the plurality of source databases can be classified to one of a plurality of predetermined database sizes based on the stored information and parameters, wherein the classifying is at least based on the processor information. For example, the source databases can be classified to a predetermined size (e.g., T-shirt size) based on the processor information for the source databases. In some embodiments, the plurality of predetermined database sizes are segregated based on CPU ranges, storage capacity ranges, and system global area ("SGA") capacity ranges.

At 4106, the classified source databases can be mapped to target database hardware based on the classified sizes and the stored parameters, wherein the target database hardware is segmented into containers that are defined by one or more of the parameters. For example, the containers are defined by at least the location parameter and the security zone parameter. In some embodiments, the parameters that define that one or more containers are customized by a user, and the customized parameters are input by the user into a user interface.

In some embodiments, an unmapped classified source databases is mapped to a container when parameters for the unmapped classified source databases match parameters for the container. For example, at least one unmapped classified source database with location and security parameters can be selected. A container for the unmapped classified source database that comprises matching location and security parameters and that comprises available capacity for the unmapped classified source database can be selected. The unmapped classified source database can then be mapped to the selected container.

In an embodiment, when a container with location and security parameters that match the unmapped classified source database parameters and has available capacity for the unmapped classified source database is not found, a new target database hardware container assignment can be created based on the parameters of the at least one unmapped classified source database. For example, one or more computing nodes of the target hardware can be selected for the new target database hardware container assignment, and the selected computing nodes can include at least a security parameter that matches the parameters of the unmapped classified source database.

In some embodiments, one or more rules can be defined to determine matches between parameters values for the classified source databases and parameters values for the containers. For example, for a given parameter, the one or more rules can define database parameters values that match container parameter values. In some embodiments, the one or more rules can be default rules, default rules edited by a user, or new/original rules input by a user.

At 4108, data can be migrated from the source databases to the target database hardware based on the mappings. For example, embodiments can generate a migration schedule for migrating data from the source databases to the target database.

Figure 42:
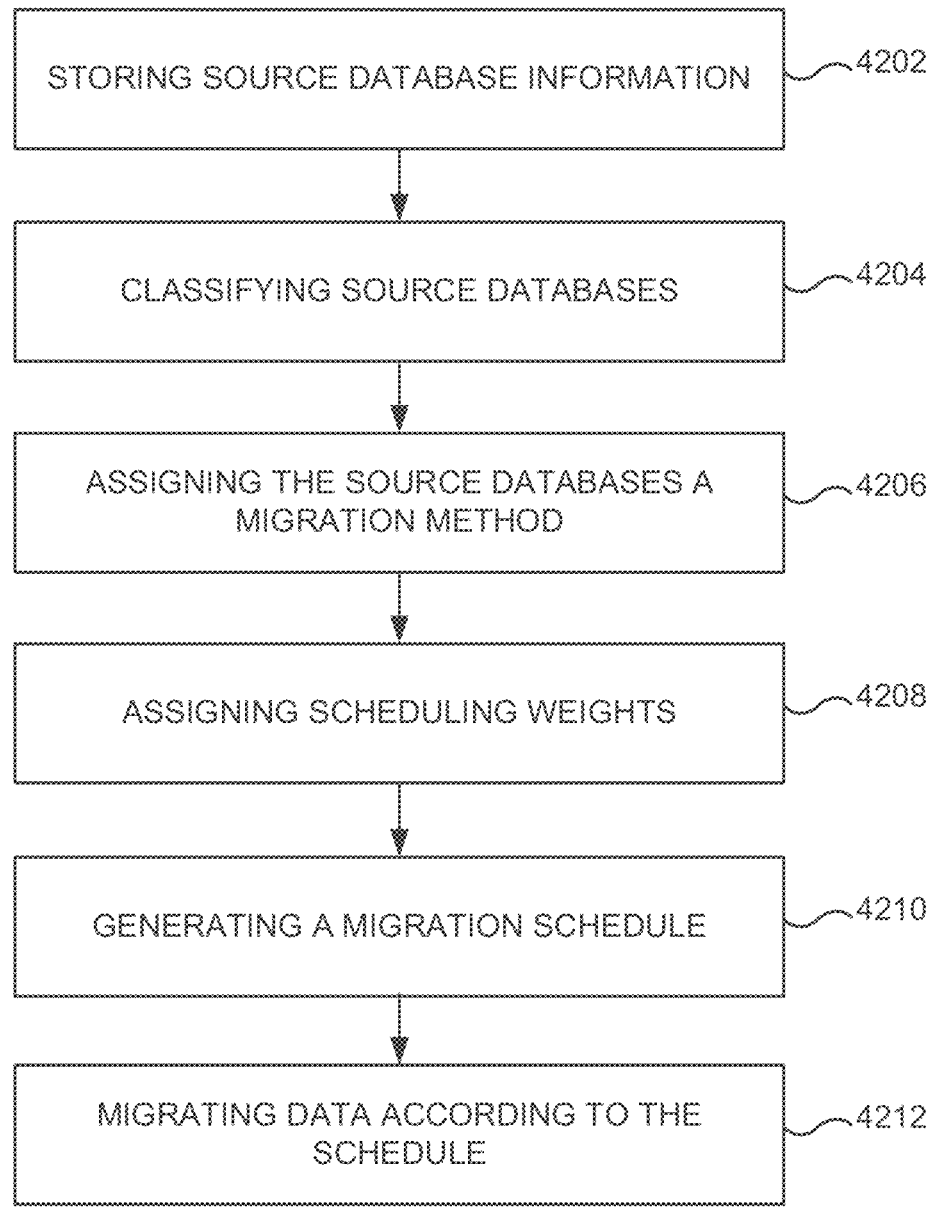
FIG. 42 illustrates a flow diagram for performing rules based scheduling and migration of databases based on complexity and weight according to an example embodiment.

FIG. 42 illustrates a flow diagram for performing rules based scheduling and migration of databases based on complexity and weight according to an example embodiment. At 4202, information about a plurality of source databases from a source system can be stored, the information comprising at least storage capacity information and downtime information for the source databases. For example, the received information about the source databases can include any of the detailed source database information (e.g., detailed questionnaire) disclosed herein.

At 4204, each of the plurality of source databases can be classified to one of a plurality of predetermined migration complexities based on the storage capacity information and downtime information. Example storage complexities can include very simple, simple, average, complex, and very complex. In some embodiments, the stored information further includes an environment for the source databases, and classifying the plurality of source databases to a migration complexity is further based on the environment information (e.g., production, non-production, and the like).

At 4206, a migration method can be assigned to each classified source database based on the storage capacity information and downtime information. For example, the migrating of data from the source databases to target databases can be performed according to the assigned migration method. Example migration methods include Oracle® Data Pump Process, Oracle® Cross Platform Transportable Tablespace Process, Oracle® Recovery Manager Process, Oracle® Data Pump Process along with Oracle® Golden-Gate, Oracle® Cross Platform Transportable Tablespace Process along with Oracle® GoldenGate, Oracle® Recovery Manager Process along with Oracle® GoldenGate, and any other suitable migration method.

At 4208, scheduling weights can be assigned to each class of complexity. For example, each of the migration complexities can be assigned a default or user configured weight.

At 4210, a migration schedule can be generated that defines periods of time for migrating data from each of the source databases, wherein a rules based scheduling engine generates the migration schedule based on the classified source databases and the assigned scheduling weights. For example, the rules can define a weight criteria for the periods of time.

In some embodiments, the weight criteria can be a threshold aggregate weight for a given period of time, and the rules based scheduling engine can generate the migration schedule such that an aggregate weight of classified source databases assigned to the given period of time is less than or equal to the weight criteria. In some embodiments, the rules can define a threshold number of migrations for the given period of time, and the rules based scheduling engine can generate the migration schedule such that a total number of source databases assigned to the given period of time is less than or equal to the threshold number of migrations.

In some embodiments, the rules based scheduling engine can generate the migration schedule by selecting a candidate source database migration for a current period of time. It can be determined whether adding the candidate source database migration to the current period of time exceeds the weight criteria or threshold number of migrations for the current period of time. When it is determined that the weight criteria and threshold number of migrations will not be exceeded, the candidate source database migration can be assigned to the current period of time. When it is determined that the weight criteria and threshold number of migrations will be exceeded, a next period of time can be selected, and the determining and assigning can be repeated until the candidate source database migration is assigned a period of time.

At 4212, data can be migrated from the source databases to target databases according to the migration schedule. For example, each source database can be assigned to one of a plurality of periods of time, and data can be migrated from the source databases to the target databases during the assigned period of time per source database. In an embodiment, the periods of times include days, weeks, or months.

In some embodiments, each source database can be classified into a one of a plurality of database sizes (e.g., predetermined database size, such as the t-shirt sizes). Target hardware can be provisioned according to the classified database sizes for the source databases and according to the migration schedule. Migrating data from the source databases to the target databases according to the migration schedule can include migrating data from a given source database to the provisioned target hardware that corresponds the classified size for the given source database.

In some embodiments, the disclosed techniques can be used to migrate 500 databases or more over a plurality of months (e.g., over 12 months). In some embodiments, the disclosed techniques can be used to migrate 1000 databases or more over one or more years (e.g., 1, 1.5, 2, or more years). Other embodiments can be used to migrate smaller estates, such as fewer databases over a shorter period of time (e.g., less than 12 months).

Embodiments plan, schedule, and execute data migration between a source system and a target system. For example, a target system can include a number of source databases (e.g., one or a mix of on-premise, cloud, Oracle®, IBM®, Microsoft®, and the like) that store data for migration to a new system (e.g., target system). In one example, on-premise source databases may be migrated to cloud based target databases. Other example can include any other types of source databases and target databases.

In some embodiments, the source system can also include a number of software applications that interact with the source databases. For example, the source system can be implemented by an enterprise or organization, and the applications can provide software functionality for the enterprise or organization using the source databases. Examples of such software include accounting, inventory management, information technology, back-end data services, cloud hosting for a web application, software as a service, infrastructure as a service, platform as a service, product specific functionality, service specific functionality, and any other suitable software functionality.

In some embodiments, the data migration may be subject to certain conditions. For example, a database may be required to adhere to a threshold amount of downtime (e.g., based on requirements for the software functionality achieved using the database). In some embodiments, source database can be categorized into certain environments that are descriptive of their use, such as production, non-production, development, and the like. In addition, due to availability of computing resources, a certain amount of data may be available for migration over a given period of time (e.g., a week). Thus, the migration can be subject to timing, resource, and other restrictions.

Embodiments generate a plan for the data migration, which can include target hardware, source hardware discovery, source classification, migration scheduling according to conditions, source to target mappings, target hardware assignments, and other migration details. For example, one or more scripts (e.g., reverse engineering scripts) can be executed on the source system to determine fine grain information about the source databases. This information can include data storage utilization (e.g., amount of hardware resources are consumed by the source implementation), processor utilization, and other suitable information (e.g., information about how the database in utilized within the source system environment).

In some embodiments, the source databases can be classified into database sizes, for example predetermined database sizes. Predetermined database sizes can be defined by storage capacity, number of processors utilized, a combination of these, and any other suitable database metric and/or combination of database metrics. In some embodiments, the classified sizes can then be used to map the source databases to a target system, and further to assign the databases to target hardware.

In some embodiments, the target hardware can be selected, determined based on the classified source databases, or a combination of these. For example, the classified source databases can be used to generate target hardware defined by a specification for the hardware (e.g., storage space, processors, and the like), and a number for hardware of a given specification. In another example, target hardware can be selected, and target databases can be assigned to the selected target hardware.

In another example, given the classified source databases and/or mapped target databases, embodiments can analyze the selected target hardware to determine whether sufficient computing resources have been selected for the target databases. When sufficient computing resources have been selected, the target databases can be assigned to the selected computing hardware. When sufficient computing resources have not been selected, embodiments can determine additional computing resources to add to the selected hardware such that the target databases have sufficient target hardware for assignment.

In some embodiments, a schedule can be generated for the data migration based on the conditions for the data migration (e.g., threshold amount of downtime for various source databases, source database categories, availability of computing resources to perform the migration, and the like). Based on the information gathered about the source databases, each source database can be classified to a migration complexity class, such as a predetermined complexity class. In some embodiments, the migration of a source database to a target database can be scheduled for a given period of time (e.g., week) based on the migration complexity class for the source database and remaining migration conditions. Each database in the migration can be similarly scheduled, thus generating an overall schedule for the migration. Embodiments can then provision one or a group of target databases (e.g., on the target hardware) according to the generated scheduled. Once provisioned, databases can be migrated from source to target according to the generated schedule.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for performing rules based scheduling and migration of databases based on complexity and weight, the method comprising:
    storing information about a plurality of source databases from a source system, the stored information comprising at least storage capacity information per source database and permitted downtime for migration per source database;
    classifying each of the plurality of source databases to one of a plurality of predetermined migration complexities based on the storage capacity information per source database and permitted downtime for migration per source database;
    classifying each of the plurality of source databases to one of a plurality of predetermined database sizes based on the storage capacity information per source database;
    assigning quantitative scheduling weights to each source database based on the classified migration complexity;
    generating, using a rules based scheduling engine, a migration schedule that defines periods of time for migrating data from each of the source databases and assigns each source database to one or more of the periods of time, wherein the rules define a weight criteria comprising a threshold aggregate weight for the periods of time and a threshold number of migrations for the periods of time, and the rules based scheduling engine generates the migration schedule such that an aggregate of the quantitative scheduling weights for source databases assigned to a given period of time is less than or equal to the threshold aggregate weight and a total number of source databases for migration assigned to the given period of time is less than or equal to the threshold number of migrations;
    consolidating the source databases to target database hardware, wherein source databases scheduled for migration over the periods of time are mapped to instances of the target database hardware according to consolidation rules, at least one dynamic consolidation rule of the consolidation rules is configurable, and at least one of the consolidation rules defines a storage utilization limit for one or more of the instances of the target database hardware; and
    migrating data from the source databases to the target database hardware over the periods of time according to the migration schedule, wherein,
        instances of the target database hardware mapped to the source databases scheduled for migration are provisioned according to the classified database sizes for the source databases and the assigned periods of time for the source databases,
        each source database is migrated to the one or more instances of target database hardware provisioned for each source database over the period of time assigned to each source database,
        after migrating at least a portion of the sources databases, the dynamic consolidation rule is changed, and
        a mapping for at least one of the sources databases to one or more instances of the target database hardware is changed or added in response to the change to the dynamic consolidation rule.

2. The method of claim 1, wherein the periods of times comprise days, weeks, or months.

3. The method of claim 1, wherein the stored information further comprises an environment for the source databases, and classifying the plurality of source databases to a migration complexity is further based on the environment information.

4. The method of claim 1, wherein the rules based scheduling engine generates the migration schedule by:
    selecting a candidate source database migration for a current period of time;
    determining whether adding the candidate source database migration to current period of time exceeds the weight criteria or threshold number of migrations for the current period of time;
    assigning the candidate source database migration to the current period of time when it is determined that the weight criteria and threshold number of migrations will not be exceeded; and when it is determined that the weight criteria or threshold number of migrations will be exceeded, selecting a next period of time and repeating the determining and assigning until the candidate source database migration is assigned a period of time.

5. The method of claim 1, further comprising:
assigning a migration method to each classified source database based on the storage capacity information per source database and permitted downtime for migration per source database, wherein migrating data from the source databases to target databases is performed according to the assigned migration method.

6. The method of claim 1, wherein a scheduling dependencies algorithm identifies a dependency between at least two source databases, and the migration schedule is generated based on the identified dependency.

7. The method of claim 6, wherein the scheduling dependencies algorithm identifies the dependency based on a predefined primary and standby relationship between the two source databases.

8. The method of claim 7, wherein generating the migration schedule based on the identified dependency comprises assigning the two source databases with the identified dependency to one or more matching periods of time.

9. The method of claim 1, wherein the migration schedule is generated such that, for a given period of time, a sum of scheduling weights for databases assigned to the given period of time is at or below the threshold aggregate weight and a total number of databases assigned to the given period of time is at or below the threshold number of migrations.

10. The method of claim 1, wherein the stored information about the plurality of source databases further comprises processor information per source database, and the plurality of source databases are classified to one of the plurality of predetermined database sizes based on the storage capacity information per source database and the processor information per source database.

11. The method of claim 10, wherein the processor information per source database comprises processor utilization per source database with respect to source database hardware.

12. The method of claim 1, wherein the dynamic consolidation rule comprises the at least one consolidation rule that defines the storage utilization limit.

13. The method of claim 1, wherein,
prior to migrating first source databases of the source databases, the consolidating leaves at least one of the source databases unmapped, and
after migrating the first source databases, one or more instances are added to the target database hardware, and the consolidating maps the unmapped source database to the added one or more instances of target database hardware.

14. A non-transitory computer readable medium having instructions stored thereon that, when executed by a processor, cause the processor to perform rules based scheduling and migration of databases based on complexity and weight, wherein, when executed, the instructions cause the processor to:
store information about a plurality of source databases from a source system, the stored information comprising at least storage capacity information per source database and permitted downtime for migration per source database;
classify each of the plurality of source databases to one of a plurality of predetermined migration complexities based on the storage capacity information per source database and permitted downtime for migration per source database;
classify each of the plurality of source databases to one of a plurality of predetermined database sizes based on the storage capacity information per source database;
assign quantitative scheduling weights to each source database based on the classified migration complexity;
generate, using a rules based scheduling engine, a migration schedule that defines periods of time for migrating data from each of the source databases and assigns each source database to one or more of the periods of time, wherein the rules define a weight criteria comprising a threshold aggregate weight for the periods of time and a threshold number of migrations for the periods of time, and the rules based scheduling engine generates the migration schedule such that an aggregate of the quantitative scheduling weights for source databases assigned to a given period of time is less than or equal to the threshold aggregate weight and a total number of source databases for migration assigned to the given period of time is less than or equal to the threshold number of migrations;
consolidate the source databases to target database hardware, wherein source databases scheduled for migration over the periods of time are mapped to instances of the target database hardware according to consolidation rules, at least one dynamic consolidation rule of the consolidation rules is configurable, and at least one of the consolidation rules defines a storage utilization limit for one or more of the instances of the target database hardware; and
migrate data from the source databases to the target database hardware over the periods of time according to the migration schedule, wherein,
instances of the target database hardware mapped to the source databases scheduled for migration are provisioned according to the classified database sizes for the source databases and the assigned periods of time for the source databases,
each source database is migrated to the one or more instances of target database hardware provisioned for each source database over the period of time assigned to each source database,
after migrating at least a portion of the sources databases, the dynamic consolidation rule is changed, and
a mapping for at least one of the sources databases to one or more instances of the target database hardware is changed or added in response to the change to the dynamic consolidation rule.

15. The computer readable medium of claim 14, wherein the periods of times comprise days, weeks, or months.

16. The computer readable medium of claim 14, wherein the rules based scheduling engine generates the migration schedule by:
selecting a candidate source database migration for a current period of time;
determining whether adding the candidate source database migration to the current period of time exceeds the weight criteria or threshold number of migrations for the current period of time;
assigning the candidate source database migration to the current period of time when it is determined that the weight criteria and threshold number of migrations will not be exceeded; and when it is determined that the weight criteria or threshold number of migrations will be exceeded, selecting a next period of time and repeating the determining and assigning until the candidate source database migration is assigned a period of time.

17. The computer readable medium of claim 14, wherein a scheduling dependencies algorithm identifies a dependency between at least two source databases, the scheduling dependencies algorithm identifies the dependency based on a replication dependency between the two source databases, and the migration schedule is generated based on the identified dependency.

18. The computer readable medium of claim 17, wherein generating the migration schedule based on the identified dependency comprises assigning the two source databases with the identified dependency to one or more matching periods of time.

19. A system for performing rules based scheduling and migration of databases based on complexity and weight, the system comprising:
   a processor; and
   a memory storing instructions for execution by the processor, the instructions configuring the processor to:
   store information about a plurality of source databases from a source system, the stored information comprising at least storage capacity information per source database and permitted downtime for migration per source database;
   classify each of the plurality of source databases to one of a plurality of predetermined migration complexities based on the storage capacity information per source database and permitted downtime for migration per source database;
   classify each of the plurality of source databases to one of a plurality of predetermined database sizes based on the storage capacity information per source database;
   assign quantitative scheduling weights to each source database based on the classified migration complexity;
   generate, using a rules based scheduling engine, a migration schedule that defines periods of time for migrating data from each of the source databases and assigns each source database to one or more of the periods of time, wherein the rules define a weight criteria comprising a threshold aggregate weight for the periods of time and a threshold number of migrations for the periods of time, and the rules based scheduling engine generates the migration schedule such that an aggregate of the quantitative scheduling weights for source databases assigned to a given period of time is less than or equal to the threshold aggregate weight and a total number of source databases for migration assigned to the given period of time is less than or equal to the threshold number of migrations;
   consolidate the source databases to target database hardware, wherein source databases scheduled for migration over the periods of time are mapped to instances of the target database hardware according to consolidation rules, at least one dynamic consolidation rule of the consolidation rules is configurable, and at least one of the consolidation rules defines a storage utilization limit for one or more of the instances of the target database hardware; and
   migrate data from the source databases to the target database hardware over the periods of time according to the migration schedule, wherein,
      instances of the target database hardware mapped to the source databases scheduled for migration are provisioned according to the classified database sizes for the source databases and the assigned periods of time for the source databases,
      each source database is migrated to the one or more instances of target database hardware provisioned for each source database over the period of time assigned to each source database,
      after migrating at least a portion of the sources databases, the dynamic consolidation rule is changed, and
      a mapping for at least one of the sources databases to one or more instances of the target database hardware is changed or added in response to the change to the dynamic consolidation rule.

* * * * *

UNITED STATES PATENT AND TRADEMARK OFFICE
CERTIFICATE OF CORRECTION

Page 1 of 2

PATENT NO. : 12,099,483 B2
APPLICATION NO. : 16/146092
DATED : September 24, 2024
INVENTOR(S) : Earnesty, Jr. et al.

It is certified that error appears in the above-identified patent and that said Letters Patent is hereby corrected as shown below:

In the Drawings

On sheet 40 of 43, in Fig. 39B, under reference numeral 3916, Line 2, delete "critiria" and insert -- criteria --, therefor.

On sheet 40 of 43, in Fig. 39B, under reference numeral 3918, Line 2, delete "subluster" and insert -- subcluster --, therefor.

In the Specification

In Column 10, Line 12, delete "chracterset" and insert -- characterset --, therefor.

In Column 28, Line 35, delete "X+1" and insert -- X+1. --, therefor.

In Column 29, Line 54, delete "BG" and insert -- GB --, therefor.

In Column 30, Line 64, delete "CChicago," and insert -- ('Chicago, --, therefor.

In Column 32, Line 11, delete "analysis" and insert -- analysis. --, therefor.

In Column 35, Line 9, delete "executed" and insert -- executed. --, therefor.

In Column 37, Line 63, delete "obtlna" and insert -- obtain --, therefor.

In Columns 45-46, Line 50, delete "MG" and insert -- MB --, therefor.

In Column 46, Lines 61-62, delete "taget" and insert -- target --, therefor.

In Column 48, Line 58, delete "oradb0l" and insert -- oradb01 --, therefor.

Signed and Sealed this
Fourth Day of February, 2025

Coke Morgan Stewart
*Acting Director of the United States Patent and Trademark Office*

In Column 48, Line 59, delete "oradb0l" and insert -- oradb01 --, therefor.

In Column 49, Line 1, delete "oradb0l" and insert -- oradb01 --, therefor.

In Column 49, Line 7, delete "oradb0l" and insert -- oradb01 --, therefor.

In Column 49, Line 9, delete "oradb0l" and insert -- oradb01 --, therefor.

In Column 50, Line 32, delete "(targe_cpu" and insert -- (target_cpu --, therefor.

In Column 50, Line 35, delete "oradb0l" and insert -- oradb01 --, therefor.

In Columns 53-54, Line 24, delete "MG" and insert -- MB --, therefor.

In the Claims

In Column 62, Line 61, in Claim 4, after "to" insert -- the --, therefor.